United States Patent
Ko et al.

(10) Patent No.: US 11,206,624 B2
(45) Date of Patent: Dec. 21, 2021

(54) METHOD FOR TRANSMITTING AND RECEIVING SYNCHRONIZATION SIGNAL BLOCK AND APPARATUS THEREFOR

(71) Applicant: LG ELECTRONICS INC., Seoul (KR)

(72) Inventors: Hyunsoo Ko, Seoul (KR); Byounghoon Kim, Seoul (KR); Kijun Kim, Seoul (KR); Sukhyon Yoon, Seoul (KR); Eunsun Kim, Seoul (KR); Youngsub Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 29 days.

(21) Appl. No.: 16/633,994

(22) PCT Filed: Jul. 27, 2018

(86) PCT No.: PCT/KR2018/008572
§ 371 (c)(1),
(2) Date: Jan. 24, 2020

(87) PCT Pub. No.: WO2019/022574
PCT Pub. Date: Jan. 31, 2019

(65) Prior Publication Data
US 2021/0092696 A1    Mar. 25, 2021

Related U.S. Application Data

(60) Provisional application No. 62/538,065, filed on Jul. 28, 2017, provisional application No. 62/544,212, (Continued)

(51) Int. Cl.
*H04W 56/00* (2009.01)
*H04W 4/40* (2018.01)
(Continued)

(52) U.S. Cl.
CPC .......... *H04W 56/001* (2013.01); *H04W 4/40* (2018.02); *H04W 72/005* (2013.01); *H04W 72/0466* (2013.01); *H04W 76/27* (2018.02)

(58) Field of Classification Search
CPC ... H04W 56/001; H04W 56/00; H04W 76/27; H04W 72/005; H04W 4/40;
(Continued)

(56) References Cited

U.S. PATENT DOCUMENTS

2016/0308637 A1 * 10/2016 Frenne ............... H04W 56/0015
2018/0139036 A1 *  5/2018 Islam ........................ H04J 1/02
(Continued)

FOREIGN PATENT DOCUMENTS

| KR | 1020120028290 | 3/2012 |
|---|---|---|
| WO | 2017048105 | 3/2017 |
| WO | 2017058427 | 4/2017 |

OTHER PUBLICATIONS

PCT International Application No. PCT/KR2018/008572, Written Opinion of the International Searching Authority dated Nov. 28, 2018, 16 pages.
(Continued)

*Primary Examiner* — Ricardo H Castaneyra
(74) *Attorney, Agent, or Firm* — Lee Hong Degerman Kang Waimey

(57) ABSTRACT

Disclosed is a method for a terminal to receive a synchronization signal block (SSB) in a wireless communication system. In particular, the method comprises receiving, on a first half frame or a second half frame included in a wireless frame, at least one SSB mapped to a plurality of symbols, wherein the at least one SSB is any one of a first SSB received on the first half frame and a second SSB received on the second half frame, and a signal of the same type is mapped to a first symbol included in a plurality of symbols
(Continued)

to which the first SSB is mapped and a second symbol included in a plurality of symbols to which the second SSB is mapped, but a phase of the first symbol and a phase of the second symbol are different.

13 Claims, 34 Drawing Sheets

Related U.S. Application Data filed on Aug. 11, 2017, provisional application No. 62/549,987, filed on Aug. 25, 2017, provisional application No. 62/562,481, filed on Sep. 24, 2017, provisional application No. 62/566,519, filed on Oct. 1, 2017.

(51) Int. Cl.
*H04W 76/27* (2018.01)
*H04W 72/00* (2009.01)
*H04W 72/04* (2009.01)

(58) Field of Classification Search
CPC ............ H04W 56/0015; H04L 5/0051; H04L 5/0053; H04J 11/0079; H04J 11/0069
See application file for complete search history.

(56) References Cited

U.S. PATENT DOCUMENTS

| | | | |
|---|---|---|---|
| 2018/0220426 A1* | 8/2018 | Rico Alvarino | H04J 11/005 |
| 2018/0359714 A1* | 12/2018 | Sadiq | H04L 1/0011 |
| 2020/0092740 A1* | 3/2020 | Yokomakura | H04W 24/10 |
| 2020/0145939 A1* | 5/2020 | Harada | H04W 72/0453 |

OTHER PUBLICATIONS

Intel, "Time Index Signaling for SS Blocks", 3GPP TSG RAN WG1 Meeting Ad-hoc#2, R1-1711611, Jun. 2017, 9 pages.
Vivo, "Discussion on SS block time index indication", 3GPP TSG RAN WG1 Meeting #89, R1-1707227, May 2017, 6 pages.
European Patent Office Application Serial No. 18837661.0, Search Report dated Apr. 22, 2021, 9 pages.
Ericsson, "Timing indication based on SS block", R1-1711373, 3GPP TSG-RAN WG1 NR Ad-Hoc#2, Jun. 2017, 7 pages.
Fujitsu, "Discussion on DMRS for NR-PBCH", R1-1710232, 3GPP TSG RAN WG1 NR Ad-Hoc#2, Jun. 2017, 6 pages.
Qualcomm Incorporated, "Timing indication based on SS block consideration", R1-1711646, 3GPP TSG-RAN WG1 Ad-Hoc#2, Jun. 2017, 14 pages.

* cited by examiner

FIG. 1
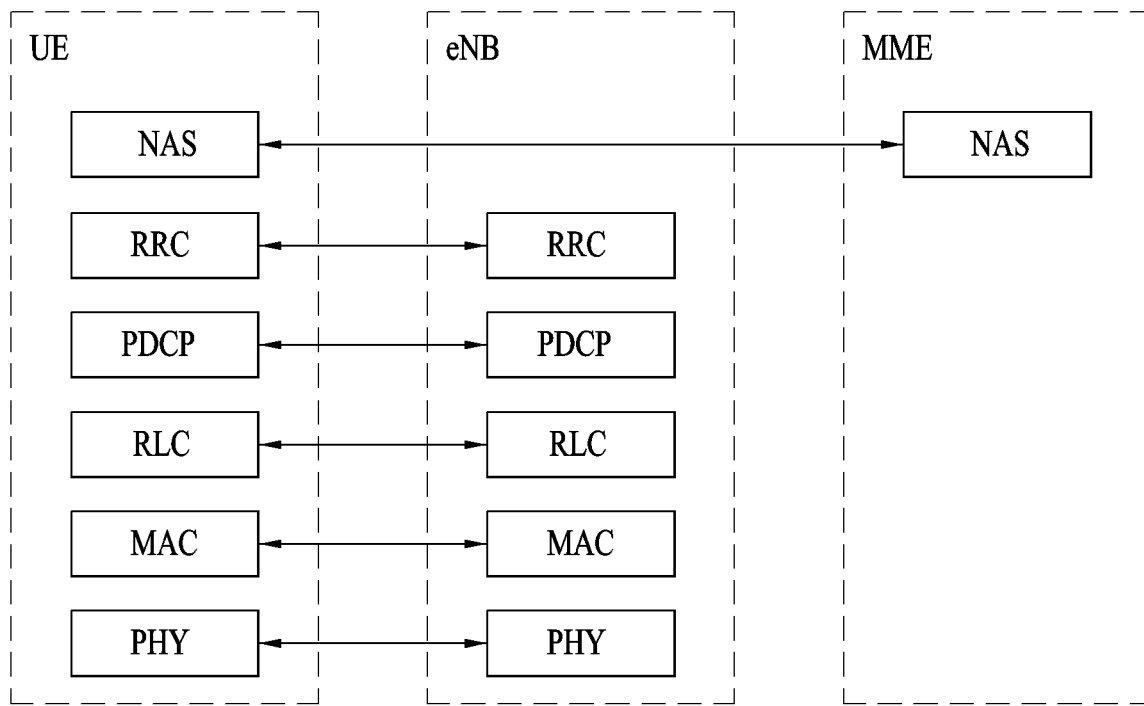
(A) CONTROL-PLANE PROTOCOL STACK
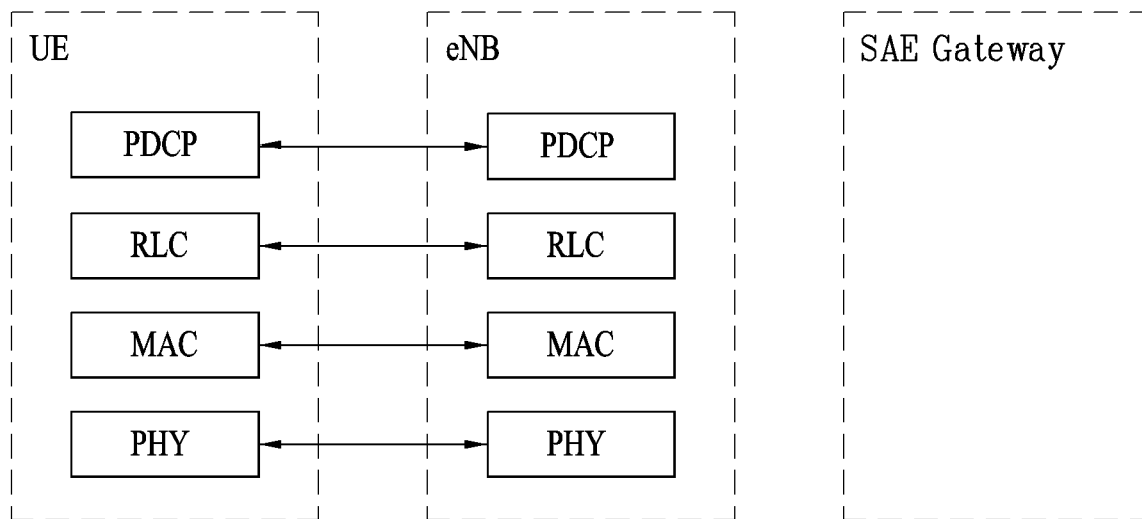
(B) USER-PLANE PROTOCOL STACK (a)

(b)

FIG. 32
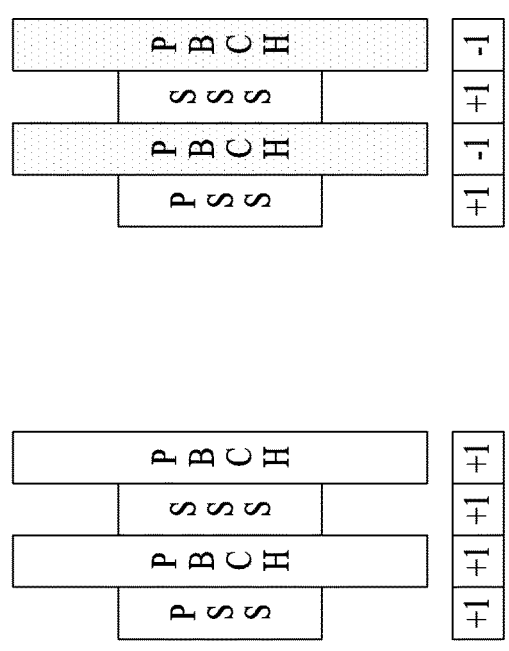
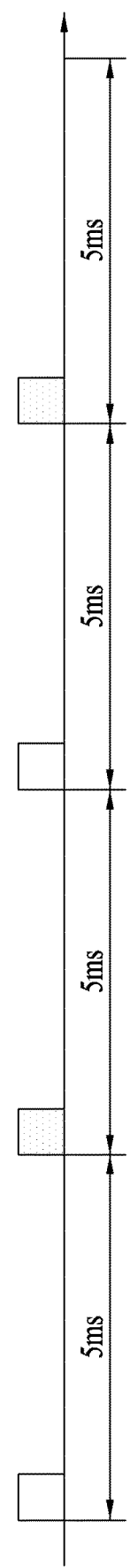

METHOD FOR TRANSMITTING AND RECEIVING SYNCHRONIZATION SIGNAL BLOCK AND APPARATUS THEREFOR

CROSS-REFERENCE TO RELATED APPLICATIONS

This application is the National Stage filing under 35 U.S.C. 371 of International Application No. PCT/KR2018/008572, filed on Jul. 27, 2018, which claims the benefit of U.S. Provisional Application Nos. 62/538,065, filed on Jul. 28, 2017, 62/544,212, filed on Aug. 11, 2017, 62/549,987, filed on Aug. 25, 2017, 62/562,481, filed on Sep. 24, 2017, and 62/566,519, filed on Oct. 1, 2017, the contents of which are all hereby incorporated by reference herein in their entirety.

TECHNICAL FIELD

The present disclosure relates to a method of transmitting and receiving a synchronization signal block and an apparatus therefor and, more particularly, to a method of identifying a half-frame in which a synchronization signal block is transmitted through phases of symbols to which the synchronization signal block is mapped, and an apparatus therefor.

BACKGROUND ART

As more and more communication devices demand larger communication traffic along with the current trends, a future-generation 5th generation (5G) system is required to provide an enhanced wireless broadband communication, compared to the legacy LTE system. In the future-generation 5G system, communication scenarios are divided into enhanced mobile broadband (eMBB), ultra-reliability and low-latency communication (URLLC), massive machine-type communication (mMTC), and so on.

Herein, eMBB is a future-generation mobile communication scenario characterized by high spectral efficiency, high user experienced data rate, and high peak data rate, URLLC is a future-generation mobile communication scenario characterized by ultra high reliability, ultra low latency, and ultra high availability (e.g., vehicle to everything (V2X), emergency service, and remote control), and mMTC is a future-generation mobile communication scenario characterized by low cost, low energy, short packet, and massive connectivity (e.g., Internet of things (IoT)).

DETAILED DESCRIPTION OF THE DISCLOSURE

Technical Problems

The present disclosure is to provide a method of transmitting and receiving a synchronization signal block and an apparatus therefor.

The objects to be achieved with the present disclosure are not limited to what has been particularly described hereinabove and other objects not described herein will be more clearly understood by persons skilled in the art from the following detailed description.

Technical Solutions

According to an aspect of the present disclosure, provided herein is a method of receiving a synchronization signal block (SSB) by a user equipment (UE) in a wireless communication system, including receiving at least one SSB mapped to a plurality of symbols in a first half-frame or a second half-frame included in a radio frame. The at least one SSB may be any one of a first SSB received in the first half-frame and a second SSB received in the second half-frame. A signal of the same type may be mapped to a first symbol included in a plurality of symbols to which the first SSB is mapped and a second symbol included in a plurality of symbols to which the second SSB is mapped. Phases of the first symbol and the second symbol may be different.

The signal of the same type may be any one of a primary synchronization signal (PSS), a secondary synchronization signal (SSS), and a physical broadcasting channel (PBCH).

The phases of the first symbol and the second symbol may have a difference of 180 degrees.

The at least one SSB may include a physical broadcasting channel (PBCH) including an indicator for distinguishing between the first half-frame and the second half-frame, and the indicator may be used to generate a scrambling sequence of the PBCH.

A demodulation reference signal (DMRS) may be mapped to a symbol to which the PBCH is mapped, and a sequence of the DMRS may be generated based on the number of SSB indexes obtainable through the DMRS and on the indicator.

The sequence of the DMRS may be generated based on multiplication of the number of the SSB indexes obtainable through the DMRS and a value indicated by the indicator.

Based on detection of the first SSB, the UE may perform detection of the second SSB in a specific time duration after a predetermined time from a timing at which the first SSB is detected.

A demodulation reference signal (DMRS) may be mapped to a symbol to which a physical broadcasting channel (PBCH) included in each of the first SSB and the second SSB is mapped, and a sequence of a DMRS related with the first SSB may be different from a sequence of a DMRS related with the second SSB.

A demodulation reference signal (DMRS) may be mapped to a symbol to which a physical broadcasting channel (PBCH) included in each of the first SSB and the second SSB is mapped, and a frequency position to which a DMRS related with the first SSB is mapped may be different from a frequency position to which a DMRS related with the second SSB is mapped.

Based on initial access performed by the UE, the at least one SSB may be repeatedly transmitted at a first time periodicity, and based on radio resource control (RRC) connection state of the UE, the at least one SSB may be repeatedly transmitted at a second time periodicity longer than the first time periodicity.

Based on assumption that signals transmitted from a serving cell and a neighbor cell of the UE are received within a predetermined error range, time information obtained through an SSB received from the serving cell may be equally applied to an SSB received from the neighbor cell.

In another aspect of the present disclosure, provided herein is a user equipment (UE) for receiving a synchronization signal block (SSB) in a wireless communication system, including a transceiver configured to transmit and receive a signal to and from a base station (BS), and a processor connected to the transceiver and configured to control the transceiver to receive at least one SSB mapped to a plurality of symbols in a first half-frame or a second half-frame included in a radio frame. The at least one SSB may be any one of a first SSB received in the first half-frame and a second SSB received in the second half-frame. A signal of the same type may be mapped to a first symbol included in a plurality of symbols to which the first SSB is mapped and a second symbol included in a plurality of symbols to which the second SSB is mapped. Phases of the first symbol and the second symbol may be different.

In another aspect of the present disclosure, provided herein is a method of transmitting a synchronization signal block (SSB) by a base station (BS) in a wireless communication system, including mapping at least one SSB to a plurality of symbols and transmitting the at least one SSB in a first half-frame or a second half-frame included in a radio frame. A first SSB may be transmitted in the first half-frame and a second SSB may be transmitted in the second half-frame. A signal of the same type may be mapped to a first symbol included in a plurality of symbols to which the first SSB is mapped and a second symbol included in a plurality of symbols to which the second SSB is mapped. Phases of the first symbol and the second symbol may be differently mapped.

In another aspect of the present disclosure, provided herein a base station (BS) for transmitting a synchronization signal block (SSB) in a wireless communication system, including a transceiver configured to transmit and receive a radio signal to and from a user equipment (UE), and a processor connected to the transceiver and configured to map at least one SSB to a plurality of symbols and transmit the at least one SSB in a first half-frame or a second half-frame included in a radio frame. A first SSB may be transmitted in the first half-frame and a second SSB may be transmitted in the second half-frame. A signal of the same type may be mapped to a first symbol included in a plurality of symbols to which the first SSB is mapped and a second symbol included in a plurality of symbols to which the second SSB is mapped. Phases of the first symbol and the second symbol may be differently mapped.

Advantageous Effects

According to the present disclosure, complexity of decoding for a synchronization signal block may be reduced by identifying a half-frame in which the synchronization signal block is transmitted through a phase of a symbol to which the synchronization signal block is mapped.

Effects according to the present disclosure are not limited to what has been particularly described hereinabove and other advantages not described herein will be more clearly understood by persons skilled in the art from the following detailed description of the present disclosure.

DESCRIPTION OF DRAWINGS

FIG. 1 is a view illustrating the control-plane and user-plane architecture of radio interface protocols between a user equipment (UE) and an evolved UMTS terrestrial radio access network (E-UTRAN) in conformance to a 3rd generation partnership project (3GPP) radio access network standard.

FIG. 32 is a view for explaining a method of acquiring half-frame boundary information according to an embodiment of the present disclosure.

BEST MODE FOR CARRYING OUT THE DISCLOSURE

Figure 2:
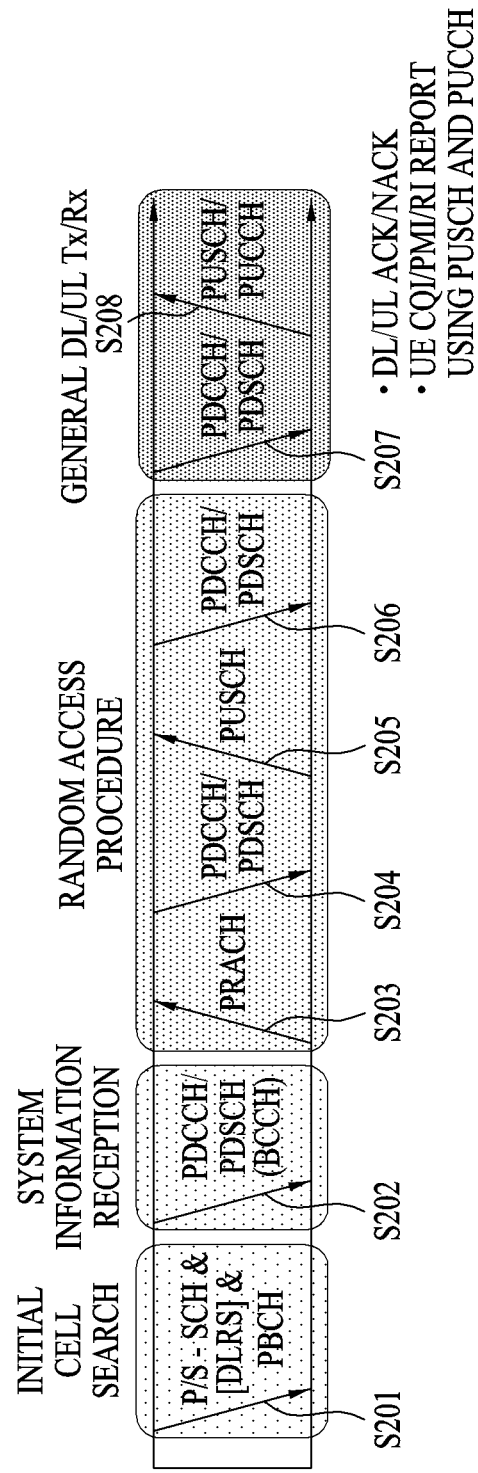
FIG. 2 is a view illustrating physical channels and a general signal transmission method using the physical channels in a 3GPP system.

The configuration, operation, and other features of the present disclosure will readily be understood with embodiments of the present disclosure described with reference to the attached drawings. Embodiments of the present disclosure as set forth herein are examples in which the technical features of the present disclosure are applied to a 3rd generation partnership project (3GPP) system.

While embodiments of the present disclosure are described in the context of long term evolution (LTE) and LTE-advanced (LTE-A) systems, they are purely exemplary. Therefore, the embodiments of the present disclosure are applicable to any other communication system as long as the above definitions are valid for the communication system.

The term, Base Station (BS) may be used to cover the meanings of terms including remote radio head (RRH), evolved Node B (eNB or eNode B), transmission point (TP), reception point (RP), relay, and so on.

The 3GPP communication standards define downlink (DL) physical channels corresponding to resource elements (REs) carrying information originated from a higher layer, and DL physical signals which are used in the physical layer and correspond to REs which do not carry information originated from a higher layer. For example, physical downlink shared channel (PDSCH), physical broadcast channel (PBCH), physical multicast channel (PMCH), physical control format indicator channel (PCFICH), physical downlink control channel (PDCCH), and physical hybrid ARQ indicator channel (PHICH) are defined as DL physical channels, and reference signals (RSs) and synchronization signals (SSs) are defined as DL physical signals. An RS, also called a pilot signal, is a signal with a predefined special waveform known to both a gNode B (gNB) and a UE. For example, cell specific RS, UE-specific RS (UE-RS), positioning RS (PRS), and channel state information RS (CSI-RS) are defined as DL RSs. The 3GPP LTE/LTE-A standards define uplink (UL) physical channels corresponding to REs carrying information originated from a higher layer, and UL physical signals which are used in the physical layer and correspond to REs which do not carry information originated from a higher layer. For example, physical uplink shared channel (PUSCH), physical uplink control channel (PUCCH), and physical random access channel (PRACH) are defined as UL physical channels, and a demodulation reference signal (DMRS) for a UL control/data signal, and a sounding reference signal (SRS) used for UL channel measurement are defined as UL physical signals.

In the present disclosure, the PDCCH/PCFICH/PHICH/PDSCH refers to a set of time-frequency resources or a set of REs, which carry downlink control information (DCI)/a control format indicator (CFI)/a DL acknowledgement/negative acknowledgement (ACK/NACK)/DL data. Further, the PUCCH/PUSCH/PRACH refers to a set of time-frequency resources or a set of REs, which carry UL control information (UCI)/UL data/a random access signal. In the present disclosure, particularly a time-frequency resource or an RE which is allocated to or belongs to the PDCCH/PCFICH/PHICH/PDSCH/PUCCH/PUSCH/PRACH is referred to as a PDCCH RE/PCFICH RE/PHICH RE/PDSCH RE/PUCCH RE/PUSCH RE/PRACH RE or a PDCCH resource/PCFICH resource/PHICH resource/PDSCH resource/PUCCH resource/PUSCH resource/PRACH resource. Hereinbelow, if it is said that a UE transmits a PUCCH/PUSCH/PRACH, this means that UCI/UL data/a random access signal is transmitted on or through the PUCCH/PUSCH/PRACH. Further, if it is said that a gNB transmits a PDCCH/PCFICH/PHICH/PDSCH, this means that DCI/control information is transmitted on or through the PDCCH/PCFICH/PHICH/PDSCH.

Hereinbelow, an orthogonal frequency division multiplexing (OFDM) symbol/carrier/subcarrier/RE to which a CRS/DMRS/CSI-RS/SRS/UE-RS is allocated to or for which the CRS/DMRS/CSI-RS/SRS/UE-RS is configured is referred to as a CRS/DMRS/CSI-RS/SRS/UE-RS symbol/carrier/subcarrier/RE. For example, an OFDM symbol to which a tracking RS (TRS) is allocated or for which the TRS is configured is referred to as a TRS symbol, a subcarrier to which a TRS is allocated or for which the TRS is configured is referred to as a TRS subcarrier, and an RE to which a TRS is allocated or for which the TRS is configured is referred to as a TRS RE. Further, a subframe configured to transmit a TRS is referred to as a TRS subframe. Further, a subframe carrying a broadcast signal is referred to as a broadcast subframe or a PBCH subframe, and a subframe carrying a synchronization signal (SS) (e.g., a primary synchronization signal (PSS) and/or a secondary synchronization signal (SSS)) is referred to as an SS subframe or a PSS/SSS subframe. An OFDM symbol/subcarrier/RE to which a PSS/SSS is allocated or for which the PSS/SSS is configured is referred to as a PSS/SSS symbol/subcarrier/RE.

In the present disclosure, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna port configured to transmit CRSs may be distinguished from each other by the positions of REs occupied by the CRSs according to CRS ports, antenna ports configured to transmit UE-RSs may be distinguished from each other by the positions of REs occupied by the UE-RSs according to UE-RS ports, and antenna ports configured to transmit CSI-RSs may be distinguished from each other by the positions of REs occupied by the CSI-RSs according to CSI-RS ports. Therefore, the term CRS/UE-RS/CSI-RS/TRS port is also used to refer to a pattern of REs occupied by a CRS/UE-RS/CSI-RS/TRS in a predetermined resource area.

FIG. 1 illustrates control-plane and user-plane protocol stacks in a radio interface protocol architecture conforming to a 3GPP wireless access network standard between a user equipment (UE) and an evolved UMTS terrestrial radio access network (E-UTRAN). The control plane is a path in which the UE and the E-UTRAN transmit control messages to manage calls, and the user plane is a path in which data generated from an application layer, for example, voice data or Internet packet data is transmitted.

A physical (PHY) layer at layer 1 (L1) provides information transfer service to its higher layer, a medium access control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in orthogonal frequency division multiple access (OFDMA) for downlink (DL) and in single carrier frequency division multiple access (SC-FDMA) for uplink (UL).

The MAC layer at layer 2 (L2) provides service to its higher layer, a radio link control (RLC) layer via logical channels. The RLC layer at L2 supports reliable data transmission. RLC functionality may be implemented in a function block of the MAC layer. A packet data convergence protocol (PDCP) layer at L2 performs header compression to reduce the amount of unnecessary control information and thus efficiently transmit Internet protocol (IP) packets such as IP version 4 (IPv4) or IP version 6 (IPv6) packets via an air interface having a narrow bandwidth.

A radio resource control (RRC) layer at the lowest part of layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

DL transport channels used to deliver data from the E-UTRAN to UEs include a broadcast channel (BCH) carrying system information, a paging channel (PCH) carrying a paging message, and a shared channel (SCH) carrying user traffic or a control message. DL multicast traffic or control messages or DL broadcast traffic or control messages may be transmitted on a DL SCH or a separately defined DL multicast channel (MCH). UL transport channels used to deliver data from a UE to the E-UTRAN include a random access channel (RACH) carrying an initial control message and a UL SCH carrying user traffic or a control message. Logical channels that are defined above transport channels and mapped to the transport channels include a broadcast control channel (BCCH), a paging control channel (PCCH), a Common Control Channel (CCCH), a multicast control channel (MCCH), a multicast traffic channel (MTCH), etc.

FIG. 2 illustrates physical channels and a general method for transmitting signals on the physical channels in the 3GPP system.

Referring to FIG. 2, when a UE is powered on or enters a new cell, the UE performs initial cell search (S201). The initial cell search involves acquisition of synchronization to an eNB. Specifically, the UE synchronizes its timing to the eNB and acquires a cell identifier (ID) and other information by receiving a primary synchronization channel (P-SCH) and a secondary synchronization channel (S-SCH) from the eNB. Then the UE may acquire information broadcast in the cell by receiving a physical broadcast channel (PBCH) from the eNB. During the initial cell search, the UE may monitor a DL channel state by receiving a DownLink reference signal (DL RS).

After the initial cell search, the UE may acquire detailed system information by receiving a physical downlink control channel (PDCCH) and receiving a physical downlink shared channel (PDSCH) based on information included in the PDCCH (S202).

If the UE initially accesses the eNB or has no radio resources for signal transmission to the eNB, the UE may perform a random access procedure with the eNB (S203 to S206). In the random access procedure, the UE may transmit a predetermined sequence as a preamble on a physical random access channel (PRACH) (S203 and S205) and may receive a response message to the preamble on a PDCCH and a PDSCH associated with the PDCCH (S204 and S206). In the case of a contention-based RACH, the UE may additionally perform a contention resolution procedure.

After the above procedure, the UE may receive a PDCCH and/or a PDSCH from the eNB (S207) and transmit a physical uplink shared channel (PUSCH) and/or a physical uplink control channel (PUCCH) to the eNB (S208), which is a general DL and UL signal transmission procedure. Particularly, the UE receives downlink control information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL acknowledgment/negative acknowledgment (ACK/NACK) signal, a channel quality indicator (CQI), a precoding matrix index (PMI), a rank indicator (RI), etc. In the 3GPP LTE system, the UE may transmit control information such as a CQI, a PMI, an RI, etc. on a PUSCH and/or a PUCCH.

Figure 3:
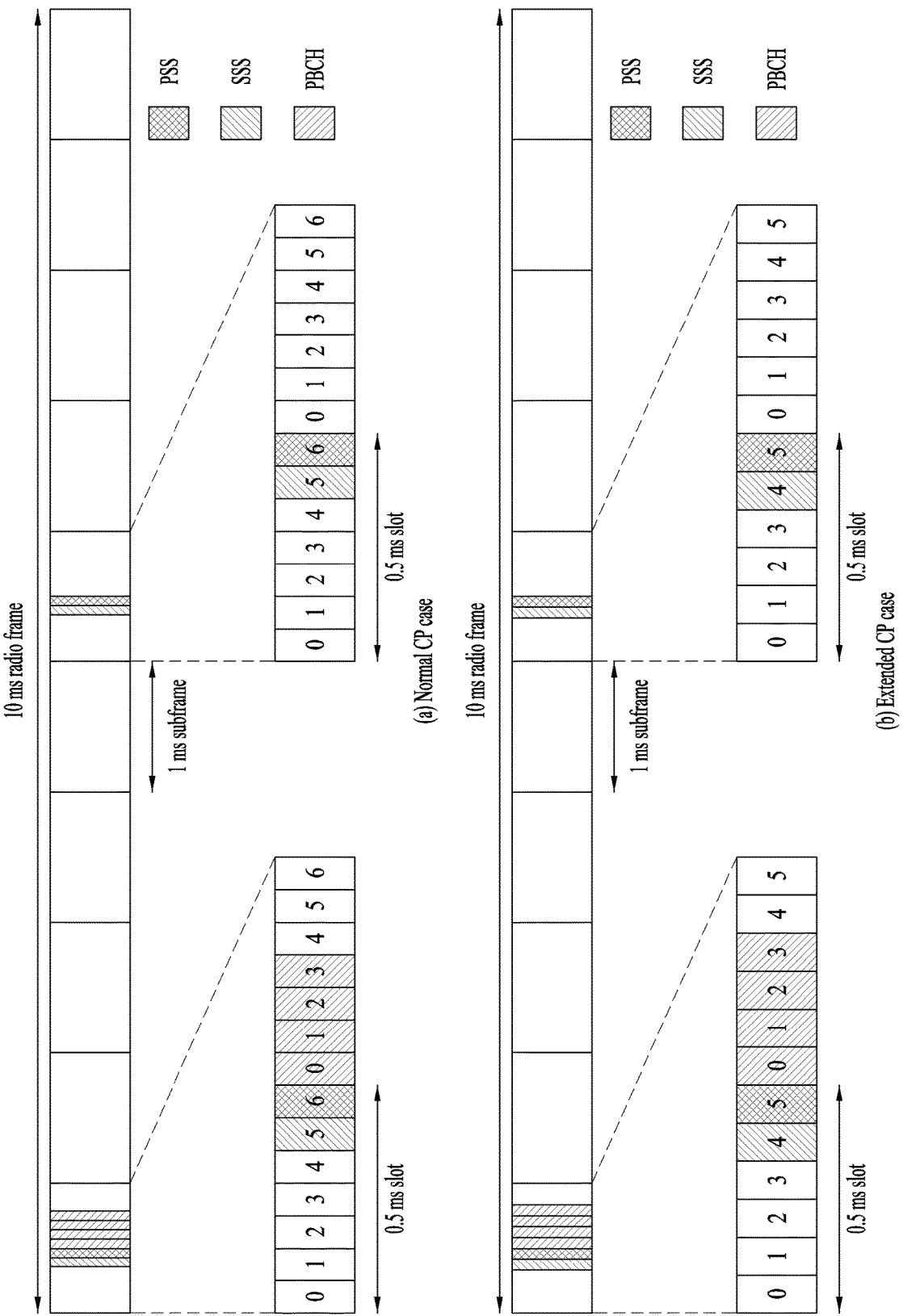
FIG. 3 is a view illustrating a radio frame structure for transmitting a synchronization signal (SS) in a long term evolution (LTE) system.

FIG. 3 is a diagram illustrating a radio frame structure for transmitting a synchronization signal (SS) in LTE system. In particular, FIG. 3 illustrates a radio frame structure for transmitting a synchronization signal and PBCH in frequency division duplex (FDD). FIG. 3(a) shows positions at which the SS and the PBCH are transmitted in a radio frame configured by a normal cyclic prefix (CP) and FIG. 3(b) shows positions at which the SS and the PBCH are transmitted in a radio frame configured by an extended CP.

Figure 4:
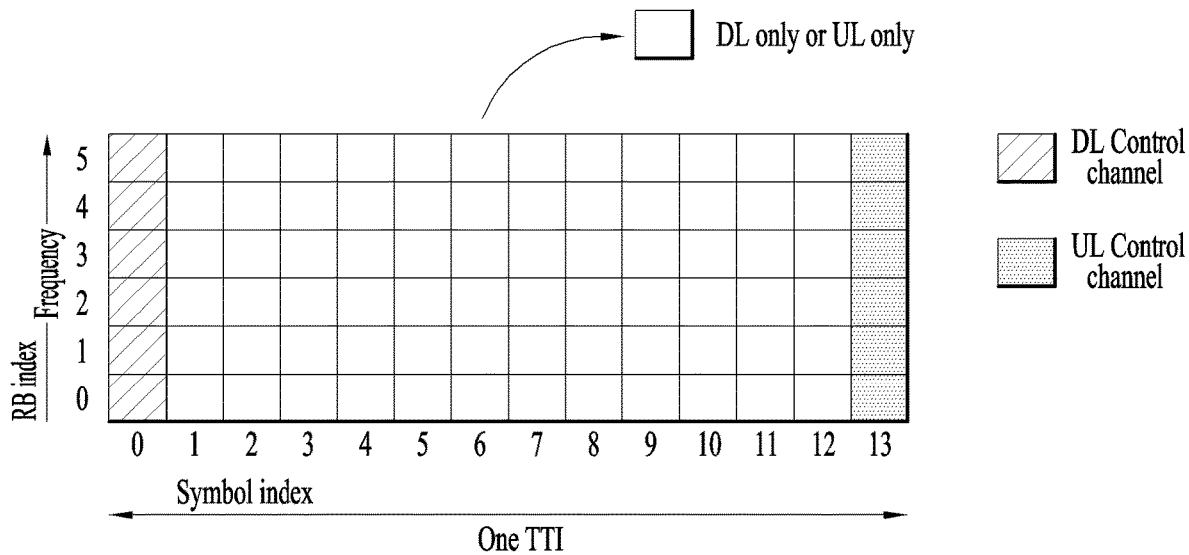
FIG. 4 is a view illustrating an exemplary slot structure available in new radio access technology (NR).

An SS will be described in more detail with reference to FIG. 3. An SS is categorized into a primary synchronization signal (PSS) and a secondary synchronization signal (SSS). The PSS is used to acquire time-domain synchronization such as OFDM symbol synchronization, slot synchronization, etc. and/or frequency-domain synchronization. And, the SSS is used to acquire frame synchronization, a cell group ID, and/or a CP configuration of a cell (i.e. information indicating whether to a normal CP or an extended is used). Referring to FIG. 4, a PSS and an SSS are transmitted through two OFDM symbols in each radio frame. Particularly, the SS is transmitted in first slot in each of subframe 0 and subframe 5 in consideration of a GSM (Global System for Mobile communication) frame length of 4.6 ms for facilitation of inter-radio access technology (inter-RAT) measurement. Especially, the PSS is transmitted in a last OFDM symbol in each of the first slot of subframe 0 and the first slot of subframe 5. And, the SSS is transmitted in a second to last OFDM symbol in each of the first slot of subframe 0 and the first slot of subframe 5. Boundaries of a corresponding radio frame may be detected through the SSS. The PSS is transmitted in the last OFDM symbol of the corresponding slot and the SSS is transmitted in the OFDM symbol immediately before the OFDM symbol in which the PSS is transmitted. According to a transmission diversity scheme for the SS, only a single antenna port is used. However, the transmission diversity scheme for the SS standards is not separately defined in the current standard.

Referring to FIG. 3, by detecting the PSS, a UE may know that a corresponding subframe is one of subframe 0 and subframe 5 since the PSS is transmitted every 5 ms but the UE cannot know whether the subframe is subframe 0 or subframe 5. That is, frame synchronization cannot be obtained only from the PSS. The UE detects the boundaries of the radio frame in a manner of detecting an SSS which is transmitted twice in one radio frame with different sequences.

Having demodulated a DL signal by performing a cell search procedure using the PSS/SSS and determined time and frequency parameters necessary to perform UL signal transmission at an accurate time, a UE can communicate with an eNB only after obtaining system information necessary for a system configuration of the UE from the eNB.

The system information is configured with a master information block (MIB) and system information blocks (SIBs). Each SIB includes a set of functionally related parameters and is categorized into an MIB, SIB Type 1 (SIB1), SIB Type 2 (SIB2), and SIB3 to SIB8 according to the included parameters.

The MIB includes most frequently transmitted parameters which are essential for a UE to initially access a network served by an eNB. The UE may receive the MIB through a broadcast channel (e.g. a PBCH). The MIB includes a downlink system bandwidth (DL BW), a PHICH configuration, and a system frame number (SFN). Thus, the UE can explicitly know information on the DL BW, SFN, and PHICH configuration by receiving the PBCH. On the other hand, the UE may implicitly know information on the number of transmission antenna ports of the eNB. The information on the number of the transmission antennas of the eNB is implicitly signaled by masking (e.g. XOR operation) a sequence corresponding to the number of the transmission antennas to 16-bit cyclic redundancy check (CRC) used in detecting an error of the PBCH.

The SIB1 includes not only information on time-domain scheduling for other SIBs but also parameters necessary to determine whether a specific cell is suitable in cell selection. The UE receives the SIB1 via broadcast signaling or dedicated signaling.

A DL carrier frequency and a corresponding system bandwidth can be obtained by MIB carried by PBCH. A UL carrier frequency and a corresponding system bandwidth can be obtained through system information corresponding to a DL signal. Having received the MIB, if there is no valid system information stored in a corresponding cell, a UE applies a value of a DL BW included in the MIB to a UL bandwidth until system information block type 2 (System- InformationBlockType2, SIB2) is received. For example, if the UE obtains the SIB2, the UE is able to identify the entire UL system bandwidth capable of being used for UL transmission through UL-carrier frequency and UL-bandwidth information included in the SIB2.

In the frequency domain, PSS/SSS and PBCH are transmitted irrespective of an actual system bandwidth in total 6 RBs, i.e., 3 RBs in the left side and 3 RBs in the right side with reference to a DC subcarrier within a corresponding OFDM symbol. In other words, the PSS/SSS and the PBCH are transmitted only in 72 subcarriers. Therefore, a UE is configured to detect or decode the SS and the PBCH irrespective of a downlink transmission bandwidth configured for the UE.

Having completed the initial cell search, the UE can perform a random access procedure to complete the accessing the eNB. To this end, the UE transmits a preamble via PRACH (physical random access channel) and can receive a response message via PDCCH and PDSCH in response to the preamble. In case of contention based random access, it may transmit additional PRACH and perform a contention resolution procedure such as PDCCH and PDSCH corresponding to the PDCCH.

Having performed the abovementioned procedure, the UE can perform PDCCH/PDSCH reception and PUSCH/PUCCH transmission as a general UL/DL signal transmission procedure.

The random access procedure is also referred to as a random access channel (RACH) procedure. The random access procedure is used for various usages including initial access, UL synchronization adjustment, resource allocation, handover, and the like. The random access procedure is categorized into a contention-based procedure and a dedicated (i.e., non-contention-based) procedure. In general, the contention-based random access procedure is used for performing initial access. On the other hand, the dedicated random access procedure is restrictively used for performing handover, and the like. When the contention-based random access procedure is performed, a UE randomly selects a RACH preamble sequence. Hence, a plurality of UEs can transmit the same RACH preamble sequence at the same time. As a result, a contention resolution procedure is required thereafter. On the contrary, when the dedicated random access procedure is performed, the UE uses an RACH preamble sequence dedicatedly allocated to the UE by an eNB. Hence, the UE can perform the random access procedure without a collision with a different UE.

The contention-based random access procedure includes 4 steps described in the following. Messages transmitted via the 4 steps can be respectively referred to as message (Msg) 1 to 4 in the present disclosure.

Step 1: RACH preamble (via PRACH) (UE to eNB)
Step 2: Random access response (RAR) (via PDCCH and PDSCH (eNB to)
Step 3: Layer 2/Layer 3 message (via PUSCH) (UE to eNB)
Step 4: Contention resolution message (eNB to UE)

On the other hand, the dedicated random access procedure includes 3 steps described in the following. Messages transmitted via the 3 steps can be respectively referred to as message (Msg) 0 to 2 in the present disclosure. It may also perform uplink transmission (i.e., step 3) corresponding to PAR as a part of the ransom access procedure. The dedicated random access procedure can be triggered using PDCCH (hereinafter, PDCCH order) which is used for an eNB to indicate transmission of an RACH preamble.

Step 0: RACH preamble assignment via dedicated signaling (eNB to UE)
Step 1: RACH preamble (via PRACH) (UE to eNB)
Step 2: Random access response (RAR) (via PDCCH and PDSCH) (eNB to UE)

After the RACH preamble is transmitted, the UE attempts to receive a random access response (RAR) in a preconfigured time window. Specifically, the UE attempts to detect PDCCH (hereinafter, RA-RNTI PDCCH) (e.g., a CRC masked with RA-RNTI in PDCCH) having RA-RNTI (random access RNTI) in a time window. If the RA-RNTI PDCCH is detected, the UE checks whether or not there is a RAR for the UE in PDSCH corresponding to the RA-RNTI PDCCH. The RAR includes timing advance (TA) information indicating timing offset information for UL synchronization, UL resource allocation information (UL grant information), a temporary UE identifier (e.g., temporary cell-RNTI, TC-RNTI), and the like. The UE can perform UL transmission (e.g., message 3) according to the resource allocation information and the TA value included in the RAR. HARQ is applied to UL transmission corresponding to the RAR. In particular, the UE can receive reception response information (e.g., PHICH) corresponding to the message 3 after the message 3 is transmitted.

A random access preamble (i.e. RACH preamble) consists of a cyclic prefix of a length of TCP and a sequence part of a length of TSEQ. The TCP and the TSEQ depend on a frame structure and a random access configuration. A preamble format is controlled by higher layer. The RACH preamble is transmitted in a UL subframe. Transmission of the random access preamble is restricted to a specific time resource and a frequency resource. The resources are referred to as PRACH resources. In order to match an index 0 with a PRB and a subframe of a lower number in a radio frame, the PRACH resources are numbered in an ascending order of PRBs in subframe numbers in the radio frame and frequency domain. Random access resources are defined according to a PRACH configuration index (refer to 3GPP TS 36.211 standard document). The RACH configuration index is provided by a higher layer signal (transmitted by an eNB).

In the LTE/LTE-A system, a subcarrier spacing for a random access preamble (i.e., RACH preamble) is regulated by 1.25 kHz and 7.5 kHz for preamble formats 0 to 3 and a preamble format 4, respectively (refer to 3GPP TS 36.211).

<OFDM Numerology>

A New RAT system adopts an OFDM transmission scheme or a transmission scheme similar to the OFDM transmission scheme. The New RAT system may use different OFDM parameters from LTE OFDM parameters. Or the New RAT system may follow the numerology of legacy LTE/LTE-A but have a larger system bandwidth (e.g., 100 MHz). Or one cell may support a plurality of numerologies. That is, UEs operating with different numerologies may co-exist within one cell.

<Subframe Structure>

In the 3GPP LTE/LTE-A system, a radio frame is 10 ms (307200 Ts) long, including 10 equal-size subframes (SFs). The 10 SFs of one radio frame may be assigned numbers. Ts represents a sampling time and is expressed as Ts=1/(2048*15 kHz). Each SF is 1 ms, including two slots. The 20 slots of one radio frame may be sequentially numbered from 0 to 19. Each slot has a length of 0.5 ms. A time taken to transmit one SF is defined as a transmission time interval (TTI). A time resource may be distinguished by a radio frame number (or radio frame index), an SF number (or SF index), a slot number (or slot index), and so on. A TTI refers to an interval in which data may be scheduled. In the current LTE/LTE-A system, for example, there is a UL grant or DL grant transmission opportunity every 1 ms, without a plurality of UL/DL grant opportunities for a shorter time than 1 ms. Accordingly, a TTI is 1 ms in the legacy LTE/LTE-A system.

FIG. 4 illustrates an exemplary slot structure available in the new radio access technology (NR).

To minimize a data transmission delay, a slot structure in which a control channel and a data channel are multiplexed in time division multiplexing (TDM) is considered in 5th generation (5G) NR.

In FIG. 4, an area marked with slanted lines represents a transmission region of a DL control channel (e.g., PDCCH) carrying DCI, and a black part represents a transmission region of a UL control channel (e.g., PUCCH) carrying UCI. DCI is control information that a gNB transmits to a UE, and may include information about a cell configuration that a UE should know, DL-specific information such as DL scheduling, and UL-specific information such as a UL grant. Further, UCI is control information that a UE transmits to a gNB. The UCI may include an HARQ ACK/NACK report for DL data, a CSI report for a DL channel state, a scheduling request (SR), and so on.

In FIG. 4, symbols with symbol index 1 to symbol index 12 may be used for transmission of a physical channel (e.g., PDSCH) carrying DL data, and also for transmission of a physical channel (e.g., PUSCH) carrying UL data. According to the slot structure illustrated in FIG. 2, as DL transmission and UL transmission take place sequentially in one slot, transmission/reception of DL data and reception/transmission of a UL ACK/NACK for the DL data may be performed in the one slot. As a consequence, when an error is generated during data transmission, a time taken for a data retransmission may be reduced, thereby minimizing the delay of a final data transmission.

In this slot structure, a time gap is required to allow a gNB and a UE to switch from a transmission mode to a reception mode or from the reception mode to the transmission mode. For the switching between the transmission mode and the reception mode, some OFDM symbol corresponding to a DL-to-UL switching time is configured as a guard period (GP) in the slot structure.

In the legacy LTE/LTE-A system, a DL control channel is multiplexed with a data channel in TDM, and a control channel, PDCCH is transmitted distributed across a total system band. In NR, however, it is expected that the bandwidth of one system will be at least about 100 MHz, which makes it inviable to transmit a control channel across a total band. If a UE monitors the total band to receive a DL control channel, for data transmission/reception, this may increase the battery consumption of the UE and decrease efficiency. Therefore, a DL control channel may be transmitted localized or distributed in some frequency band within a system band, that is, a channel band in the present disclosure.

In the NR system, a basic transmission unit is a slot. A slot duration includes 14 symbols each having a normal cyclic prefix (CP), or 12 symbols each having an extended CP. Further, a slot is scaled in time by a function of a used subcarrier spacing. That is, as the subcarrier spacing increases, the length of a slot decreases. For example, given 14 symbols per slot, if the number of slots in a 10-ms frame is 10 for a subcarrier spacing of 15 kHz, the number of slots is 20 for a subcarrier spacing of 30 kHz, and 40 for a subcarrier spacing of 60 kHz. As the subcarrier spacing increases, the length of an OFDM symbol decreases. The number of OFDM symbols per slot is different depending on the normal CP or the extended CP, and does not change according to a subcarrier spacing. The basic time unit for LTE, Ts is defined as 1/(15000*2048) seconds, in consideration of the basic 15-kHz subcarrier spacing and a maximum FFT size of 2048. Ts is also a sampling time for the 15-kHz subcarrier spacing. In the NR system, many other subcarrier spacings than 15 kHz are available, and since a subcarrier spacing is inversely proportional to a corresponding time length, an actual sampling time Ts corresponding to subcarrier spacings larger than 15 kHz becomes shorter than 1/(15000*2048) seconds. For example, the actual sampling time for the subcarrier spacings of 30 kHz, 60 kHz, and 120 kHz may be 1/(2*15000*2048) seconds, 1/(4*15000*2048) seconds, and 1/(8*15000*2048) seconds, respectively.

<Analog Beamforming>

For a 5G mobile communication system under discussion, a technique of using an ultra-high frequency band, that is, a millimeter frequency band at or above 6 GHz is considered in order to transmit data to a plurality of users at a high transmission rate in a wide frequency band. The 3GPP calls this technique NR, and thus a 5G mobile communication system will be referred to as an NR system in the present disclosure. However, the millimeter frequency band has the frequency property that a signal is attenuated too rapidly according to a distance due to the use of too high a frequency band. Accordingly, the NR system using a frequency band at or above at least 6 GHz employs a narrow beam transmission scheme in which a signal is transmitted with concentrated energy in a specific direction, not omni-directionally, to thereby compensate for the rapid propagation attenuation and thus overcome the decrease of coverage caused by the rapid propagation attenuation. However, if a service is provided by using only one narrow beam, the service coverage of one gNB becomes narrow, and thus the gNB provides a service in a wideband by collecting a plurality of narrow beams.

As a wavelength becomes short in the millimeter frequency band, that is, millimeter wave (mmW) band, it is possible to install a plurality of antenna elements in the same area. For example, a total of 100 antenna elements may be installed at (wavelength) intervals of 0.5 lamda in a 30-GHz band with a wavelength of about 1cm in a two-dimensional (2D) array on a 5 by 5 cm panel. Therefore, it is considered to increase coverage or throughput by increasing a beamforming gain through use of a plurality of antenna elements in mmW.

To form a narrow beam in the millimeter frequency band, a beamforming scheme is mainly considered, in which a gNB or a UE transmits the same signals with appropriate phase differences through multiple antennas, to thereby increase energy only in a specific direction. Such beamforming schemes include digital beamforming for generating a phase difference between digital baseband signals, analog beamforming for generating a phase difference between modulated analog signals by using a time delay (i.e., a cyclic shift), and hybrid beamforming using both digital beamforming and analog beamforming. If a TXRU is provided per antenna element to enable control of transmission power and a phase per antenna, independent beamforming per frequency resource is possible. However, installation of TXRUs for all of about 100 antenna elements is not effective in terms of cost. That is, to compensate for rapid propagation attenuation in the millimeter frequency band, multiple antennas should be used, and digital beamforming requires as many RF components (e.g., digital to analog converters (DACs), mixers, power amplifiers, and linear amplifiers) as the number of antennas. Accordingly, implementation of digital beamforming in the millimeter frequency band faces the problem of increased cost of communication devices. Therefore, in the case where a large number of antennas are required as in the millimeter frequency band, analog beamforming or hybrid beamforming is considered. In analog beamforming, a plurality of antenna elements are mapped to one TXRU, and the direction of a beam is controlled by an analog phase shifter. A shortcoming with this analog beamforming scheme is that frequency selective beamforming (BF) cannot be provided because only one beam direction can be produced in a total band. Hybrid BF stands between digital BF and analog BF, in which B TXRUs fewer than Q antenna elements are used. In hybrid BF, the directions of beams transmittable at the same time is limited to or below B although the number of beam directions is different according to connections between B TXRUs and Q antenna elements.

Figure 5:
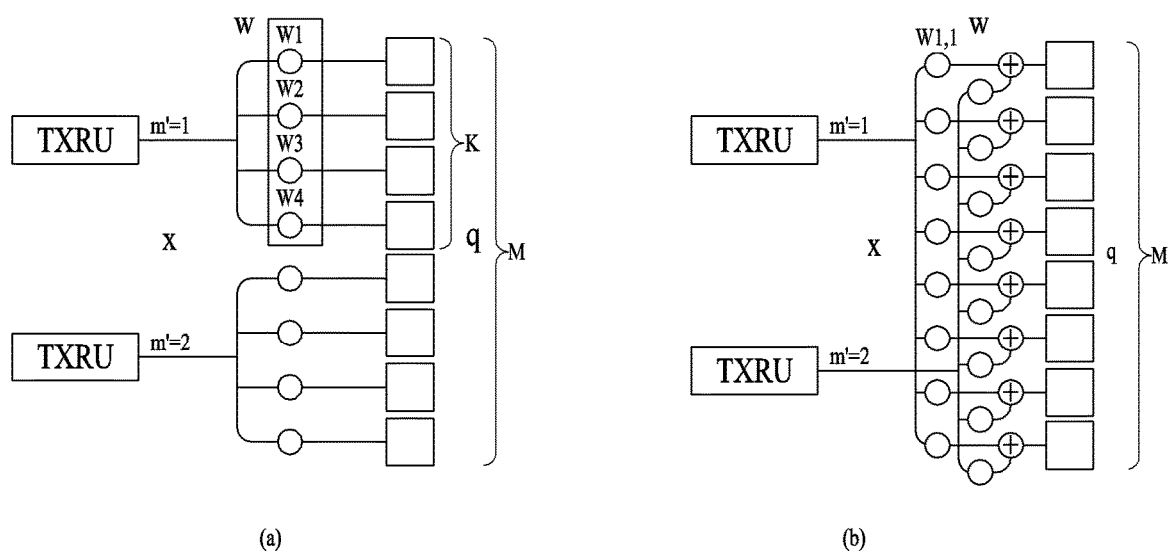
FIG. 5 is a view illustrating exemplary connection schemes between transceiver units (TXRUs) and antenna elements.

FIG. 5 is a view illustrating exemplary connection schemes between TXRUs and antenna elements.

(a) of FIG. 5 illustrates connection between a TXRU and a sub-array. In this case, an antenna element is connected only to one TXRU. In contrast, (b) of FIG. 5 illustrates connection between a TXRU and all antenna elements. In this case, an antenna element is connected to all TXRUs. In FIG. 5, W represents a phase vector subjected to multiplication in an analog phase shifter. That is, a direction of analog beamforming is determined by W. Herein, CSI-RS antenna ports may be mapped to TXRUs in a one-to-one or one-to-many correspondence.

As mentioned before, since a digital baseband signal to be transmitted or a received digital baseband signal is subjected to a signal process in digital beamforming, a signal may be transmitted or received in or from a plurality of directions on multiple beams. In contrast, in analog beamforming, an analog signal to be transmitted or a received analog signal is subjected to beamforming in a modulated state. Thus, signals cannot be transmitted or received simultaneously in or from a plurality of directions beyond the coverage of one beam. A gNB generally communicates with multiple users at the same time, relying on the wideband transmission or multiple antenna property. If the gNB uses analog BF or hybrid BF and forms an analog beam in one beam direction, the gNB has no way other than to communicate only with users covered in the same analog beam direction in view of the nature of analog BF. A later-described RACH resource allocation and gNB resource utilization scheme according to the present disclosure is proposed by reflecting limitations caused by the nature of analog BF or hybrid BF.

<Hybrid Analog Beamforming>

Figure 6:
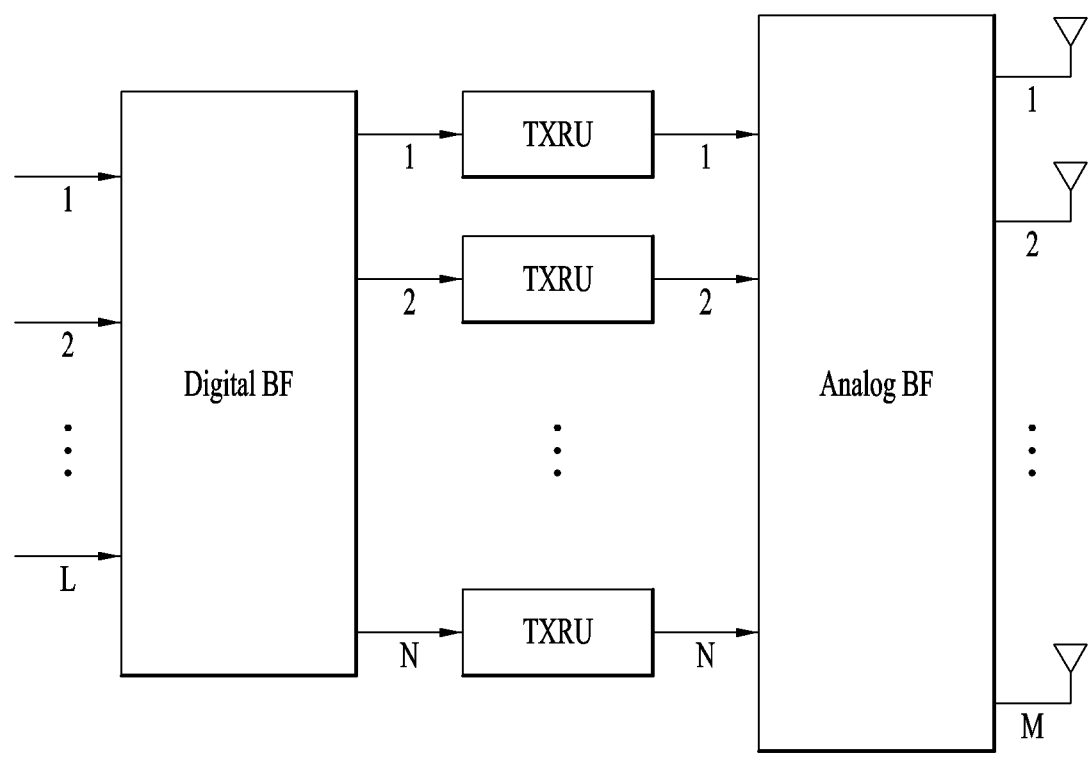
FIG. 6 is a view abstractly illustrating a hybrid beamforming structure in terms of TXRUs and physical antennas.

FIG. 6 abstractly illustrates a hybrid beamforming structure in terms of TXRUs and physical antennas.

For the case where multiple antennas are used, hybrid BF with digital BF and analog BF in combination has emerged. Analog BF (or RF BF) is an operation of performing precoding (or combining) in an RF unit. Due to precoding (combining) in each of a baseband unit and an RF unit, hybrid BF offers the benefit of performance close to the performance of digital BF, while reducing the number of RF chains and the number of DACs (or analog to digital converters (ADCs). For the convenience' sake, a hybrid BF structure may be represented by N TXRUs and M physical antennas. Digital BF for L data layers to be transmitted by a transmission end may be represented as an N-by-N matrix, and then N converted digital signals are converted to analog signals through TXRUs and subjected to analog BF represented as an M-by-N matrix. In FIG. 6, the number of digital beams is L, and the number of analog beams is N. Further, it is considered in the NR system that a gNB is configured to change analog BF on a symbol basis so as to more efficiently support BF for a UE located in a specific area. Further, when one antenna panel is defined by N TXRUs and M RF antennas, introduction of a plurality of antenna panels to which independent hybrid BF is applicable is also considered. As such, in the case where a gNB uses a plurality of analog beams, a different analog beam may be preferred for signal reception at each UE. Therefore, a beam sweeping operation is under consideration, in which for at least an SS, system information, and paging, a gNB changes a plurality of analog beams on a symbol basis in a specific slot or SF to allow all UEs to have reception opportunities.

Figure 7:
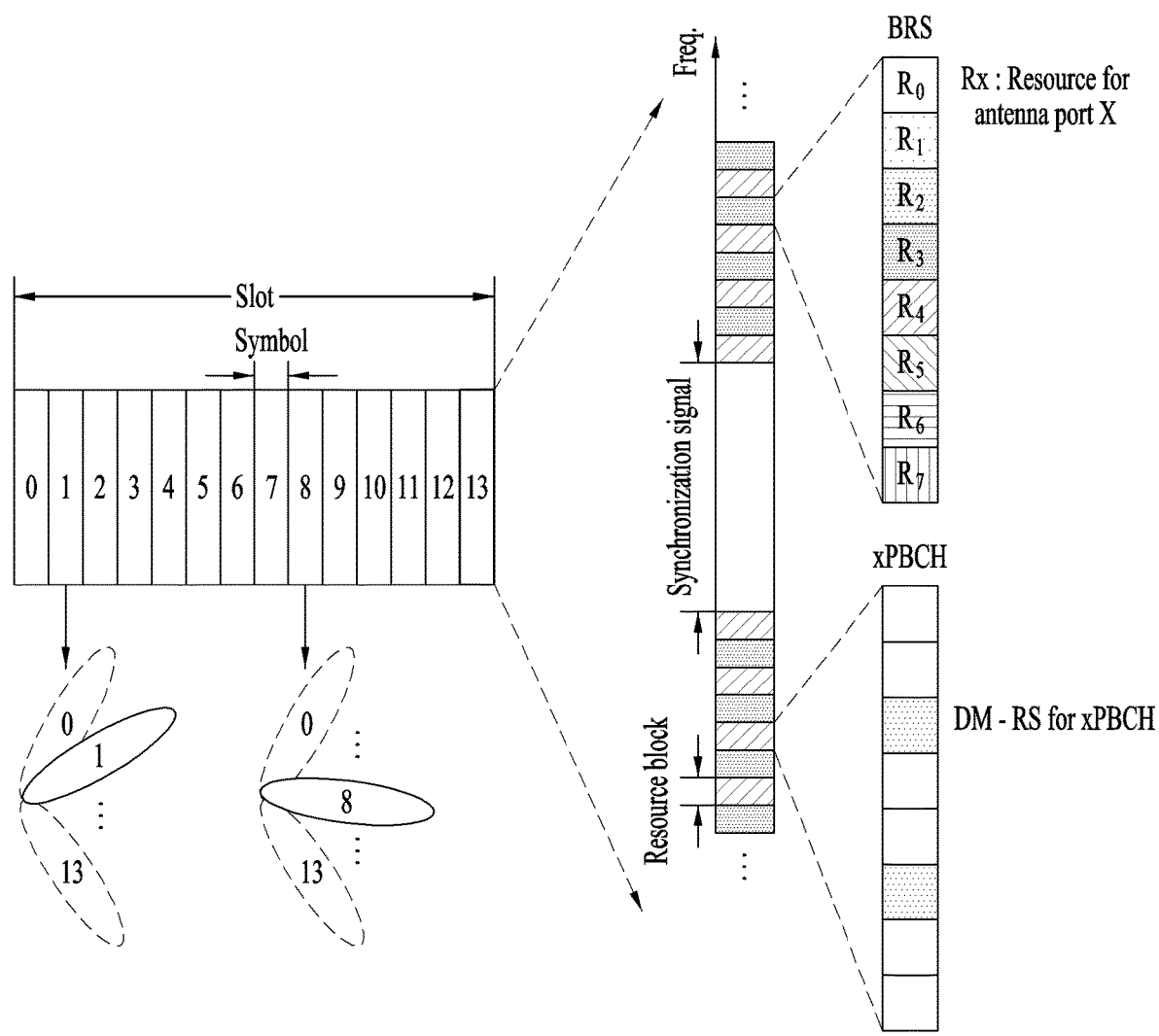
FIG. 7 is a view illustrating beam sweeping for a synchronization signal and system information during downlink (DL) transmission.

FIG. 7 is a view illustrating beam sweeping for an SS and system information during DL transmission. In FIG. 7, physical resources or a physical channel which broadcasts system information of the New RAT system is referred to as an xPBCH. Analog beams from different antenna panels may be transmitted simultaneously in one symbol, and introduction of a beam reference signal (BRS) transmitted for a single analog beam corresponding to a specific antenna panel as illustrated in FIG. 7 is under discussion in order to measure a channel per analog beam. BRSs may be defined for a plurality of antenna ports, and each antenna port of the BRSs may correspond to a single analog beam. Unlike the BRSs, the SS or the xPBCH may be transmitted for all analog beams included in an analog beam group so that any UE may receive the SS or the xPBCH successfully.

Figure 8:
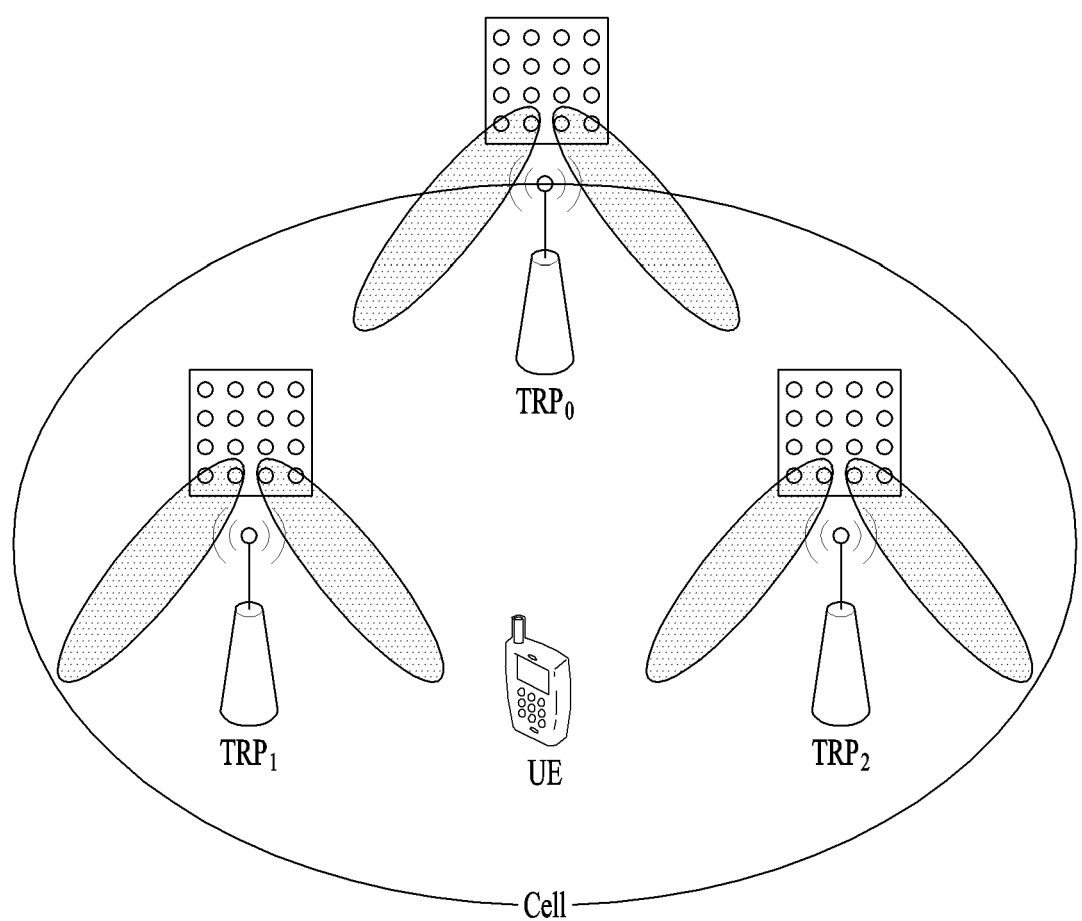
FIG. 8 is a view illustrating an exemplary cell in an NR system.

FIG. 8 is a view illustrating an exemplary cell in the NR system.

Referring to FIG. 8, compared to a wireless communication system such as legacy LTE in which one eNB forms one cell, configuration of one cell by a plurality of TRPs is under discussion in the NR system. If a plurality of TRPs form one cell, even though a TRP serving a UE is changed, seamless communication is advantageously possible, thereby facilitating mobility management for UEs.

Compared to the LTE/LTE-A system in which a PSS/SSS is transmitted omni-directionally, a method for transmitting a signal such as a PSS/SSS/PBCH through BF performed by sequentially switching a beam direction to all directions at a gNB applying mmWave is considered. The signal transmission/reception performed by switching a beam direction is referred to as beam sweeping or beam scanning. In the present disclosure, "beam sweeping" is a behavior of a transmission side, and "beam scanning" is a behavior of a reception side. For example, if up to N beam directions are available to the gNB, the gNB transmits a signal such as a PSS/SSS/PBCH in the N beam directions. That is, the gNB transmits an SS such as the PSS/SSS/PBCH in each direction by sweeping a beam in directions available to or supported by the gNB. Or if the gNB is capable of forming N beams, the beams may be grouped, and the PSS/SSS/PBCH may be transmitted/received on a group basis. One beam group includes one or more beams. Signals such as the PSS/SSS/PBCH transmitted in the same direction may be defined as one SS block (SSB), and a plurality of SSBs may exist in one cell. If a plurality of SSBs exist, an SSB index may be used to identify each SSB. For example, if the PSS/SSS/PBCH is transmitted in 10 beam directions in one system, the PSS/SSS/PBCH transmitted in the same direction may form an SSB, and it may be understood that 10 SSBs exist in the system. In the present disclosure, a beam index may be interpreted as an SSB index.

Hereinafter, a method of generating an SS and a method of indicating time indexes such as an SS index and a half-frame index according to an embodiment of the present disclosure will be described.

Prior to a description of the present disclosure, a "high-order bit" or a "most significant bit (MSB)" represented in the present disclosure may imply a left bit in the arrangement of information bits in which a highest-digit number is placed at a rightmost position. That is, in the arrangement of information bits in which a highest-digit number is placed at a leftmost position, the "high-order bit" or the "MSB" may be interpreted as having the same meaning as a least significant bit (LSB), which is a bit giving a units value for determining whether a value indicated by the information bits is even or odd of an integer.

Similarly, a "low-order bit" or an "LSB" may imply a right bit in the arrangement of information bits in which a highest-digit number is placed at a rightmost position. In other words, in the arrangement of information bits in which a highest-digit number is placed at a leftmost position, the "low-order bit" or the "LSB" may be interpreted as having the same meaning as the MSB.

For example, in the description of the disclosure which will be given later, there is an expression of "the UE acquires high-order N bits (e.g., S0, S1, and S2) of SFN information and acquires the other (10-N) bits (e.g., S3 to S9) of the SFN information from PBCH content, thereby configuring a total of 10 bits of the SFN information.

In this case, in an arrangement in which a highest-digit number is placed at a rightmost position in an order of an information bit stream, i.e., in an information bit stream configured as (S0 S1 S2 S3 . . . S9), "high-order N bits" means left N bits (e.g., S0 S1 S2) and "the other (10-N) bits" means right (10-N) bits (e.g., S3 to S9). This may be expressed as follows using an LSB and an MSB. In an information bit stream represented in order of (S9 S8 S7 . . . S1 S0), a bit steam using N LSBs may be expressed in order of N bits (e.g., S2 S1 S0) and a bit stream corresponding to "the other (10-N) bits (e.g., S3 to S9)" using (10-N) MSBs may be expressed in order of (S9 S8 S7 . . . S3).

1. SSB Configuration

If a PSS is positioned at a front part of an SSB when subcarrier spacings of 120 kHz and 240 kHz are used, a problem may arise in an automatic gain control (AGC) operation of a UE. That is, in the subcarrier spacings of 120 kHz and 240 kHz, an NR-PSS may not be correctly detected due to the AGC operation. Therefore, modification of an SSB configuration may be considered as in the following two embodiments.

(Method 1) PBCH-PSS-PBCH-SSS
(Method 2) PBCH-PSS-PBCH-SSS-PBCH

Namely, a PBCH symbol may be positioned at a start part of the SSB and may be used as a dummy symbol for the AGC operation so that the AGC operation of the UE may be smoothly performed.

2. SS Burst Set Configuration

Figure 9:
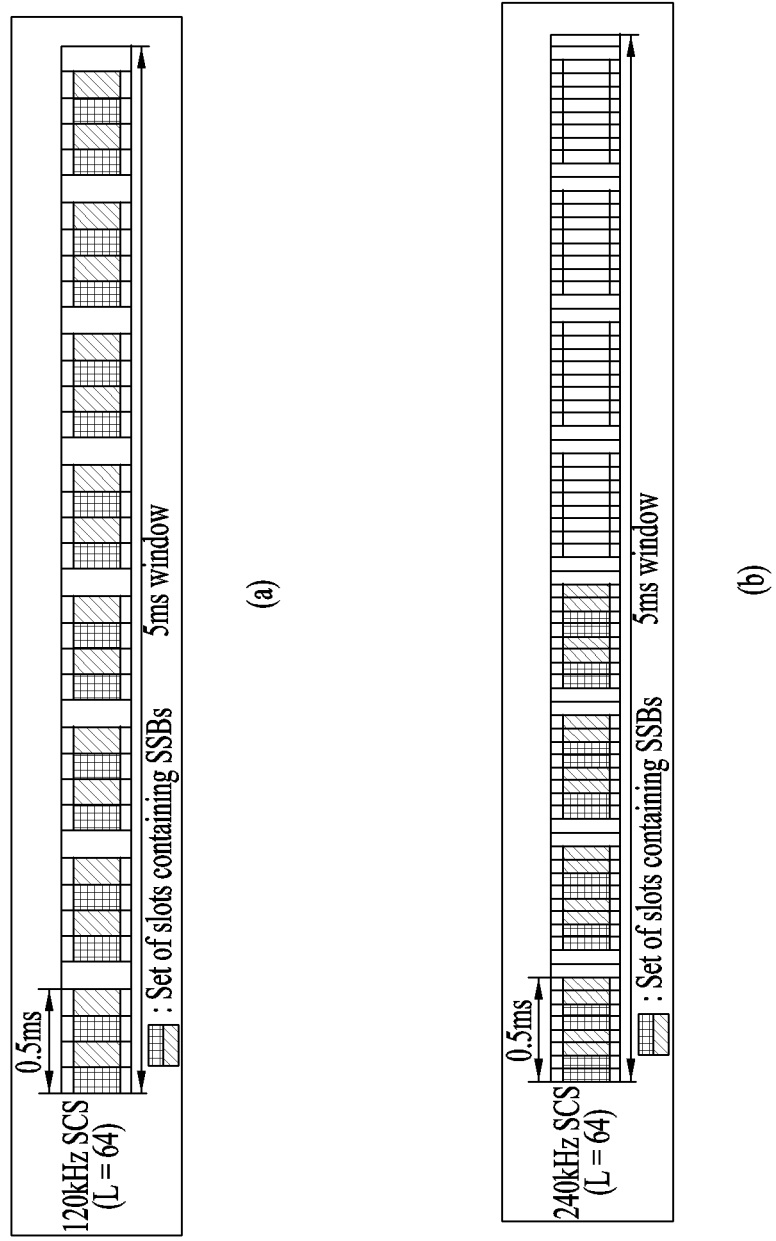
FIGS. 9 to 12 are views for explaining a configuration method of a synchronization signal burst and a synchronization signal burst set.

FIG. 9 illustrates an SS burst set configuration when subcarrier spacings for arranging an SSB are 120 kHz and 240 kHz. Referring to FIG. 9, the SS burst set is configured with a predetermined duration being emptied in units of 4 SS bursts when the subcarrier spacings are 120 kHz and 240 kHz. That is, the SSB is arranged in units of 0.5 ms with a symbol duration for UL transmission of 0.125 ms being emptied.

However, in the frequency range above 60 GHz, a subcarrier spacing of 60 kHz may be used for data transmission. That is, as illustrated in FIG. 10, in NR, a subcarrier spacing of 60 kHz for data transmission and a subcarrier spacing of 120 kHz or 240 kHz for SSB transmission may be multiplexed.

Figure 10:
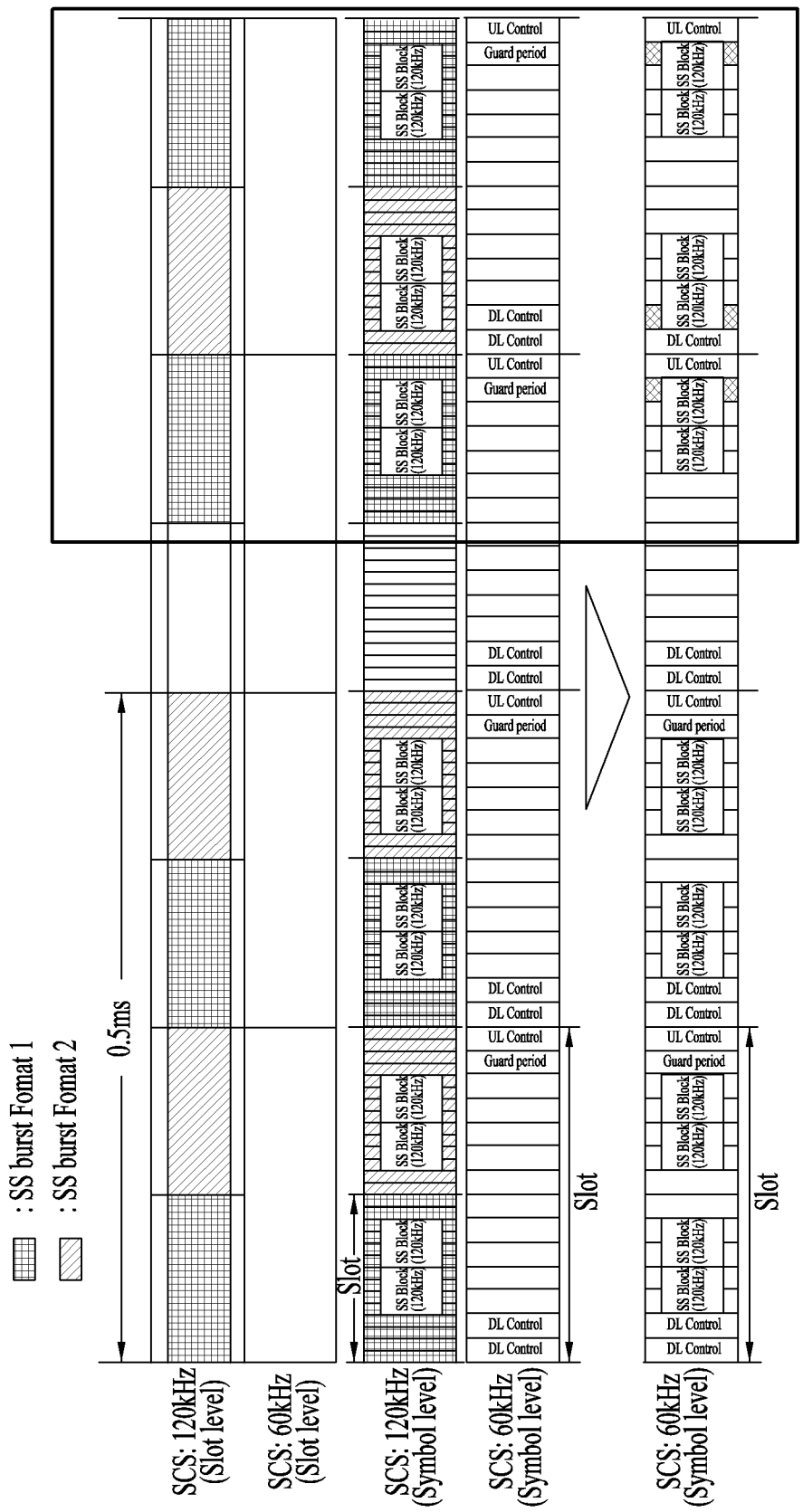

Meanwhile, referring to a part indicated by a box in FIG. 10, while the SSB of the 120-kHz subcarrier spacing and data of the 60-kHz subcarrier spacing are multiplexed, it may be appreciated that collision or overlap occurs between an SSB of the 120-kHz subcarrier spacing and a GP and a DL control region of the 60-kHz subcarrier spacing. Since it is desirable that collision between the SSB and the DL/UL control region be avoided if possible, configurations of the SS burst and the SS burst set need to be modified.

The present disclosure proposes two embodiments as a modification of the SS burst configuration to solve the above problem.

Figure 11:
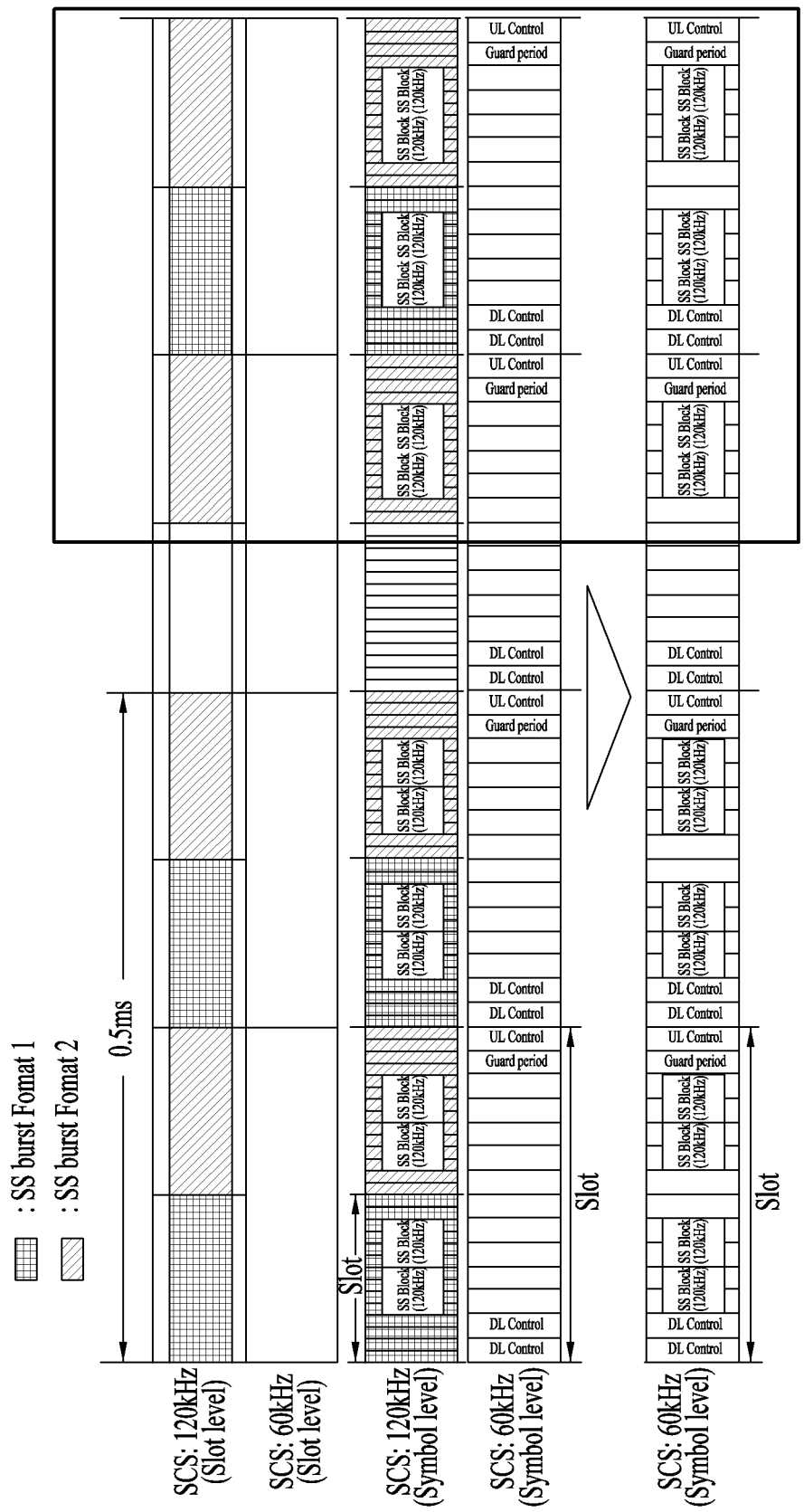

In the first embodiment, positions of SS burst format 1 and SS burst format 2 are changed as illustrated in FIG. 11. That is, SS burst format 1 and SS burst format 2 in the box of FIG. 10 interchange so as not to generate collision between the SSB and the DL/UL control region. In other words, SS burst format 1 is located at a front part of a slot of the 60-kHz subcarrier spacing and SS burst format 2 is located at a rear part of the slot of the 60-kHz subcarrier spacing.

The above-described embodiment may be summarized as follows.

1) 120-KHz Subcarrier Spacing

The first OFDM symbols of candidate SS/PBCH blocks have indexes $\{4, 8, 16, 20, 32, 36, 44, 48\}+70*n$. For carrier frequencies higher than 6 GHz, n=0, 2, 4, 6.

The first OFDM symbols of the candidate SS/PBCH blocks have indexes $\{2, 6, 18, 22, 30, 34, 46, 50\}+70*n$. For carrier frequencies higher than 6 GHz, n=1, 3, 5, 7.

2) 240-KHz Subcarrier Spacing

The first OFDM symbols of the candidate SS/PBCH blocks have indexes $\{8, 12, 16, 20, 32, 36, 40, 44, 64, 68, 72, 76, 88, 92, 96, 100\}+140*n$. For carrier frequencies higher than 6 GHz, n=0, 2.

The first OFDM symbols of the candidate SS/PBCH blocks have indexes $\{4, 8, 12, 16, 36, 40, 44, 48, 60, 64, 68, 72, 92, 96, 100, 104\}+140*n$. For carrier frequencies higher than 6 GHz, n=1, 3.

Figure 12:
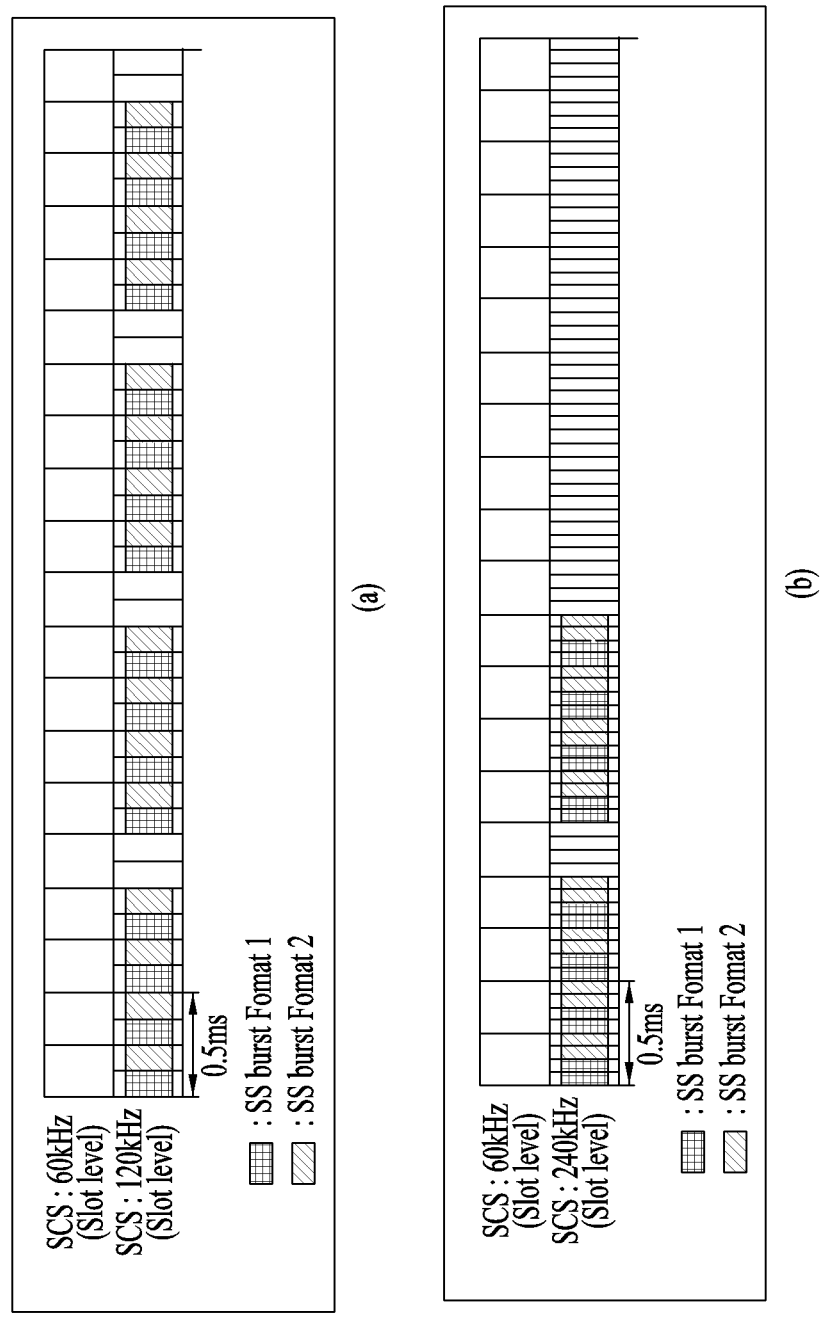

In the second embodiment, the SS burst set configuration is changed as illustrated in FIG. 12. That is, an SS burst set may be configured to align, i.e., match, a start boundary of the SS burst set and a start boundary of a slot of a 60-kHz subcarrier spacing.

Specifically, an SS burst is configured by SSBs which are locally arranged during 1 ms. Therefore, during 1 ms, an SS burst of a 120-kHz subcarrier spacing includes 16 SSBs and an SS burst of a 240-kHz subcarrier spacing includes 32 SSBs. If the SS burst is configured in this way, one slot is allocated, as a gap, between SS bursts based on the 60-kHz subcarrier spacing.

The above-described second embodiment is summarized as follows.

1) 120-KHz Subcarrier Spacing

The first OFDM symbols of the candidate SS/PBCH blocks have indexes $\{4, 8, 16, 20\}+28*n$. For carrier frequencies higher than 6 GHz, n=0, 1, 2, 3, 5, 6, 7, 8, 10, 11, 12, 13, 15, 16, 17, 18.

2) 240 KHz Subcarrier Spacing

The first OFDM symbols of the candidate SS/PBCH blocks have indexes $\{8, 12, 16, 20, 32, 36, 40, 44\}+56*n$. For carrier frequencies higher than 6 GHz, n=0, 1, 2, 3, 5, 6, 7, 8.

3. Indication of Actually Transmitted SS/PBCH Block within 5-ms Duration

Meanwhile, the number of candidates for SSB transmission may be limited according to a network environment. For example, the number of candidates may differ according to a subcarrier spacing with which an SSB is disposed. In this case, the position of an actually transmitted SSB may be indicated to a connected/idle mode UE. An actually transmitted SS/PBCH block indication indicating the position of an actually transmitted SSB may be used for a serving cell for the purpose of resource utilization, e.g., rate matching, and may be used for a neighbor cell for the purpose of measurement associated with a corresponding resource.

In association with the serving cell, if the UE is capable of accurately recognizing an SSB which is not transmitted, the UE may identify that the UE can receive other information such as paging or data through a candidate resource of the SSB which is not transmitted. For flexibility of such a resource, it is necessary to accurately indicate an SSB which is actually transmitted in a serving cell.

That is, since other information such as paging or data cannot be received in a resource in which the SSB is transmitted, the UE needs to recognize an SSB candidate corresponding to the SSB which is not actually transmitted in order to raise resource use efficiency by receiving other data or other signals through the SSB which is not actually transmitted.

Therefore, in order to accurately indicate the SSB which is actually transmitted in the serving cell, full bitmap information of 4, 8, or 64 bits is needed. In this case, the size of bits included in a bitmap may be determined according to the maximum number of SSBs which can be maximally transmitted in each frequency range. For example, to indicate the SSB which is actually transmitted in a duration of 5 ms, 8 bits are needed in the frequency range from 3 GHz to 6 GHz and 64 bits are needed in the frequency range above 6 GHz.

Bits for the SSB which is actually transmitted in the serving cell may be defined in remaining system information (RMSI) or other system information (OSI). The RMSI/OSI includes configuration information for data or paging. Since the actually transmitted SS/PBCH block indication is associated with a configuration for a DL resource, it may be concluded that the RMSI/OSI includes SSB information.

Meanwhile, the actually transmitted SS/PBCH block indication of the neighbor cell may be required for the purpose of measurement of the neighbor cell. That is, time synchronization information of the neighbor cell needs to be acquired for measurement of the neighbor cell. When an NR system is designed to allow asynchronous transmission between TRPs, even if the time synchronization information of the neighbor cell is indicated, accuracy of the information may differ according to a situation. Therefore, when the time information of the neighbor cell is indicated, it is necessary to determine the unit of the time information as valid information for the UE even under the assumption that asynchronous transmission is performed between TRPs.

Herein, if there are many listed cells, a full bitmap type of indication may excessively increase signaling overhead. Hence, in order to reduce signaling overhead, a variably compressed type of indication may be considered. Meanwhile, even an indication for an SSB that a serving cell transmits may consider a compressed type for the purpose of reducing signaling overhead as well as for the purpose of neighbor cell measurement. In other words, an SSB indication described below may be used to indicate an actually transmitted SSB in the neighbor cell and the serving cell. In addition, according to the above description, although an SS burst may imply a bundle of SSBs included in one slot according to each subcarrier, the SS burst may imply, only in embodiments described below, an SSB group obtained by grouping a predetermined number of SSBs regardless of the slot.

Figure 13:
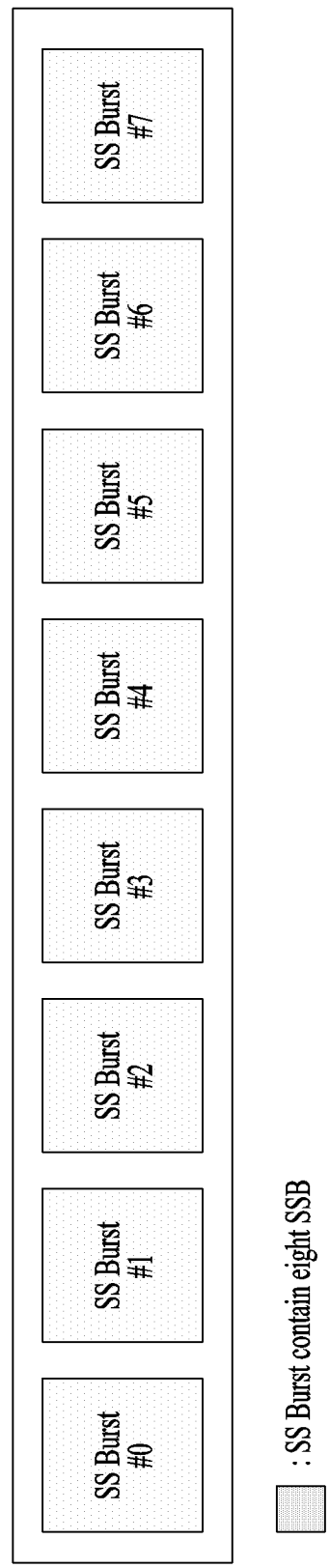
FIGS. 13 to 18 are views illustrating methods of indexing a synchronization signal and methods of indicating a synchronization signal index, a system frame number (SFN), and a half-frame.

One of the embodiments will now be described with reference to FIG. 13. Assuming that the SS burst includes 8 SSBs, a total of 8 SS bursts may be present in a band above 64 GHz in which 64 SSBs may be positioned.

In this case, SSBs are grouped into SS bursts to compress a total bitmap of 64 bits. Instead of 64-bit bitmap information, 8-bit information indicating SS bursts including actually transmitted SSBs may be used. If the 8-bit bitmap information indicates SS burst #0, then SS burst #0 may include one or more actually transmitted SSBs.

Herein, additional information for additionally indicating the number of SSBs transmitted per SS burst to the UE may be considered. As many SSBs as the number of SSBs indicated by the additional information may be locally present in each SS burst.

Therefore, the UE may estimate actually transmitted SSBs by combining the number of actually transmitted SSBs per SS burst, indicated by the additional information, and the bitmap for indicating an SS burst including actually transmitted SSBs.

For example, an indication example of Table 1 below may be assumed.

TABLE 1

| 8 bit bitmap (SS/PBCH burst unit) | The number of actually transmitted SS/PBCH blocks per SS/PBCH burst unit | Full bitmap |
|---|---|---|
| 1 1 0 0 0 0 0 1 | 4 | (11110000) (11110000) (00000000) (00000000) (00000000) (00000000) (00000000) (11110000) |

That is, according to [Table 1], an 8-bit bitmap indicates that SSBs are included in SS bursts #0, #1, and #7 and additional information indicates that 4 SSBs are included in each SS burst. As a result, it may be estimated that SSBs are transmitted at 4 candidate positions of a front part of each of SS bursts #0, #1, and #7.

Unlike the above-described example, the additional information may also be transmitted in a bitmap format so that flexibility of positions at which SSBs are transmitted may be obtained.

For example, a method of indicating information related to SS burst transmission by a bitmap and indicating SSBs transmitted within an SS burst by other bits may be provided.

That is, a total of 64 SSBs are divided into 8 SS bursts (i.e., SSB groups) and which SS burst is used is indicated to the UE by transmitting an 8-bit bitmap. If SS bursts are defined as illustrated in FIG. 13, there is an advantage of arranging an SS burst and a boundary of a slot having a subcarrier spacing of 60 kHz when the SS burst is multiplexed with the slot having a subcarrier spacing of 60 kHz. Therefore, if the bitmap indicates whether an SS burst is used, the UE may recognize whether SSBs are transmitted in units of slots for all subcarrier spacings in the frequency band above 6 GHz.

This example is different from the previously described example in that the additional information is indicated in a bitmap format. Then, since bit map information about 8 SSBs included in each SS burst should be transmitted, 8 bit are needed and the additional information is commonly applied to all SS bursts. For example, if the bitmap information about SS bursts indicates that SS burst #0 and SS burst #1 are used and the additional bitmap information about SSBs indicates that first and fifth SSBs are transmitted in the corresponding SS bursts, then the first and fifth SSBs in both SS burst #0 and SS burst #1 are transmitted so that the total number of actually transmitted SSBs is 4.

Meanwhile, a few neighbor cells may not be included in a cell list. The neighbor cells not included in the cell list use a default format for an actually transmitted SSB. By using the default format, the UE may measure the neighbor cells not included in the list. In this case, the default format may be predefined or may be configured by a network.

Meanwhile, when information about SSBs which are actually transmitted in the serving cell collides with information about SSBs which are actually transmitted in the neighbor cell, the UE may prioritize the information about the SSBs which are actually transmitted in the serving cell, thereby acquiring the information about the actually transmitted SSBs.

That is, upon receiving the information about actually transmitted SSBs in a full bitmap format and a grouping format, the UE may prioritize the information of the full bitmap format to use the information for SSB reception because there is a high possibility that the information of the full bitmap format has high accuracy.

4. System Frame Number (SFN) and Half-Frame Boundary

Low-order N bits of SFN information are transmitted in a PBCH payload and high-order M bits of the SFN information are transmitted in a PBCH scrambling sequence. Meanwhile one MSB among the high-order M bits of the SFN information may be transmitted through variation in a time/frequency position of a PBCH DMRS, an NR-SSS, or an SSB. In addition, information about a radio half-frame (5 ms) boundary may be transmitted through variation in the time/frequency position of the PBCH DMRS, the NR-SSS, or the SSB.

Herein, a "high-order bit" or an "MSB" implies a left bit in an information bit stream in which a highest-digit number is placed at a rightmost position. That is, in the arrangement of the information bit stream in which a highest-digit number is placed at a leftmost position, the "high-order bit" or the "MSB" may be interpreted as having the same meaning as an LSB, which is a bit giving a units value for determining whether a value is even or odd of an integer.

In addition, a "low-order bit" or an "LSB" implies a right bit in an information bit stream in which a highest-digit number is placed at a rightmost position. That is, in the arrangement of the information bit stream in which a highest-digit number is placed at a leftmost position, the "low-order bit" or the "LSB" may be interpreted as having the same meaning as the MSB.

Embodiment 1-1

When content that an NR-PBCH included in a specific SSB carries is changed every 80 ms, the NB-PBCH content includes information which is not changed within 80 ms. For example, all SFN information included in the PBCH content is the same within the range of a PBCH TTI (80 ms). For this purpose, low-order 7-bit information among 10-bit SFN information may be included in the PBCH content and high-order 3-bit information indicating a frame boundary (10 ms) may be included in the PBCH scrambling sequence.

Embodiment 1-2

When content that an NR-PBCH included in a specific SSB carries is changed every 80 ms, the NB-PBCH content includes information which is not changed within 80 ms. For example, all SFN information included in the PBCH content is the same within the range of a PBCH TTI (80 ms). To this end, low-order 7-bit information among 10-bit SFN information is included in the PBCH content, low-order 2-bit information among high-order 3-bit information indicating a frame boundary (10 ms) is included in the PBCH scrambling sequence, and 1-MSB information is transmitted using other signals or channels which are distinguished from a part associated with PBCH channel coding such as the PBCH content, CRC, the scrambling sequence, etc. For example, the PBCH DMRS may be used as other signals which are distinguished from the part associated with PBCH channel coding and may use, as information, a DMRS sequence, a DMRS RE position, DMRS sequence-to-RE mapping change, symbol position change within an SSB, and frequency position change of the SSB.

Specifically, when the DMRS sequence is used, a method using a difference in phase between two OFDM symbols in which a DMRS is transmitted, for example, a method of using an orthogonal cover code, may be considered. In addition, when the DMRS sequence is used, a method of changing an initial value may be considered. Specifically, if an initial value of one of two m-sequences used for a Gold sequence is fixed and an initial value of the other one of the two m-sequences is changed using a cell ID and other information, a method of changing an initial value using information that is desired to be transmitted in the m-sequence using the fixed initial value may be introduced.

More specifically, changing two initial values in units of 10 ms within the range of 20 ms may be considered by introducing another initial value (e.g. [0 1 0 . . . 0]) in addition to an already fixed initial value (e.g., [1 0 0 . . . 0]) according to one bit indicating 10-ms boundary information. As another method, one m-sequence may use a fixed initial value and information desired to be transmitted may be added to an initial value of another m-sequence.

When the DMRS RE position is used, a V-shift method of changing a frequency-axis position of the DMRS according to information may be applied. Specifically, when the DMRS is transmitted at 0 ms and 10 ms within the range of 20 ms, RE positions are differently arranged. If the DMRS is arranged in every 4 REs, a method of shifting the DMRS RE position in units of 2 REs may be introduced.

In addition, a method of changing PBCH DMRS sequence-to-RE mapping may be applied. Specifically, in the case of 0 ms, the sequence is mapped starting from the first RE and, in the case of 10 ms, another sequence mapping method is applied. For example, a method of reversely mapping the sequence to the first RE, mapping the sequence starting from a middle RE of the first OFDM symbol, or mapping the sequence starting from the first RE of the second OFDM symbol may be applied. In addition, a method of changing an arrangement order of a PSS-PBCH-SSS-PBCH within an SSB to another arrangement may be considered. For example, while an arrangement order of PBCH-PSS-SSS-PBCH may be basically applied, another arrangement method may be applied at 0 ms and 10 ms. In addition, a method of changing an RE position to which PBCH data is mapped within the SSB may be applied.

Embodiment 1-3

1-bit information indicating the half-frame boundary may be transmitted using other signals or channels distinguished from the part related to PBCH channel coding such as the PBCH content, the CRC, the scrambling sequence, etc. For example, the PBCH DMRS may be used as other signals distinguished from the part related to PBCH channel coding as in Embodiment 1-2 and may use, as information, a DMRS sequence, a DMRS RE position, DMRS sequence-to-RE mapping change, symbol position change within an SSB, and frequency position change of the SSB. Particularly, the PBCH DMRS may be applied when time information is changed at a 0-ms boundary and a 5-ms boundary within the range of 10 ms.

Additionally, for time change information in units of 5 ms within the range of 20 ms, including half-frame boundary information and 1-MSB SFN information, the PBCH DMRS may use, as information, the DMRS sequence, DMRS RE position, DMRS sequence-to-RE mapping change, symbol position change in the SSB, and frequency position change of the SSB as proposed in Embodiment 1-2. The PBCH DMRS may be applied when time information is changed at a boundary of 0, 5, 10, or 15 ms within the range of 20 ms.

Embodiment 1-4

In Embodiment 1-4, a "high-order bit" or an "MSB" implies a left bit in an information bit stream in which a highest-digit number is placed at a rightmost position. That is, in the arrangement of the information bit stream in which a highest-digit number is placed at a leftmost position, the "high-order bit" or the "MSB" may be interpreted as having the same meaning as an LSB, which is a bit giving a units value for determining whether a value is even or odd of an integer.

In addition, a "low-order bit" or an "LSB" implies a right bit in an information bit stream in which a highest-digit number is placed at a rightmost position. That is, in the arrangement of the information bit stream in which a highest-digit number is placed at a leftmost position, the "low-order bit" or the "LSB" may be interpreted as having the same meaning as the MSB.

When one PBCH consists of a total of N REs, M (<N) REs are allocated for PBCH data transmission. If quadrature phase shift keying (QPSK) modulation is used, the length of a scrambling sequence is 2*M. To generate L scrambling sequences having different 2*M lengths, a long sequence of a total length of L*2*M is generated and is divided into sequences in units of 2*M to generate the L Sequences. A pseudo-noise (PN) sequence may be used as a scrambling sequence and a Gold sequence and an M sequence may also be used. Specifically, a length-31 Gold sequence may be used. As a value for initializing the PN sequence, at least a cell ID may be used and an SSB index obtained from a PBCH DMRS may be additionally used. If a slot number or an OFDM symbol are derived from the SSB index, the slot number/OFDM symbol number may be used. Additionally, radio half-frame boundary information may also be used as the initialization value. In addition, when partial bits among SFN information may be acquired as a signal or a channel distinguished from a part related to channel coding, such as content or a scrambling sequence, the SFN information may be used as an initialization value of the scrambling sequence.

The length of the scrambling sequence is determined according to the length of bits transmitted through the scrambling sequence among the SFN information. For example, when 3-bit information among the SFN information is transmitted through the scrambling sequence, 8 states should be expressed. For this purpose, a sequence of a total length of 8*2*M is needed. Similarly, when 2-bit information is transmitted, a sequence of a total length of 2*2*M is needed.

A bit stream including PBCH content and CRC is encoded using a Polar code to generate length-512 encoded bits. The length of the encoded bits is shorter than the length of the scrambling sequence and the bit stream having a length equal to the scrambling sequence is generated by repeating the length-512 encoded bits multiple times. Next, the repeated encoded bits are multiplied by the scrambling sequence and then are subjected to QPSK modulation. A modulated symbol is divided into length-M symbols which are then mapped to PBCH REs.

Figure 14:
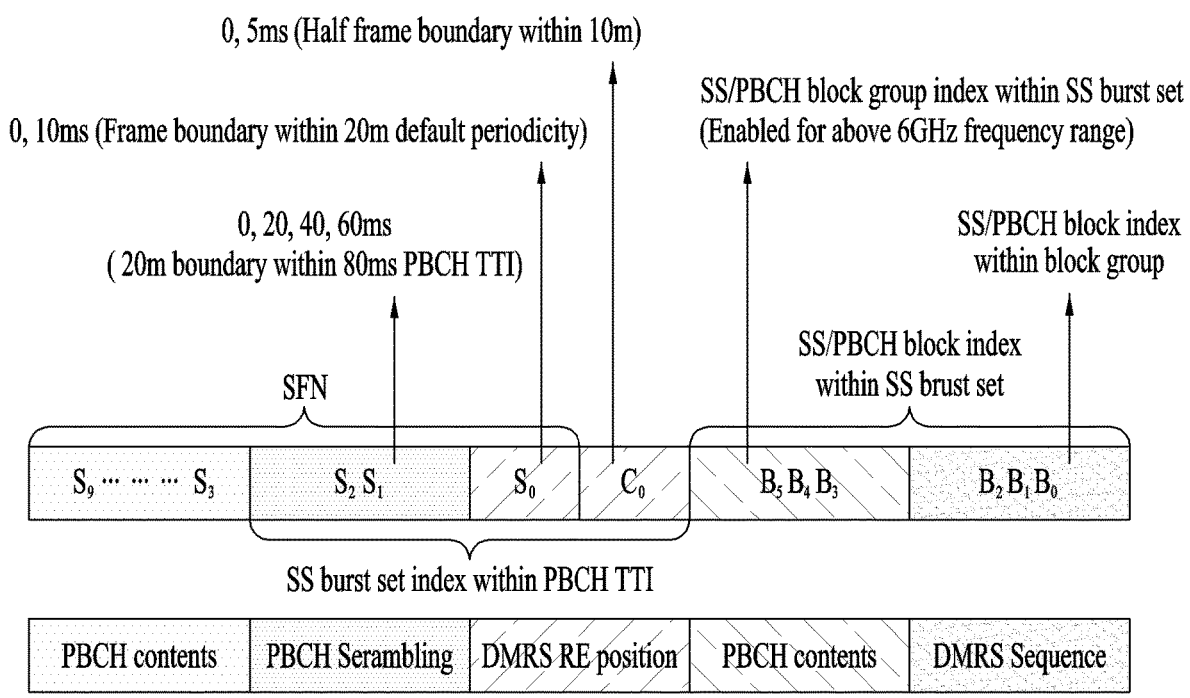

For example, referring to FIG. 14, when 3-bit information among SFN information is transmitted through the scrambling sequence, a length-M modulated symbol sequence is transmitted in units of 10 ms in order to change the scrambling sequence every 10 ms. In this case, modulated symbols transmitted in units of 10 ms are different. When a periodicity of an SS burst set is 5 ms, the same modulated symbol sequence is transmitted during two 5-ms transmission periodicities included in the range of 10 ms. If the UE can acquire the radio half-frame (5 ms) boundary information, the UE may combine information of a PBCH which is transmitted twice in the range of 10 ms and perform blind decoding a total of 8 times to discover 8 scrambling sequences transmitted in units of 10 ms in the range of 80 ms. In this case, the UE acquires half-frame boundary 1-bit information (e.g., C0) by decoding a channel other than the PBCH. Then, the UE acquires high-order N bits (e.g., S0, S1, and S2) of SFN information by performing PBCH blind decoding and acquires the other (10-N) bits (e.g., S3 to S9) of the SFN information from PBCH content, thereby configuring a total of 10 bits of the SFN information.

As another example, when 3-bit information of the SFN information is transmitted through the scrambling sequence and the half-frame boundary information is included in the PBCH content, the same content is included in a transmission periodicity of 10 ms. However, since half-frame boundary 1-bit information differs in PBCH content having a 5-ms offset, different types of content may be transmitted every 5 ms. That is, two types of content are configured due to the half-frame boundary 1-bit information and a gNB encodes the two types of content and performs bit repetition, scrambling, and modulation with respect to each of the two types of content.

If the UE cannot acquire 5-ms boundary information, it is difficult to perform combination of signals transmitted every 5 ms. Instead, the UE equally performs blind decoding of 8 times every 10 ms even in the 5-ms offset. That is, the UE performs blind decoding of at least 8 times to obtain high-order N-bit SFN information (e.g., S0, S1, and S2) and acquires the radio half-frame boundary 1-bit information (e.g., C0) as well as the other (10-N)-bit SFN information (e.g., S3 to S9) from the PBCH content. In other words, the UE acquires time information in units of 5 ms by configuring the obtained bit information.

Similarly, if 2-bit information of the SFN information is transmitted through the scrambling sequence, the scrambling sequence is changed every 20 ms and an equally modulated symbol sequence is transmitted during four 5-ms transmission periodicities included in the range of 20 ms. If the UE can acquire the half fame boundary information and 1-MSB information of the SFN information, the UE may combine 4 PBCHs received in the range of 20 ms and performs blind decoding of 4 times every 20 ms. In this case, although UE reception complexity may increase due to acquisition of the half-frame boundary information and the MSB information of the SFN information, complexity of PBCH blind decoding can be lowered and detection performance can be improved because a PBCH combination of a maximum of 16 times may be performed. In this case, the UE acquires the half-frame boundary 1-bit information (e.g., C0) and the 1-MSB information (e.g., S0) of the SFN information by decoding a channel other than the PBCH.

The UE acquires high-order (N−1)-bit information (e.g., S1 and S2) after the 1-MSB of the SFN information by performing PBCH blind decoding and acquires the other (10-N)-bit SFN information (e.g., S3 to S9) from the PBCH content. Then, the radio half-frame boundary information (e.g., C0) and a total of 10 bits (S0 to S9) of SFN information may be configured. Thus, the acquired time information is provided in units of 5 ms. In this case, a plurality of SSBs may be transmitted in the range of 5 ms and SSB positions in the range of 5 ms may be acquired from the PBCH DMRS and the PBCH content.

Meanwhile, if 2-bit information (e.g., S1 and S2) among the SFN information is transmitted through the scrambling sequence and 1-MSB information (e.g., S0) among the SFN information and the half-frame boundary 1-bit information (e.g., C0) are transmitted by the PBCH content, the PBCH content is changed (e.g., S0 and C0) every 5 ms in the range of 20 ms to generate 4 information bit sets and a channel coding process is performed with respect to each information bit set.

As another example, the 10-bit SFN information and the half-frame boundary 1-bit information may be included in the PBCH content. Then, the PBCH content except for high-order 3 bits (e.g., S0, S1, and S2) of the SFN information and one bit of the half-frame boundary information (e.g., C0) is not changed during a PBCH TTI (e.g., 80 ms). However, the high-order 3 bits (e.g., S0, S1, and S2) of the SFN information and the one bit of the half-frame boundary information (e.g., C0) are in units of 5 ms. Hence, 16 PBCH information bit sets may be generated in a duration of the PBCH TTI (e.g., 80 ms).

In addition, a scrambling sequence is applied to information bits except for some bits (e.g., S1 and S2) of SFN information in information bits included in a PBCH payload and to CRC. The scrambling sequence may use a PN sequence such as a Gold sequence. The scrambling sequence may be initialized by a cell ID.

Meanwhile, when the number of scrambled bits is M, a sequence of a length of M*N is generated and the length-M*N sequence is divided into N length-M sequences so as not to overlap elements of the sequences. Each of the N length-M sequence is used as a scrambling sequence for each of the N sequences as described in the following examples according to order of changing some bits (e.g., S1 and S2) among the SFN information.

(Examples)
When (S2,S1)=(0,0), a sequence stream of 0 to (M−1) is used as the scrambling sequence
When (S2,S1)=(0,1), a sequence stream of M to 2M−1 is used as the scrambling sequence
When (S2,S1)=(1,0), a sequence stream of 2M to 3M−1 is used as the scrambling sequence
When (S2,S1)=(1,1), a sequence stream of 3M to 4M−1 is used as the scrambling sequence According to the above description, among 16 PBCH information bit sets generated in a duration of the PBCH TTI (e.g., 80 ms), the same scrambling sequence is used in 4 PBCH information bit sets transmitted in the range of 20 ms and a scrambling sequence different from the scrambling sequence used for the previous 4 PBCH information bit sets is used in 4 PBCH information bit sets transmitted in the next range of 20 ms.

As described above, channel coding is performed with respect to each of the 16 PBCH information bit sets which are subject to scrambling using a scrambling sequence and the second scrambling sequence is applied to bits encoded by channel coding. That is, channel coding is performed after performing scrambling by applying the first scrambling sequence to 16 PBCH information bit sets in the same manner as the scheme described above. Next, the second scrambling sequence is applied to an acquired encoded bit. In this case, the second scrambling sequence may use a PN sequence such as a Gold sequence and may be initialized by a cell ID and a 3-bit SSB index transmitted through a PBCH DMRS.

The same scrambling sequence may be used for encoded bits of PBCH content transmitted in association with a specific SSB index according to a transmission timing.

Meanwhile, a scrambling sequence changed in units of 5 ms may be applied according to the half-frame boundary information. For example, if the number of scrambled encoded bits is K, a length-2*K sequence is generated and is divided into two sequences each having a length of K so as not to overlap elements of the sequences. The two sequences are applied according to the half-frame boundary information. According to the above-described method, when PBCHs transmitted in a duration of 10 ms are soft-combined, performance can be improved by randomly distributing interference.

Meanwhile, if there is no information about a candidate sequence of the second scrambling sequence, the UE may perform decoding multiple times under the assumption that a scrambling sequence available for a candidate sequence has been transmitted.

The half-frame boundary 1-bit information may be transmitted using signals and/or channels different from a part related to channel coding such as PBCH content, CRC, a scrambling sequence, etc.

For example, the half-frame boundary 1-bit information may be transmitted using a PBCH DMRS and may be transmitted using a DMRS sequence, a DMRS RE position, and a DMRS sequence-to-RE mapping scheme or order change, a symbol position change of a PSS/SSS/PBCH within an SSB, a frequency position change of the SSB, and polarity inversion of an SS or a PBCH OFDM symbol. This will be described later in detail.

Before performing PBCH decoding, if the UE acquires the half-frame boundary information, the UE may perform de-scrambling using a scrambling sequence corresponding to the acquired half-frame boundary information.

5. SSB Time Index

A method of indicating an SSB time index will now be described.

Some indexes of SSB time indexes are transmitted in a PBCH DMRS sequence and the other indexes of the SSB time indexes are transmitted in a PBCH payload. In this case, the SSB time indexes transmitted in the PBCH DMRS sequence represent N-bit information and the SSB time indexes transmitted in the PBCH payload represent M-bit information. If the maximum number of SSBs in a frequency range is L bits, the L bits are the sum of M bits and N bits. If a total of H (=2^L) states capable of being transmitted in the range of 5 ms is group A, J (=2^N) states represented by the N bits transmitted in the PBCH DMRS sequence are group B, and I (=2^M) states represented by the M bits transmitted in the PBCH payload are group C, then the number H of states of group A may be represented by multiplication of the number J of states of group B and the number C of states of group C. In this case, states of either group B or group C may represent a maximum of P (where P is 1 or 2) within the range of 0.5 ms. Meanwhile, the groups described in the present disclosure have been used for convenience of description and various types may be represented as the groups.

Meanwhile, the number of states transmitted in the PBCH DMRS sequence may be 4 in the frequency range below 3 GHz, 8 in a frequency range between 3 GHz and 6 GHz, and 8 in the frequency range above 6 GHz. In a band below 6 GHz, subcarrier spacings of 15 kHz and 30 kHz are used. If the subcarrier spacing of 15 kHz is used, a maximum of one state is included in the range of 0.5 ms and if the subcarrier spacing of 30 kHz is used, a maximum of two states is included in the range of 0.5 ms. In a band above 6 GHz, subcarrier spacings of 120 kHz and 240 kHz are used. If the subcarrier spacing of 120 kHz is used, a maximum of one state is included in the range of 0.5 ms and if a subcarrier spacing of 240 kHz is used, a maximum of two states is included in the range of 0.5 ms.

Figure 15:
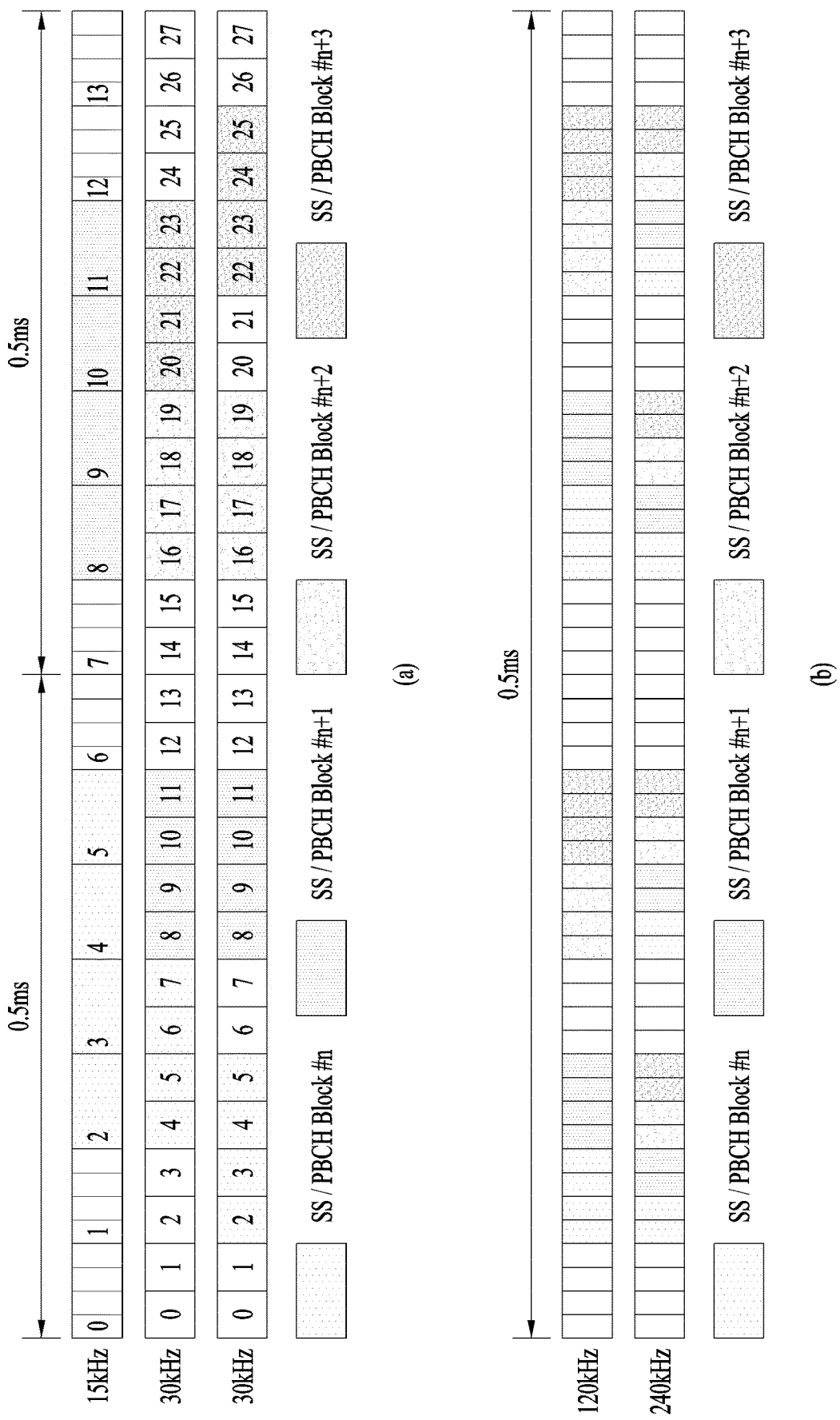

FIGS. 15(a) and 15(b) illustrate SSBs included in a range of 0.5 ms when subcarrier spacings of 15 kHz and 30 kHz are used and subcarrier spacings of 120 kHz and 240 kHz are used, respectively. As illustrated in FIG. 15, 1, 2, 8, and 16 SSBs are included in a range of 0.5 ms for the subcarrier spacings of 15 kHz, 30 kHz, 120 kHz, and 240 kHz, respectively.

For the subcarrier spacings of 15 kHz and 30 kHz, indexes of SSBs included in 0.5 ms are mapped to indexes transmitted in the PBCH DMRS sequence in one-to-one correspondence. The PBCH payload may include an indication bit for indicating an SSB index. In a band below 6 GHz, the indication bit is not interpreted as a bit for an SSB index and may be interpreted as information for other purposes. For example, the indication bit may be used for the purpose of coverage expansion and may be used to transmit the repetition number of signals or resources associated with an SSB.

When the PBCH DMRS sequence is initialized by a cell ID and an SSB index, for the subcarrier spacings of 15 kHz and 30 kHz, an SSB index transmitted in the range of 5 ms may be used as an initial value of the sequence. Herein, the SSB index may have the same meaning as the SSB ID (SSBID).

Embodiment 2-1

When a subcarrier spacing is 120 kHz, the number of indexes of SSBs included in 0.5 ms is 8. However, in a range of 0.5 ms, the same PBCH DMRS sequence is present and a PBCH payload may vary with an SSB index. It is noted that a PBCH DMRS sequence in a duration of 0.5 ms in which a first SSB group is transmitted is distinguished from a PBCH DMRS sequence used in a duration of 0.5 ms of a second SSB group transmitted prior to the first SSB group. That is, different sequences are used. In addition, to distinguish between SSBs transmitted in different durations of 0.5 ms, an SSB index for an SSB group is transmitted in the PBCH payload.

When a subcarrier spacing is 240 kHz, the number of indexes of SSBs included in 0.5 ms is 16 and the number of PBCH DMRS sequences in 0.5 ms may be 2. That is, a PBCH DMRS sequence used for 8 SSBs in a front part of 0.5 ms among SSBs may be different from a PBCH DMRS sequence used for 8 SSBs in a rear part of 0.5 ms among the SSBs. The PBCH payload included in the SSBs of the front part and the rear part carry SSB indexes.

Thus, when a method of keeping a PBCH DMRS sequence constant during a predetermined time duration is applied, there is an advantage of acquiring time information having accuracy of about 0.5 ms or 0.25 ms by transmitting time information based on a PBCH DMRS sequence having low detection complexity and high detection performance in the case in which the UE attempts to detect a signal of a neighbor cell in order to secure time information of the neighbor cell. This can provide time accuracy of about 0.25 ms or 0.5 ms regardless of a frequency range.

Embodiment 2-2

When a subcarrier spacing is 120 kHz, the number of indexes of SSBs included in 0.5 ms is 8. However, in a range of 0.5 ms, the same SSB is included in the PBCH payload and the PBCH DMRS sequence may vary with an SSB index. It is noted that an SSB index transmitted through the PBCH payload in a duration of 0.5 ms in which a first SSB group is transmitted is distinguished from an SSB index used in a duration of 0.5 ms of a second SSB group transmitted prior to transmission of the first SSB group. That is, different sequences are used.

When a subcarrier spacing is 240 kHz, the number of indexes of SSBs included in 0.5 ms is 16 and the number of SSBs transmitted in the PBCH payload in the range of 0.5 ms may be 2. That is, SSB indexes included in the PBCH payload transmitted in 8 SSBs in a duration of 0.5 ms of a front part among SSBs are equal and 8 SSBs in a duration a PBCH DMRS sequence used for 8 SSBs in 0.5 ms of a rear part are different from the SSBs of the front part. In this case, a PBCH DMRS sequence included in each of the front part and the rear part uses a different sequence according to an SSB index.

When subcarrier spacings are 120 kHz and 240 kHz, SSB indexes are expressed by a combination of indexes acquired from two paths. Embodiment 2-1 and Embodiment 2-2 described above may be represented by [Equation 1] and [Equation 2], respectively.

$$SS\text{-}PBCH\ block\ index = SSBID * P + SSBGID$$

$$SSBID = \text{Floor}(SS\text{-}PBCH\ block\ index/P)$$

$$SSBGID = \text{Mod}(SS\text{-}PBCH\ block\ index, P) \quad [\text{Equation 1}]$$

$$SS\text{-}PBCH\ block\ index = SSBID * P + SSBGID$$

$$SSBID = \text{Mod}(SS\text{-}PBCH\ block\ index, P)$$

$$SSBGID = \text{Floor}(SS\text{-}PBCH\ block\ index/P) \quad [\text{Equation 2}]$$

where P may be expressed by 2^(number of bits transmitted in PBCH DMRS).

While a specific value (e.g., 4 or 8) has been used for description, this is purely for convenience of description and the present disclosure is not limited to the above-described specific value. For example, the above-described value may be determined according to the number of information bits transmitted in the PBCH DMRS. If 2-bit information is transmitted in the PBCH DMRS, an SSB group may include 4 SSBs and, even for subcarrier spacings of 15 kHz and 30 kHz, the SSB time index transmission method described for the case of subcarrier spacings of 120 kHz and 240 kHz may be applied.

Referring back to FIG. 14, examples of a bit configuration of time information and a transmission path of the time information, described in "4. System Frame Number (SFN) and Half-Frame Boundary" and "5. SSB time index", may be summarized as follows.

7 bits among 10 bits of an SFN and 3 bits of an SSB group index are transmitted in PBCH content.

2 bits (S2, S1) of 20-ms boundary information are transmitted in a PBCH scrambling sequence.

1 bit (C0) of 5-ms boundary information and 1 bit (S0) of 10-ms boundary information are transmitted for DMRS RE position shift, a phase difference in DMRS between OFDM symbols including a PBCH, a DMRS sequence-to-RE mapping change, or change of a PBCH DMRS sequence initial value.

3 bits (B2, B1, B0) of SSB index indication information are transmitted in a DMRS sequence.

6. NR-PBCH Content

The UE may detect a cell ID and symbol timing information and then acquire information, for network access from a PBCH, which includes an SFN, an SSB index, a part of timing information such as a half-frame timing, common control channel related information such as a time/frequency position, bandwidth, bandwidth part information such as an SSB position, and SS burst set information such as SS burst set periodicity and an actually transmitted SSB index.

Since only a limited time/frequency resource of 576 REs is occupied for the PBCH, essential information should be included in the PBCH. If possible, an auxiliary signal such as a PBCH DMRS may be used to further include the essential information or additional information in the PBCH.

(1) SFN

In NR, an SFN is defined to distinguish between intervals of 10 ms. Similarly to an LTE system, the NR system may introduce indexes between 0 and 1023 for the SFN and these indexes may be explicitly indicated using bits or may be implicitly indicated.

In NR, a PBCH TTI is 80 ms and a minimum periodicity of an SS burst is 5 ms. Therefore, a PBCH may be transmitted a maximum of 16 times in units of 80 ms and a different scrambling sequence for each transmission may be applied to a PBCH encoded bit. The UE may detect an interval of 10 ms similarly to an LTE PBCH decoding operation. In this case, 8 states of the SFN may be implicitly indicated by a PBCH scrambling sequence and 7 bits for indicating the SFN may be defined by PBCH content.

(2) Timing Information in Radio Frame

An SSB index may be explicitly indicated by bits included in a PBCH DMRS sequence and/or PBCH content according to carrier frequency. For example, in the frequency band below 6 GHz, 3 bits of an SSB index are transmitted only in the PBCH DMRS sequence. In the frequency band above 6 GHz, 3 LSBs of the SSB index are expressed as the PBCH DMRS sequence and 3 MSBs of the SSB index are transmitted by the PBCH content. That is, only in the frequency band of 6 GHz to 52.6 GHz, a maximum of 3 bits for the SSG index may be defined in the PBCH content.

A half-frame boundary may be transmitted by the PBCH DMRS sequence. Particularly, if a half-frame indication is included in the PBCH DMRS sequence in the frequency band below 3 GHz, this may raise an effect relative to the case in which the half-frame indication is included in the PBCH content. That is, since an FDD scheme is mainly used in the frequency band below 3 GHz, a mismatch degree of time synchronization between a subframe and a slot may be big. Accordingly, in order to achieve more accurate time synchronization, it is favorable to transmit the half-frame indication through the PBCH DMRS which has better decoding performance than the PBCH content.

However, since a TDD scheme is mainly used in a band above 3 GHz, a mismatch degree of time synchronization between a subframe and a slot will not be big. Therefore, there may be few disadvantages even if the half-frame indication is transmitted through the PBCH content.

Meanwhile, the half-frame indication may also be transmitted through both the PBCH DMRS and the PBCH content.

(4) Information for Identifying Absence of RMSI Corresponding to PBCH

In NR, an SSB may be used for operation measurement as well as provision of information for network access. Particularly, for a broadband CC operation, multiple SSBs may be transmitted for measurement.

However, it may be unnecessary to transmit RMSI through all frequency positions in which the SSBs are transmitted. That is, the RMSI may be transmitted through a specific frequency position for the purpose of efficiency of resource use. In this case, UEs performing an initial access procedure cannot recognize whether the RMSI is provided at a detected frequency position. To solve this problem, a bit field for identifying that the RMSI corresponding to a PBCH of a detected frequency region is absent needs to be defined. Meanwhile, a method of identifying that the RMSI corresponding to the PBCH is absent without providing the bit field also needs to be considered.

To this end, an SSB having no RMSI may be transmitted at a frequency position which is not defined as frequency raster. In this case, since the UEs performing the initial access procedure cannot detect the SSB, the above-described problem can be solved.

(5) SS Burst Set Periodicity and Actually Transmitted SSB

For the purpose of measurement, information about SS burst set periodicity and an actually transmitted SSB may be indicated. Therefore, this information is desirably included in system information for cell measurement and inter/intra-cell measurement. In other words, it is not necessary to define the above information in the PBCH content.

(8) Payload Size

In consideration of the decoding performance of a PBCH, it may be assumed that a payload size of a maximum of 64 bits is provided as illustrated in [Table 2].

TABLE 2

| Details | Bit size | |
|---|---|---|
| | Below 6 GHz | Above 6 GHz |
| System Frame Number (MSB) | 7 | 7 |
| SS/PBCH block time index (MSB) | 0 | 3 |
| Reference numerology | [1] | [1] |
| Bandwidth for DL common channel, and SS block position | [3] | [2] |
| # of OFDM symbols in a Slot | [1] | 0 |
| CORESET (Frequency resource-bandwidth, location) (Time resource-starting OFDM symbol, duration) (UE Monitoring periodicity, offset, duration) | About [10] | About [10] |

TABLE 2-continued

| Details | Bit size | |
|---|---|---|
| | Below 6 GHz | Above 6 GHz |
| Reserved Bit | [20] | [20] |
| CRS | 16 + a | 16 + a |
| Total | 64 | 64 |

7. NR-PBCH Scrambling

The type of an NR-PBCH scrambling sequence and the initialization of the sequence will now be described. Although use of a PN sequence may be considered in NR, it is desirable to reuse a Gold sequence as the NR-PBCH scrambling sequence unless a serious problem arises due to use of a length-31 Gold sequence defined in an LTE system as the NR-PBCH sequence.

In addition, the scrambling sequence may be initialized by at least a cell ID and 3 bits of an SSB index indicated by a PBCH-DMRS may be used for initialization of the scrambling sequence. If a half-frame indication is indicated by the PBCH-DMRS or other signals, the half-frame indication may also be used as a seed value for initializing the scrambling sequence.

8. PBCH Coding Chain Configuration and PBCH DMRS Transmission Scheme

Figure 16:
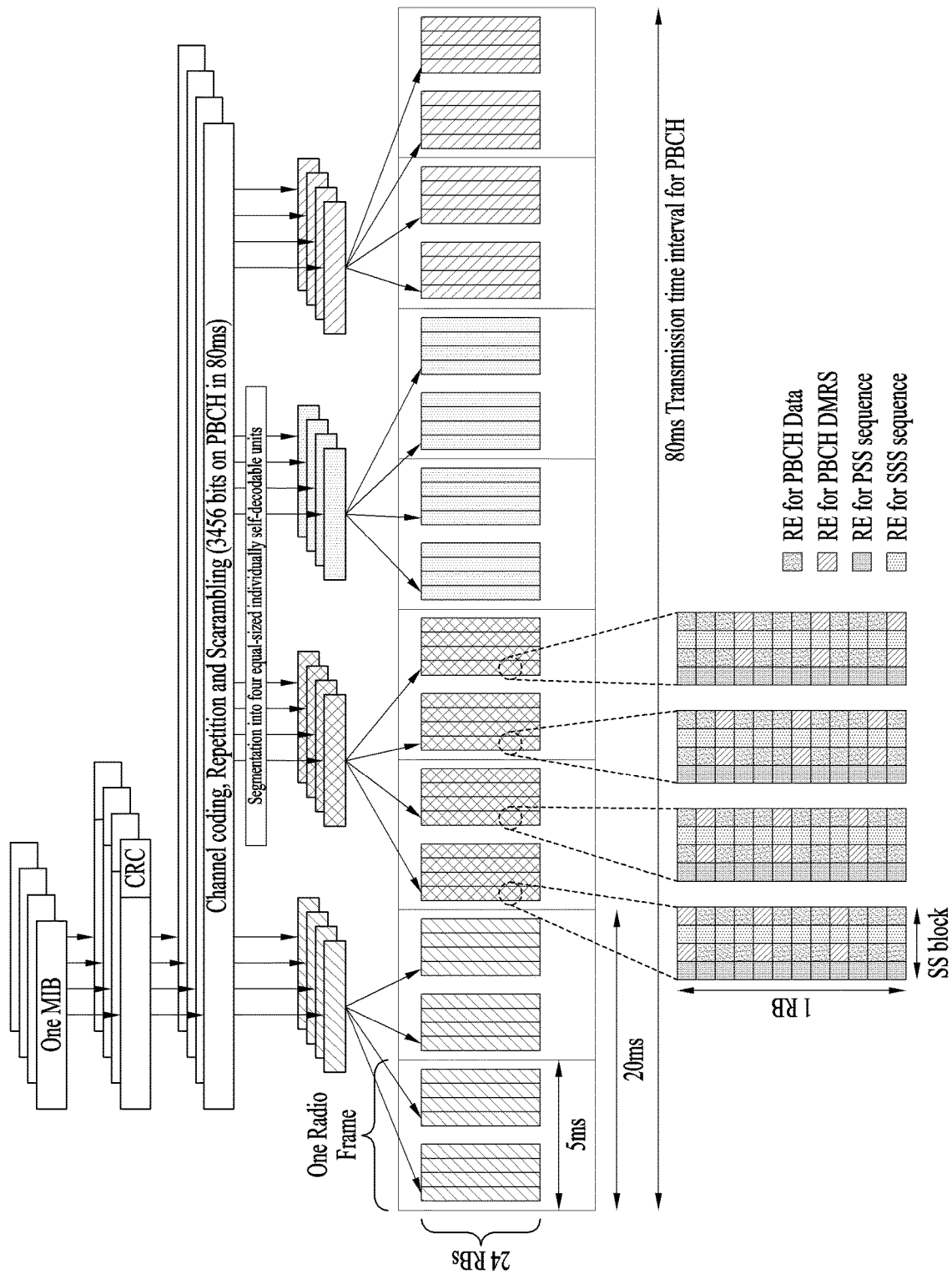

An embodiment of a PBCH coding chain configuration and a PBCH DMRS transmission scheme will now be described with reference to FIG. 16.

First, an MIB configuration may differ according to control resource set (CORESET) information per SSB and an SSB group index. Therefore, encoding is performed with respect to an MIB per SSB and the size of encoded bits is 3456 bits. Since polar code output bits are 512 bits, the polar code output bits may be repeated 6.75 times (512*6+384).

A length-3456 scrambling sequence is multiplied by the repeated bits and the scrambling sequence is initialized by a cell ID and an SSB index transmitted in a DMRS. The 3456-bit scrambling sequence is divided into 4 groups each having 864 bits and QPSK modulation is performed with respect to each group so that 4 length-432 modulated symbol sets are configured.

A new modulated symbol set is transmitted every 20 ms and the same modulated symbol set may be transmitted a maximum of 4 times within 20 ms. In a duration in which the same modulated symbol set is repeatedly transmitted, a frequency-axis position of a PBCH DMRS is shifted according to a cell ID. That is, a DMRS position is shifted by [Equation 3] every 0/5/10/15 ms.

$$v\text{shift}=(v\text{shift\_cell}+v\text{shift\_frame}) \bmod 4, v\text{shift\_cell}=\text{Cell-ID} \bmod 3, v\text{shift\_frame}=0,1,2,3 \quad \text{[Equation 3]}$$

A PBCH DMRS sequence uses a length-31 Gold sequence. An initial value of a first m-sequence is fixed as one value and an initial value of a second m-sequence is determined based on the SSB index and the cell ID as indicated by [Equation 4].

$$c\text{init}=2^{10}*(\text{SSBID}+1)*(2*\text{CellID}+1)+\text{CellID} \quad \text{[Equation 4]}$$

If the content of SSBs is the same, channel coding and bit repetition may be performed only with respect to one SSB. In addition, if a different scrambling sequence value is applied to each SSB, a process of generating and multiplying the scrambling sequence and a process of segmenting and modulating bits are performed with respect to each SSB.

Hereinafter, operations of a gNB and a UE according to a method of transmitting radio half-frame information and one MSB of an SFN will be described. C0 and S0 described hereinbelow correspond to a half-frame boundary bit and a frame boundary indication bit of FIG. 14, respectively.

(1) C0 and S0 are Transmitted in CRC:

C0 and S0 are information changed every 0, 5, 10, or 15 ms. A total of 4 CRCs is generated and encoding of 4 times is performed. Then, each encoded bit is repeatedly arranged under the assumption that the encoded bit is transmitted a total of 4 times every 20 ms and the encoded bit is multiplied by the scrambling sequence.

During reception by the UE, blind decoding should further be performed to combine information received every 0, 5, 10, or 15 ms. Although there is no additional complexity if only PBCHs received every 20 ms are blind-decoded, it is difficult to guarantee maximum performance because signals transmitted every 5 ms cannot be combined.

(2) C0 and S0 are Transmitted in PBCH Scrambling:

Encoding is performed using one type of information bit and using CRC. Then, an encoded bit is repeatedly arranged under the assumption that the encoded bit is transmitted every 5 ms, i.e., a total of 16 times, and the encoded bit is multiplied by the scrambling sequence. This method is problematic in that the number of times performing blind decoding increases to 16.

(3) C0 and S0 are Transmitted in DMRS Sequence:

5 bits are transmitted in a length-144 sequence and encoding is performed using one type of information and using CRC. There are two scrambling schemes.

1) An encoded bit repeatedly arranged, under the assumption that the encoded bit is transmitted every 5 ms, i.e., the encoded bit is transmitted a total of 16 times, and the encoded bit is multiplied by the scrambling sequence. In this case, since the scrambling sequence is changed every 5 ms, inter-cell interference (ICI) randomization of a PBCH may occur. Since the UE acquires information of C0 and S0 from the DMRS sequence, the UE may acquire scrambling sequence information changed every 0, 5, 10, or 15 ms. The number of times of blind decoding does not increase during PBCH decoding. The above method combines a signal transmitted every 5 ms and thus maximum performance can be expected.

2) An encoded bit repeatedly arranged, under the assumption that the encoded bit is transmitted every 20 ms, i.e., the encoded bit is transmitted a total of 4 times, and the encoded bit is multiplied by the scrambling sequence. Then, ICI randomization may be reduced. Performance improvement can be expected without increasing the number of times of blind decoding of the UE and acquisition time can be improved.

However, since a plurality of bits should be included in a DMRS sequence when C0 and S0 are transmitted in the DMRS sequence, detection performance may be reduced and the number of times of blind decoding may increase. To overcome these problems, combining should be performed multiple times.

(4) C0 and S0 are Transmitted Through DMRS Position:

A basic principle of this case is identical to transmission of C0 and S0 in the DMRS sequence. However, to transmit C0 and S0 through the DMRS position, the position is determined based on a cell ID and a frequency position is shifted by 0, 5, 10, or 15 ms. Even a neighbor cell may shift the position in the same manner. Particularly, if power boosting is performed with respect to a DMRS, performance can be further improved.

9. NR-PBCH DM-RS Design

An NR-PBCH DMRS should be scrambled by 1008 cell IDs and a 3-bit SSB index. This is because detection performance of 3 bits exhibits the most appropriate result for the number of hypotheses of the DMRS sequence when detection performance is compared according to the number of hypotheses for the DMRS sequence. However, since detection performance of 4 or 5 bits has almost no detection performance loss, the number of hypotheses of 4 or 5 bits may also be used.

Meanwhile, since an SSB time index and a 5-ms boundary should be indicated through the DMRS sequence, the DMRS sequence should be designed to have a total of 16 hypotheses.

In other words, the DMRS sequence should be capable of representing at least a cell ID, an SSB index in an SS burst set, and a half-frame boundary (or half-frame indication) and may be initialized by the cell ID, the SSB index in the SS burst set, and the half-frame boundary (or half-frame indication). A detailed initialization equation is indicated by [Equation 5].

$$c_{init} = (N_{ID}^{SS/PBCH\ block} + 1 + 8 \cdot HF) \cdot (2 \cdot N_{ID}^{cell} + 1) \cdot 2^{10} + N_{ID}^{cell}$$ [Equation 5]

where $N_{ID}^{SS/PBCH\ block}$ is an SSB index within an SSB group, $N_{ID}^{Cell}$ is a cell ID, and HF is a half-frame indication index having a value of $\{0, 1\}$.

The NR-PBCH DMRS sequence may be generated based on a length-31 Gold sequence similarly to an LTE DMRS sequence or based on a length-7 or 8 Gold sequence.

Meanwhile, since detection performance when the length-31 Gold sequence is similar to detection performance when the length-7 or 8 Gold sequence is used, the present disclosure proposes using the length-31 Gold sequence as in the LTE DMRS. In the frequency range above 6 GHz, a Gold sequence having a longer length than the length-31 Gold sequence may be considered.

A DMRS sequence $r_{N_{ID}^{SS/PBCH\ block}}(m)$ which is modulated using QPSK may be defined by [Equation 6].

$$r_{N_{ID}^{SS/PBCHblock}}(m) = \frac{1}{\sqrt{2}}(1 - 2 \cdot c(2m)) + j\frac{1}{\sqrt{2}}(1 - 2 \cdot c(2m+1)),$$
$$m = 0, 1, \ldots, 143$$
[Equation 6]

As a modulation type for generating the DMRS sequence, BPSK and QPSK may be considered. Although detection performance of BPSK is similar to that of QPSK, since correlation performance of QPSK is better than that of BPSK, QPSK is more proper as the modulation type for generating the DMRS sequence.

Now, a method of configuring the PBCH DMRS sequence will be described in more detail. The PBCH DMRS sequence uses a Gold sequence. Two m-sequences are configured by polynomials having the same length. When the length of a sequence is short, one m-sequence may be replaced with a polynomial of a short length.

Embodiment 3-1

Two m-sequences constituting the Gold sequence are configured with the same length. An initial value of one of the m-sequences may use a fixed value and an initial value of the other one of the m-sequences may be initialized by a cell ID and a time indication.

For example, the Gold sequence may use a length-31 Gold sequence used in LTE. A CRS of legacy LTE uses the length-31 Gold sequence and is initialized by 504 cell IDs, and 140 time indications based on 7 OFDM symbols and 20 slots, thereby generating different sequences.

Since subcarrier spacings of 15 kHz and 30 kHz are used in a band below 6 GHz, the maximum number of SSBs included in a range of 5 ms may be 8 and the maximum number of SSBs included in a range of 20 ms may be 32. That is, if information about a 5-ms boundary in a range of 20 ms is acquired through a PBCH DMRS sequence, the same operation as an operation of searching for 32 SSBs is performed. Although the number of cell IDs of NR is increased to 1008 which is twice that in LTE, since the number of SSBs which should be distinguished is less than 70 (=140/2), the above-described sequence may be used.

Meanwhile, although the maximum number of SSBs is 64 in a range of 5 ms in a band above 6 GHz, the maximum number of SSBs transmitted by a PBCH DMRS is 8 which is equal to the maximum number of SSB indexes in a band below 6 GHz. Accordingly, a length-31 Gold sequence may be used even in a band above 6 GHz so that a sequence may be generated according to the cell ID and the time indication.

As another method, Gold sequences of different lengths may be applied according to a frequency range. In a band above 6 GHz, a subcarrier spacing of 120 kHz and a subcarrier spacing of 240 kHz may be used. Then, the number of slots included in 10 ms is increased to 8 times (i.e., 80 slots) and 16 times (i.e., 160 slots) as compared with the case in which a subcarrier spacing of 15 kHz is used. Particularly, if a sequence of a data DMRS is initialized using a 16-bit C-RNTI and a slot index, a polynomial having a longer length than a legacy length of 31 may be needed. According to such requirement, if a length-N (>31) Gold sequence is introduced, this sequence may be used for a PBCH DMRS and PBCH scrambling. Then, Gold sequences having different lengths may be applied according to a frequency range. A length-31 Gold sequence may be used in a band below 6 GHz and a length-N (>31) Gold sequence may be used in a band above 6 GHz. In this case, an initial value may be applied similarly to the above-described scheme.

Embodiment 3-2

Two m-sequences constituting the Gold sequence are configured with the same length. One of the m-sequences may be initialized by a time indication and an initial value of the other one of the m-sequences may be initialized by a cell ID or by the cell ID and another time indication. For example, the Gold sequence may use a length-31 Gold sequence used in LTE. An m-sequence to which a fixed initial value is conventionally applied is initialized by the time indication and another m-sequence is initialized by the cell ID.

As another method, if a radio half-frame boundary (5 ms) and one MSB of an SFN (10-ms boundary) among time indications are transmitted together with an SSB index in a PBCH DMRS, the radio half-frame boundary (5 ms) and one MSB of the SFN (10-ms boundary) may be indicated in the first m-sequence and the SSB index may be indicated in the second m-sequence.

As proposed in Embodiment 3-1 described above, even when Gold sequences having different lengths according to a frequency range are introduced, the above-described sequence initialization method may be applied.

Embodiment 3-3

A Gold sequence is configured by m-sequences having polynomials of different lengths. An m-sequence having a long polynomial is used for information requiring many indications and an m-sequence having a relatively short polynomial is used for information requiring few indications.

A sequence of a PBCH DMRS is generated according to a cell ID and time information such as an SSB indication. Two polynomials of different lengths may be used to represent 1008 cell IDs and P pieces of time information (e.g., a 3-bit SSB indicator). For example, a length-31 polynomial may be used to distinguish between cell IDs and a length-7 polynomial may be used to distinguish between time information. Each of the two m-sequences may be initialized by the cell ID and the time information. Meanwhile, in the above-described example, the length-31 polynomial may be a part of m-sequences constituting the Gold sequence in LTE and the length-7 polynomial may be one of two m-sequences defined to constitute an NR-PSS or NR-SSS sequence.

Embodiment 3-4

A sequence is generated from an m-sequence having a polynomial of a short length and a sequence is generated from a Gold sequence consisting of m-sequences having a polynomial of a long length. Then, the two sequences are multiplied element-wise.

Hereinafter, a method of setting an initial value of a sequence used as a PBCH DMRS sequence will be described. The PBCH DMRS sequence is initialized by a cell ID and a time indication. If a bit stream used for initialization is expressed as $c(i)*2^i$, $i=0, \ldots, 30$, $c(0)$ to $c(9)$ are determined by the cell ID and $c(10)$ to $c(30)$ are determined by the cell ID and the time indication. In particular, bits corresponding to $c(10)$ to $c(30)$ carry a part of information of the time indication and an initialization method may vary according to an attribute of the information of the time indication.

Embodiment 4-1

During initialization according to the cell ID and the SSB index, $c(0)$ to $c(9)$ are determined by the cell ID and $c(10)$ to $c(30)$ are determined by the cell ID and the SSB index as described above. In [Equation 7] below, NID denotes the cell ID and SSBID denotes the SSB index.

$$2\hat{\ }10*(SSBID*(2*NID+1))+NID+1$$

$$2\hat{\ }10*((SSBID+1)*(2*NID+1))+NID+1$$

$$2\hat{\ }10*((SSBID+1)*(2*NID+1))+NID \qquad [\text{Equation 7}]$$

Embodiment 4-2

If the time indication is added in the initialization scheme described in Embodiment 4-1, an initial value is set in the form of increasing an SSB. When the number of SSB indexes transmitted in the PBCH DMRS sequence in a range of 5 ms is P, if it is desired to search for a radio half-frame boundary from the DMRS sequence, this may be expressed as an effect of doubling the number of SSB indexes. In addition, if it is desired to search for a boundary of 10 ms as well as the half-frame boundary, this may be expressed as an effect of increasing the number of SSB indexes four times. An equation for Embodiment 4-2 described herein is indicated by [Equation 8].

$$2\hat{\ }10*((SSBID+P*(i))*(2*NID+1))+NID+1$$

$$2\hat{\ }10*((SSBID+1+P*(i))*(2*NID+1))+NID+1$$

$$2\hat{\ }10*((SSBID+1+P*(i))*(2*NID+1))+NID \qquad [\text{Equation 8}]$$

When boundaries of 0, 5, 10, and 15 ms are expressed, then i=0, 1, 2, 3 and when only a half-frame boundary is expressed, then i=0, 1.

Embodiment 4-3

If the time indication is added in the initialization scheme described in Embodiment 4-1, the time indication may be indicated by being distinguished from the SSB index. For example, $c(0)$ to $c(9)$ may be determined by the cell ID, $c(10)$ to $c(13)$ may be determined by the SSB index, and $c(14)$ to $c(30)$ may be determined by the added time indication such as a half-frame boundary or SFN information. An equation for Embodiment 4-3 described herein is indicated by [Equation 9].

$$2\hat{\ }13*(i)+2\hat{\ }10*((SSBID+1))+NID$$

$$2\hat{\ }13*(i+1)+2\hat{\ }10*((SSBID+1))+NID$$

$$2\hat{\ }13*(i)+2\hat{\ }10*((SSBID+1))+NID+1$$

$$2\hat{\ }13*(i+1)+2\hat{\ }10*((SSBID+1))+NID+1 \qquad [\text{Equation 9}]$$

Embodiment 4-4

According to a frequency range, the maximum number L of SSBs is determined. If the number of SSB indexes transmitted in the PBCH DMRS sequence is P and L is less than or equal to P, all SSB indexes are transmitted in the DMRS sequence and the SSB indexes are identical to indexes acquired from the DMRS sequence. Meanwhile, if L is greater than P, the SSB indexes are configured by a combination of indexes transmitted in the DMRS sequence and indexes transmitted in PBCH content.

When an index used in the DMRS sequence is an SSBID and an index included in the PBCH content is an SSBGID, the following three cases may be considered.

(1) Case 0: L<=P
SS-PBCH block index=SSBID
(2) Case 1: L>P
SS-PBCH block index=SSBID*P+SSBGID
SSBID=Floor (SS-PBCH block index/P)
SSBGID=Mod(SS-PBCH block index, P)
(3) Case 2: L>P
SS-PBCH block index=SSBID*P+SSBGID
SSBID=Mod(SS-PBCH block index, P)
SSBGID=Floor (SS-PBCH block index/P)

Meanwhile, a pseudo-random sequence for generating an NR-PBCH DMRS sequence is defined as a length-31 Gold sequence and a length-$M_{PN}$ sequence $c(n)$ is defined by [Equation 10].

$$c(n)=(x_1(n+N_C)+x_2(n+N_C)) \bmod 2$$

$$x_1(n+31)=(x_1(n+3)+x_1(n)) \bmod 2$$

$$x_2(n+31)=(x_2(n+3)+x_2(n+2)+x_2(n+1)+x_2(n)) \bmod 2 \qquad [\text{Equation 10}]$$

where n=0, 1, . . . , $N_{PN}$−1, $N_C$=1600, a first m-sequence has an initial value of $x_1(0)$=1, $x_1(n)$=0, n=1, 2, . . . , 30, and an initial value of a second m-sequence is defined by $c_{init}=\Sigma_{i=0}^{30} x_2(i) \cdot 2^i$. In this case, $$x_2(i) = \left\lfloor \frac{C_{init}}{2^i} \right\rfloor \mod 2, i = 0, 1, \ldots, 30.$$

10. NR-PBCH DMRS Pattern Design

In relation to a frequency position of a DMRS, two DMRS RE mapping methods may be considered. A fixed RE mapping method serves to fix an RS mapping region in the frequency domain and a variable RE mapping method serves to shift an RS position according to a cell ID using a Vshift method. The variable RE mapping method is advantageous in that additional performance gain can be obtained by randomizing interference so that it is desirable to use the variable RE mapping method.

The variable RE mapping method will now be described in detail. A complex modulation symbol $a_{k,l}$ included in a half-frame may be determined by [Equation 11].

$$a_{k,l} = r_{N_{ID}^{SS/PBCHblock}}(72 \cdot l' + m') \quad [\text{Equation 11}]$$
$$k = 4m' + v_{shift} \text{ if } l \in \{1, 3\}$$
$$l = \begin{cases} 1 & l' = 0 \\ 3 & l' = 1 \end{cases}$$
$$m' = 0, 1, \ldots, 71$$
$$v_{shift} = N_{ID}^{cell} \mod 3$$

where k and l represent a subcarrier and an OFDM symbol index located within an SSB and $r_{N_{ID}^{SS/PBCH block}}(m)$ represents a DMRS sequence. Meanwhile, Vshift may be determined by $V_{shift}=N_{ID}^{cell} \mod 4$.

In addition, RS power boosting may be considered for performance improvement. If both RS power boosting and Vshift are used, interference from total radiated power (TRP) may be reduced. In consideration of detection performance gain of RS power boosting, the ratio of PDSCH energy per resource element (EPRE) to RS EPRE is desirably −1.25 dB.

Hereinafter, a method of mapping a PBCH DMRS sequence to an RE will be described.

Embodiment 5-1

The length of a sequence for a DMRS is determined by the number of REs used for a PBCH DMRS and a modulation order.

If M REs are used for the PBCH DMRS and a sequence is modulated by BPSK, a length-M sequence is generated. BPSK modulation is performed in sequence order and a modulated symbol is mapped to DMRS REs. For example, when a total of 144 PBCH DMRS REs is present in two OFDM symbols, a length-144 sequence is generated using one initial value, BPSK modulation is performed, and then RE mapping is performed.

Meanwhile, when M REs are used for the PBCH DMRS and QPSK modulation is performed, a length-2*M sequence is generated. If a sequence stream is s(0), . . . , s(2*M−1), QPSK modulation is performed by combining sequences of even indexes and odd indexes. For example, when a total of 144 PBCH DMRS REs is present in two OFDM symbols, a length-288 sequence is generated using one initial value, QPSK modulation is performed, and then a generated length-144 modulated sequence is mapped to the DMRS REs.

If N REs are used for the PBCH DMRS in one OFDM symbol and a sequence is modulated by BPSK, a length-N sequence is generated. BPSK modulation is performed in sequence order and a modulated symbol is mapped to DMRS REs. For example, when a total of 72 PBCH DMRS REs is present in one OFDM symbol, a length-72 sequence is generated using one initial value, BPSK modulation is performed, and then RE mapping is performed. If one or more OFDM symbols are used for PBCH transmission, initialization is performed with respect to each OFDM symbol to generate different sequences or a sequence generated in a previous symbol may be equally mapped.

When N REs are used for the PBCH DMRS in one OFDM symbol and a sequence is modulated by QPSK, a length-2*N sequence is generated. If a sequence stream is s(0), . . . , s(2*M−1), QPSK modulation is performed by combining sequences of even indexes and odd indexes. For example, when a total of 72 PBCH DMRS REs is present in one OFDM symbol, a length-144 sequence is generated using one initial value, QPSK modulation is performed, and then RE mapping is performed. If one or more OFDM symbols are used for PBCH transmission, initialization is performed with respect to each OFDM symbol to generate different sequences or a sequence generated in a previous symbol may be equally mapped.

Embodiment 5-2

When the same sequence is mapped to different symbols, cyclic shift may be applied. For example, when two OFDM symbols are used, if a modulated sequence stream of a first OFDM symbol is sequentially mapped to REs, a modulated sequence stream of a second OFDM symbol is cyclic-shifted by an offset corresponding to ½ of a modulated sequence stream N and then are mapped to REs. When an NR-PBCH uses 24 RBs, an NR-SSS uses 12 RBs, and the NR-SSS is desired to equalize middle frequency REs with the NR-PBCH, the NR-SSS is arranged from the 7th RB to the 18th RB. Channel estimation from the NR-SSS may be performed. Upon detecting an SSB index from the NR-PBCH DMRS, the UE may attempt to perform coherent detection using the estimated channel. If the cyclic shift method is applied to easily perform estimation, an effect of transmitting a sequence stream of the PBCH DMRS in two OFDM symbols in a region of middle 12 RBs in which the NR-SSS is transmitted may be obtained.

Embodiment 5-3

When other time indications in addition to the SSB indication are transmitted, a cyclic shift value may be determined according to the time indications.

When the same sequence is mapped to OFDM symbols, the same cyclic shift may be applied to each OFDM symbol or a different cyclic shift may be applied to each OFDM symbol. If sequences corresponding to the total number of DMRS REs included in an OFDM symbol used as a PBCH are generated, cyclic shifts are applied to all sequences and then are mapped to DMRS REs. As another example of cyclic shifts, reverse mapping may be considered. For example, if a modulated sequence stream is s(0), . . . , s(M−1), reverse mapping may be s(M−1), . . . , s(0).

Hereinafter, a frequency position of a PBCH DMRS RE will be described.

A frequency position of an RE used for the PBCH DMRS may be changed by a specific parameter.

Embodiment 6-1

If a DMRS is arranged in every N (e.g., N=4) REs, a maximum shifted range of an RE position of the frequency axis may be set to N. For example, the maximum shifted range may be N*m+v_shift (where, m=0, . . . , 12×NRB_PBCH-1, v_shift=0, . . . , N-1).

Embodiment 6-2

A shifted offset of the frequency axis may be determined by at least a cell ID. The shifted offset may be determined using a cell ID obtained from a PSS and an SSS. A cell ID of an NR system may be configured by a combination of Cell_ID(1) obtained from the PSS and Cell_ID(2) obtained from the SSS and the cell ID may be represented by Cell_ID(2)*3+Cell_ID(1). The shifted offset may be determined using cell ID information obtained in this way or a part of the cell ID information. An example of calculating the offset is indicated by [Equation 12].

$v$_shift=Cell-ID mod $N$ (where $N$ is a frequency
    interval of a DMRS, for example, $N$ is set to 4)

$v$_shift=Cell-ID mod 3 (interference randomization
    effect between 3 contiguous cells. A DMRS
    frequency interval may be wider than 3. For
    example, $N$=4)

$v$_shift=Cell_ID(1)(Cell_ID(1) obtained from the
    PSS is used as a shifted offset)    [Equation 12]

Embodiment 6-3

A shifted offset of the frequency axis may be determined by a part of time information. For example, the shifted offset may be determined by a radio half-frame boundary (5 ms) or 1-MSB information of an SFN (10 ms boundary). An example of calculating the offset may be indicated by [Equation 13].

$v$_shift=0,1,2,3 (The position of a DMRS is shifted
    in every 0/5/10/15 ms. When a frequency inter-
    val of a DMRS is 4, there are 4 shifted oppor-
    tunities)

$v$_shift=0,1 (The position of the DMRS is shifted
    according to a 0/5-ms boundary or a 0/10-ms
    boundary)

$v$_shift=0,2 (The position of the DMRS is shifted
    according to a 0/5 ms boundary or a 0/10 ms
    boundary. When a frequency interval of the
    DMRS is 4, the position of the DMRS is
    shifted by 2, which is a maximum interval)    [Equation 13]

Embodiment 6-4

A shifted offset of the frequency axis may be determined by a cell ID and a partial value of time information. For example, the offset may be configured by a combination of Embodiment 6-2 and Embodiment 6-3. The offset is configured by vshift_cell, which is a shift according to a cell ID, and vshift_frame, which is a shift according to the time information. The offset may be represented by a modulo of a DMRS RE interval N. An embodiment for calculating the offset may be indicated by [Equation 14].

$v$shift=($v$shift_cell+$v$shift_frame)mod $N$    [Equation 14]

Figure 17:
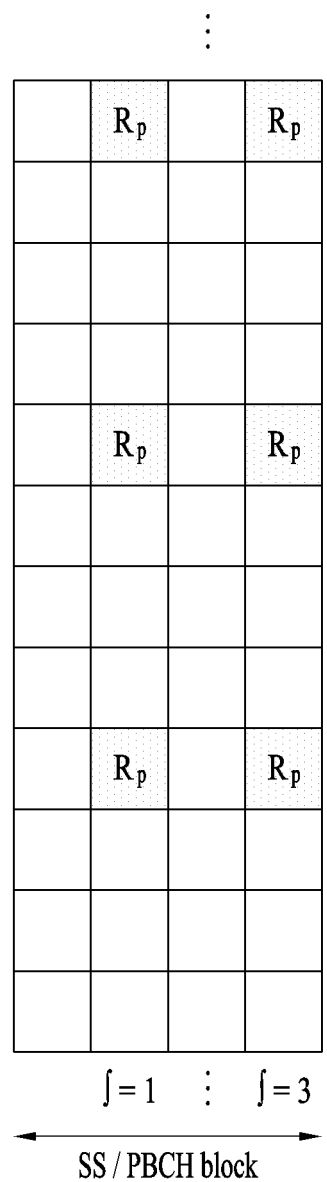

FIG. 17 is a diagram illustrating DMRS mapping in an SSB.

Hereinafter, the ratio of power between a PBCH DMRS RE and a data RE will be described. An RE used for PBCH DMRS transmission may be transmitted at higher power than an RE used for data transmission in an OFDM symbol in which a PBCH DMRS is included.

Embodiment 7-1

The ratio of energy per data RE to energy per DMRS RE uses a fixed value in each frequency band. In this case, the fixed value may be used in all frequency bands or a specific power ratio may be applied to a specific frequency band. That is, a different power ratio may be used in each frequency band. For example, high power may be used in a band below 6 GHz in which ICI dominantly functions and the same power may be used in a band above 6 GHz in an environment in which noise is limited.

In the present disclosure, while the ratio of power has been expressed as "the ratio of energy per data RE to energy per DMRS RE" for convenience of description, various other expressions may be used as follows.

Ratio of power per DMRS RE to power per data RE
    Ratio of energy per DMRS RE to energy per data RE
    Ratio of power per data RE to power per DMRS RE
    Ratio of energy per data RE to energy per DMRS RE

Embodiment 7-2

Power of an RE used for a DMRS may be set to a value lower than power of RE used for data by 3 dB. For example, if PBCH decoding performance when 3 REs among 12 REs are used for the DMRS and 9 REs are used for the data is similar to PBCH decoding performance when 4 REs and 8 REs are used for the DMRS and the data, respectively, and if it is desired to obtain a similar effect when 3 REs are used for the DMRS and when 4 REs are used for the DMRS, power of the DMRS of 3 REs may be improved to 1.3334 times per RE and power of neighbor data REs may be adjusted to 0.8889 times, thereby increasing power of the DMRS while maintaining total power of OFDM symbols. In this case, a power boosting level is about 1.76 dB (=10 log(1.3334/0.8889)).

As another example, when 3 REs and 9 REs are used for the DMRS and the data, respectively, and detection performance in similar as compared with the case in which 4 REs and 8 REs are used for the DMRS and the data, respectively, the power boosting level is about 3 dB (4.15RE DMRS is about 2 dB)

Embodiment 7-3

If the NR system performs a non-stand-alone (NSA) operation in association with the LTE system, the gNB may indicate the ratio of energy per data RE to energy per DMRS RE.

Embodiment 7-4

The gNB may indicate, to the UE, the ratio of energy per PBCH data RE to energy per DMRS RE used in an NR system. For example, the UE may demodulate PBCH data in an initial access procedure under the assumption that the ratio of energy per PBCH data RE to energy per DMRS RE is the same. Next, the gNB may indicate the ratio of energy actually used for transmission to the UE. Particularly, the gNB may indicate an energy ratio for a target cell among configurations for handover.

As another example, the gNB may indicate the energy ratio together with system information indicating transmission power of a PBCH DMRS for a serving cell. At least one of indicated energy ratio values indicates 0 dB. If transmission power of the DMRS increases or decreases, the gNB may include an increased or decreased value in an indicated energy ratio value.

11. Time Index Indication Method

Figure 18:
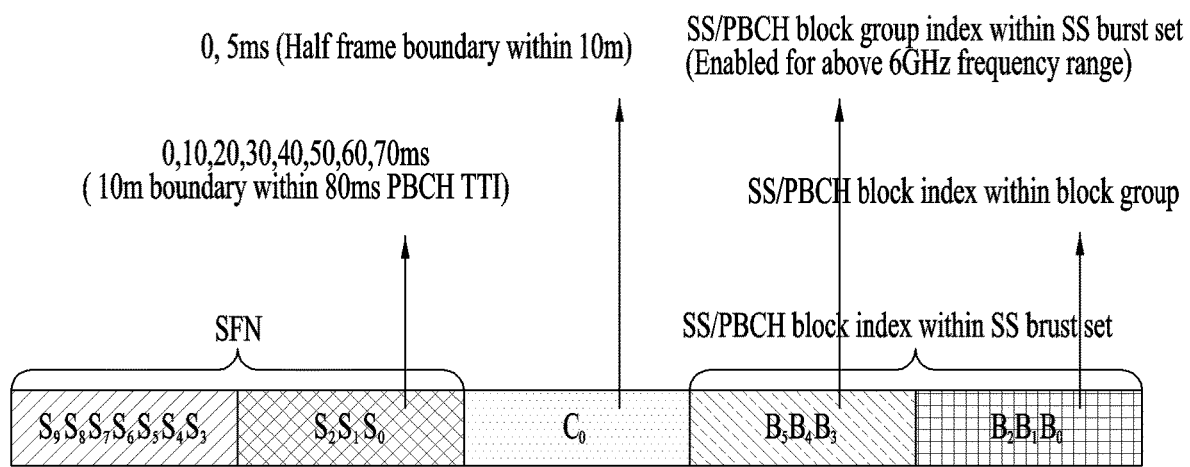

Referring to FIG. 18, time information includes an SFN, a half-frame boundary, and an SSB time index. The time information may be represented by 10 bits for the SFN, 1 bit for a half-frame boundary, and 6 bits for the SSB time index. In this case, a part of the 10 bits for the SFN may be included in PBCH content. In addition, an NR-PBCH DMRS may include 3 bits among the 6 bits for the SSB index.

Embodiments of the time index indication method represented in FIG. 18 may be as follows.

Method 1: S2 S1 (PBCH scrambling)+S0 C0 (PBCH contents)
Method 2: S2 S1 S0 (PBCH scrambling)+C0 (PBCH contents)
Method 3: S2 S1 (PBCH scrambling)+S0 C0 (PBCH DMRS)
Method 4: S2 S1 S0 (PBCH scrambling)+C0 (PBCH DMRS)

If a half-frame indication is transmitted through the NR-PBCH DMRS, additional performance improvement can be obtained by combining PBCH data every 5 ms. For this reason, 1 bit for the half-frame indication may be transmitted through the NR-PBCH DMRS as in Method 3 and Method 4.

When comparing Method 3 with Method 4, while Method 3 may reduce the number of times of blind decoding, there may be loss of PBCH DMRS performance. If the PBCH DMRS can transmit 5 bits including S0, C0, B0, B1, and B2 with excellent performance, Method 3 may be proper for the time indication method. However, if the PBCH DMRS cannot transmit the 5 bits with excellent performance, Method 4 may be proper for the time indication method.

When the above description is considered, 7 MSBs of the SFN may be included in the PBCH content and 2 or 3 LSBs may be transmitted through a PBCH scrambling sequence. In addition, 3 LSBs of the SSB index may be included in the PBCH DMRS and 3 MSBs of the SSB index may be included in the PBCH content.

Additionally, a method of acquiring an SSB time index of a neighbor cell may be considered. Since decoding through the DMRS sequence exhibits better performance than decoding through the PBCH content, 3 bits of the SSB index may be transmitted by changing the DMRS sequence within each duration of 5 ms.

Meanwhile in the frequency range below 6 GHz, the SSB time index may be transmitted using only an NR-PBCH DMRS of a neighbor cell, whereas, in the frequency range above 6 GHz, 64 SSB indexes are divided through the PBCH-DMRS and the PBCH content. Therefore, the UE needs to decode a PBCH of the neighbor cell.

However, decoding of both the PBCH-DMRS and the PBCH content may cause additional complexity of NR-PBCH decoding and reduce decoding performance of the PBCH relative to decoding of the PBCH-DMRS alone. Hence, it may be difficult to decode the PBCH in order to receive an SSB of the neighbor cell.

Accordingly, instead of decoding the PBCH of the neighbor cell, providing a configuration related to the SSB index of the neighbor cell to the UE by the serving cell may be considered. For example, the serving cell provides a configuration regarding 3 MSBs of the SSB index of a target neighbor cell to the UE and the UE detects 3 LSBs through the PBCH-DMRS of the target neighbor cell. Then, the UE may acquire the SSB index of the target neighbor cell by combining the 3 MSBs and the 3 LSBs.

The above description will now be given supplementarily. The UE acquires 3 MSBs of an SSB index of an SSB transmitted by the serving cell through PBCH content of the SSB received from the serving cell and detects 3 LSBs of the SSB index of the SSB transmitted by the serving cell through a PBCH-DMRS. Then, the UE receives another SSB from a neighbor cell and detects 3 LSBs of an SSB index of another SSB through a PBCH-DMRS included in another SSB. The UE acquires an SSB index of the neighbor cell by commonly applying the 3 MSBs of the SSB index obtained from the PBCH content of the SSB transmitted by the serving cell.

12. Evaluation of Measurement Result

Now, a performance measurement result according to a payload size, a transmission scheme, and a DMRS will be described. It is assumed that 2 OFDM symbols having 24 RBs are used to transmit an NR-PBCH. It is also assumed that an SS burst set (i.e., 10, 20, 40, or 80 ms) may have a plurality of periodicities and an encoded bit is transmitted within 80 ms.

(1) Number of Hypotheses for DMRS Sequence

Figure 19:
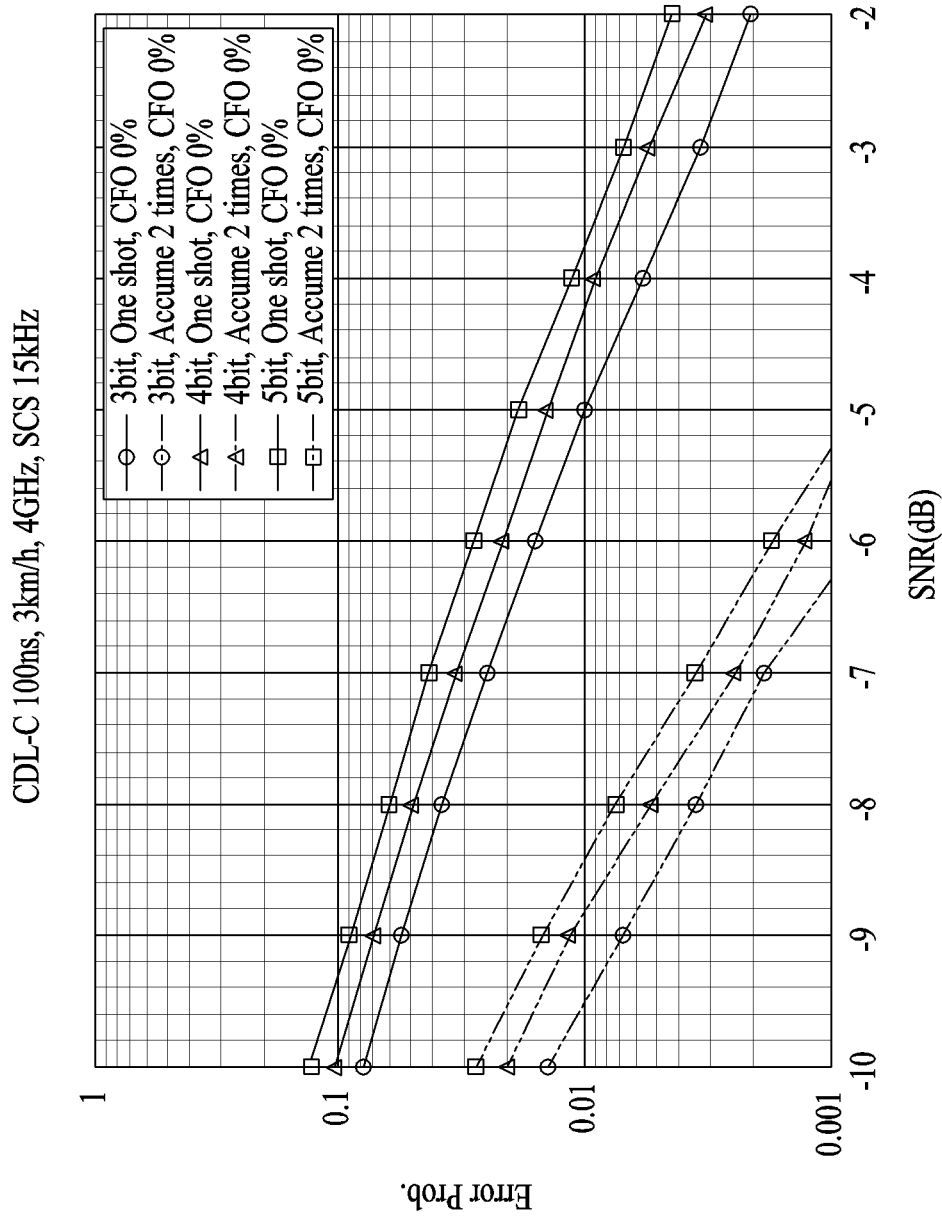
FIGS. 19 to 31 are views illustrating performance measurement results according to an embodiment of the present disclosure.

FIG. 19 illustrates a measurement result according to an SSB index. Herein, 144 REs are used for a DMRS and 432 REs are used for information, in 24 RBs and 2 OFDM symbols. It is assumed that a long sequence (e.g., a length-31 Gold sequence) is used as a DMRS sequence and QPSK is used.

Referring to FIG. 19, when detection performance of 3 to 5 bits is accumulatively measured, an error rate of 1% is shown in −6 dB. Accordingly, in terms of detection performance, information of 3 to 5 bits may be used as the number of hypotheses for the DMRS sequence.

(2) Modulation Type

Figure 20:
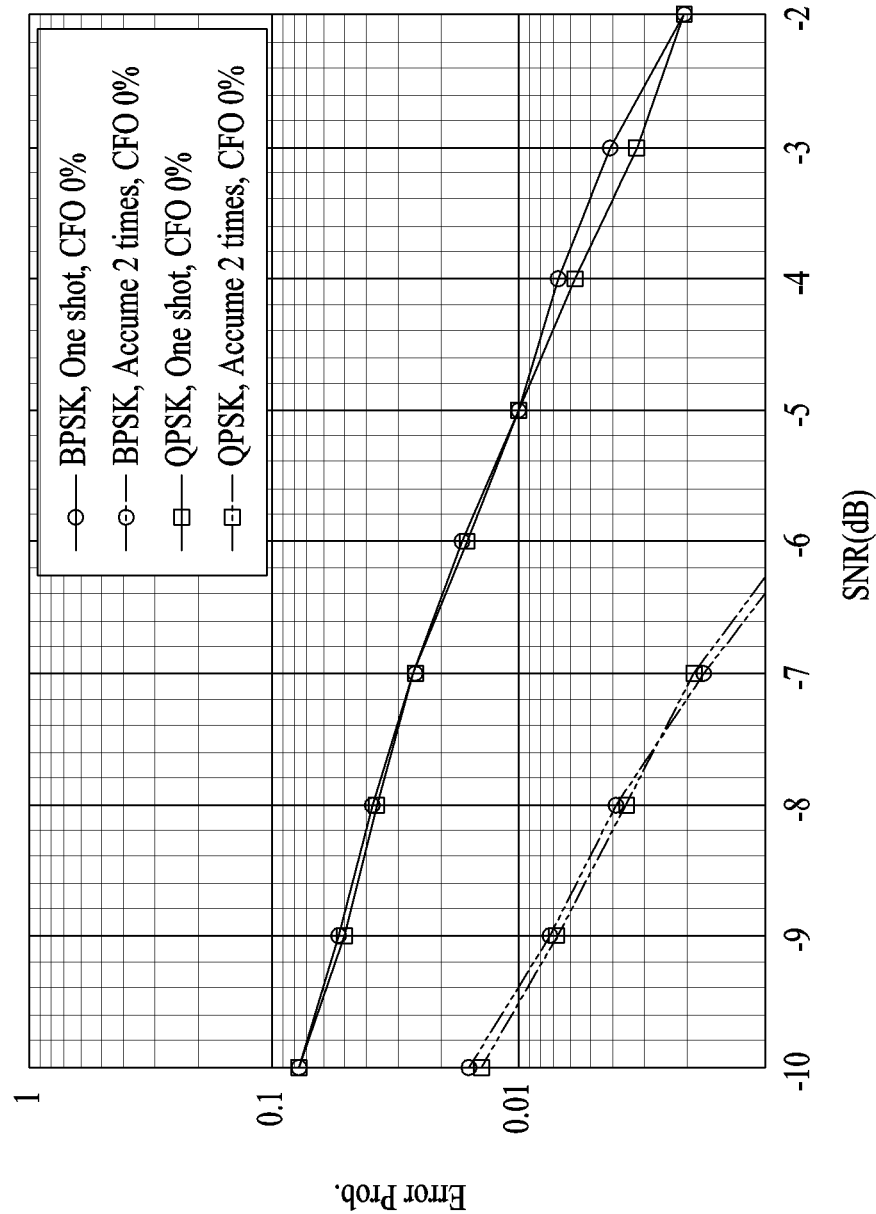
Figure 21:
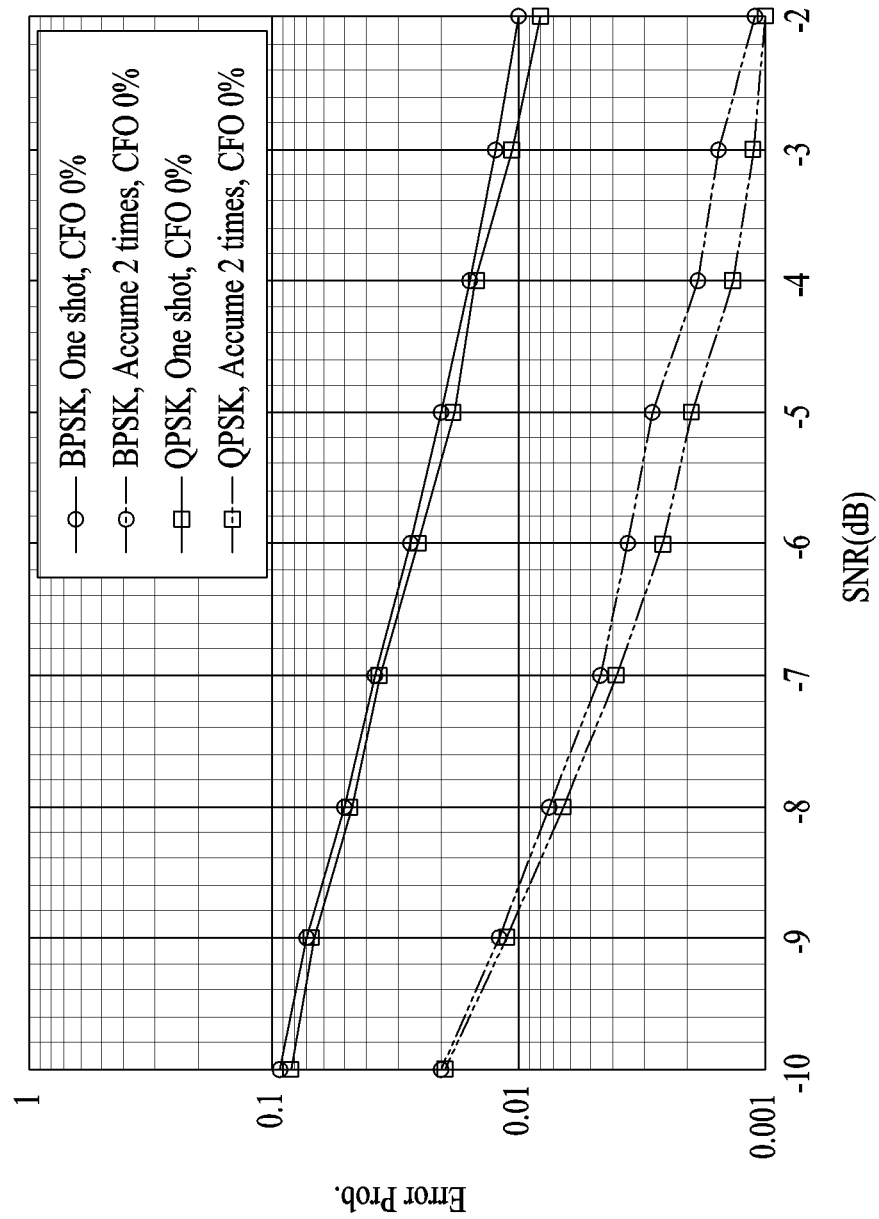

FIGS. 20 and 21 shows performance measurement results comparing BPSK and QPSK. In this experiment, the number of hypotheses for a DMRS sequence is 3 bits, the DMRS sequence is based on a long sequence, and a power level of an interference TRP is equal to a power level of a serving TRP.

Referring to FIGS. 20 and 21, it can be appreciated that BPSK is similar in performance to QPSK. Accordingly, even when any modulation type is used for the DMRS sequence, there is little difference in terms of performance measurement. However, referring to FIGS. 22 and 23, it can be appreciated that correlation characteristics differ in BPSK and QPSK.

Figure 22:
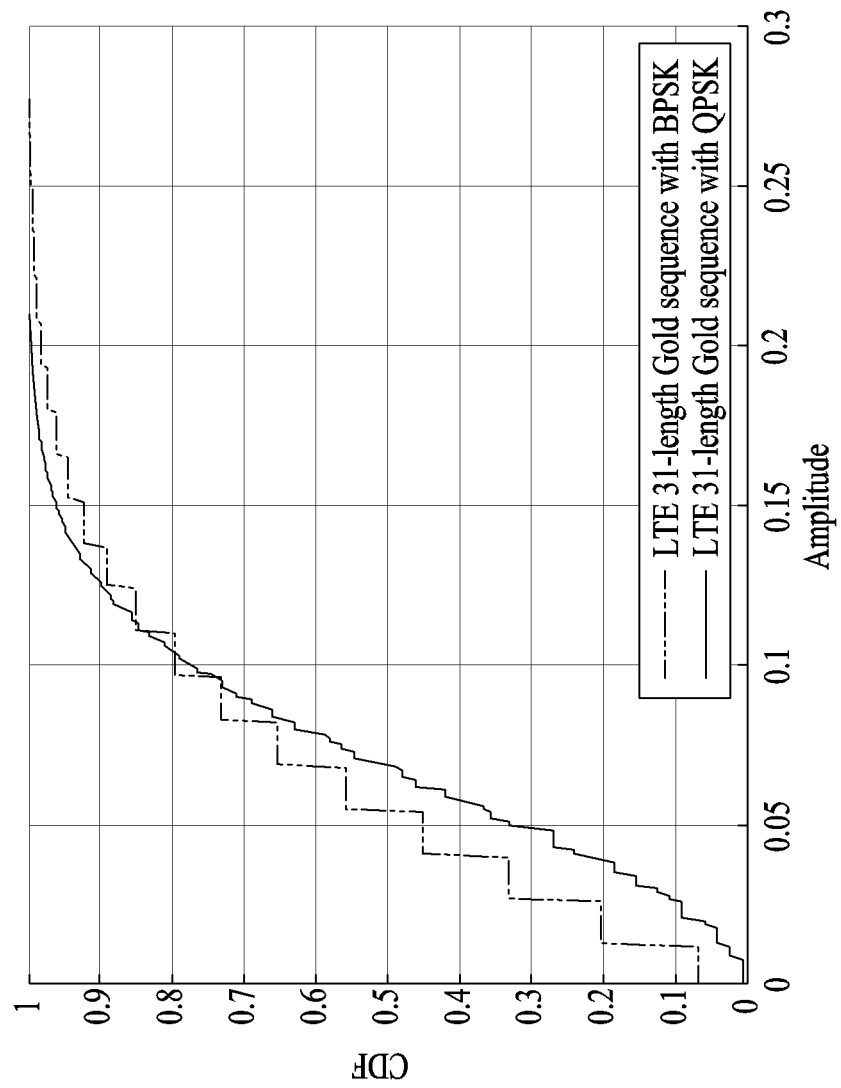
Figure 23:
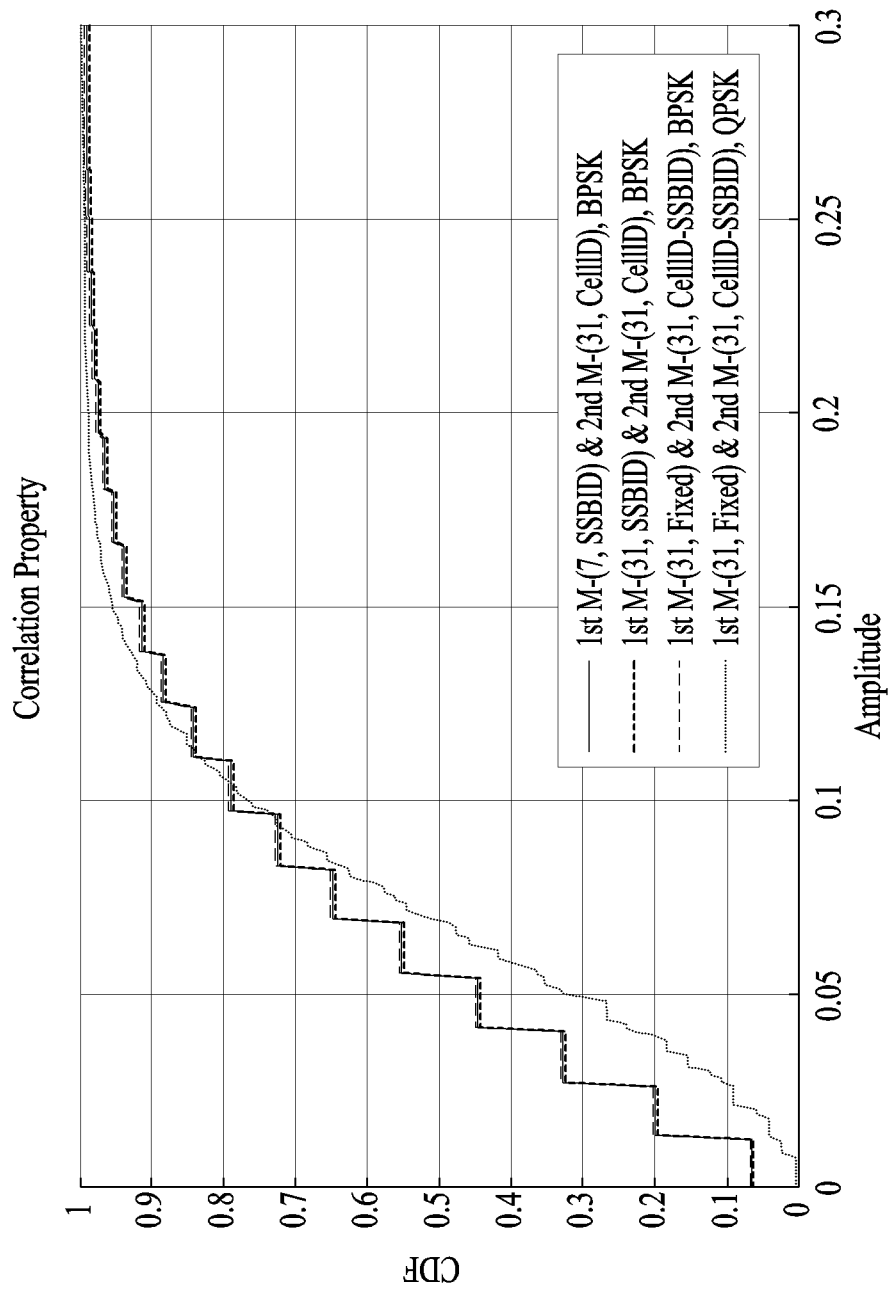

Referring to FIGS. 22 and 23, more sequences using BPSK are distributed than those using QPSK in a region in which a correlation amplitude is 0.1 or more. Therefore, when a multi-cell environment is considered, it is desirable to use QPSK as a modulation type of the DMRS. That is, in terms of a correlation characteristic, QPSK is a more suitable modulation type for a DMRS sequence.

(3) Sequence Generation of PBCH DMRS

Figure 24:
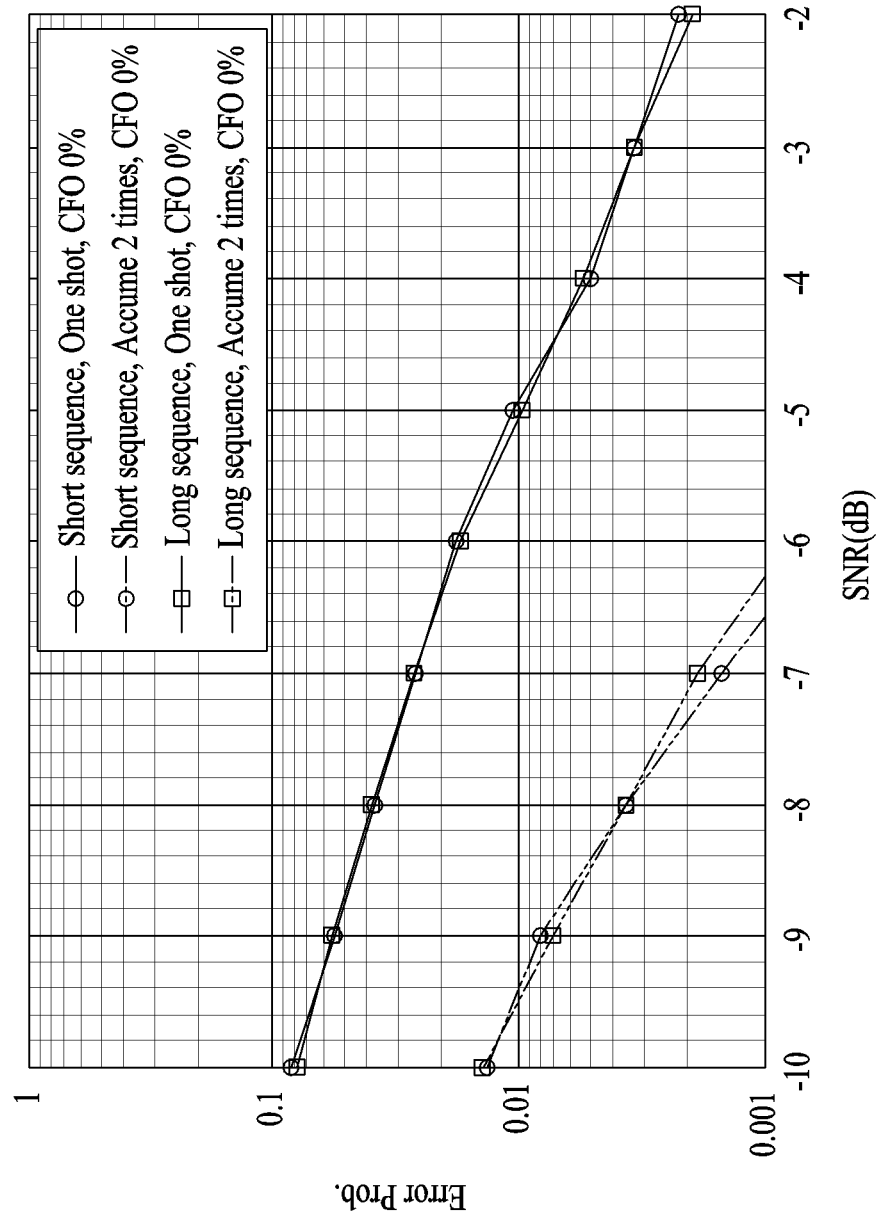
Figure 25:
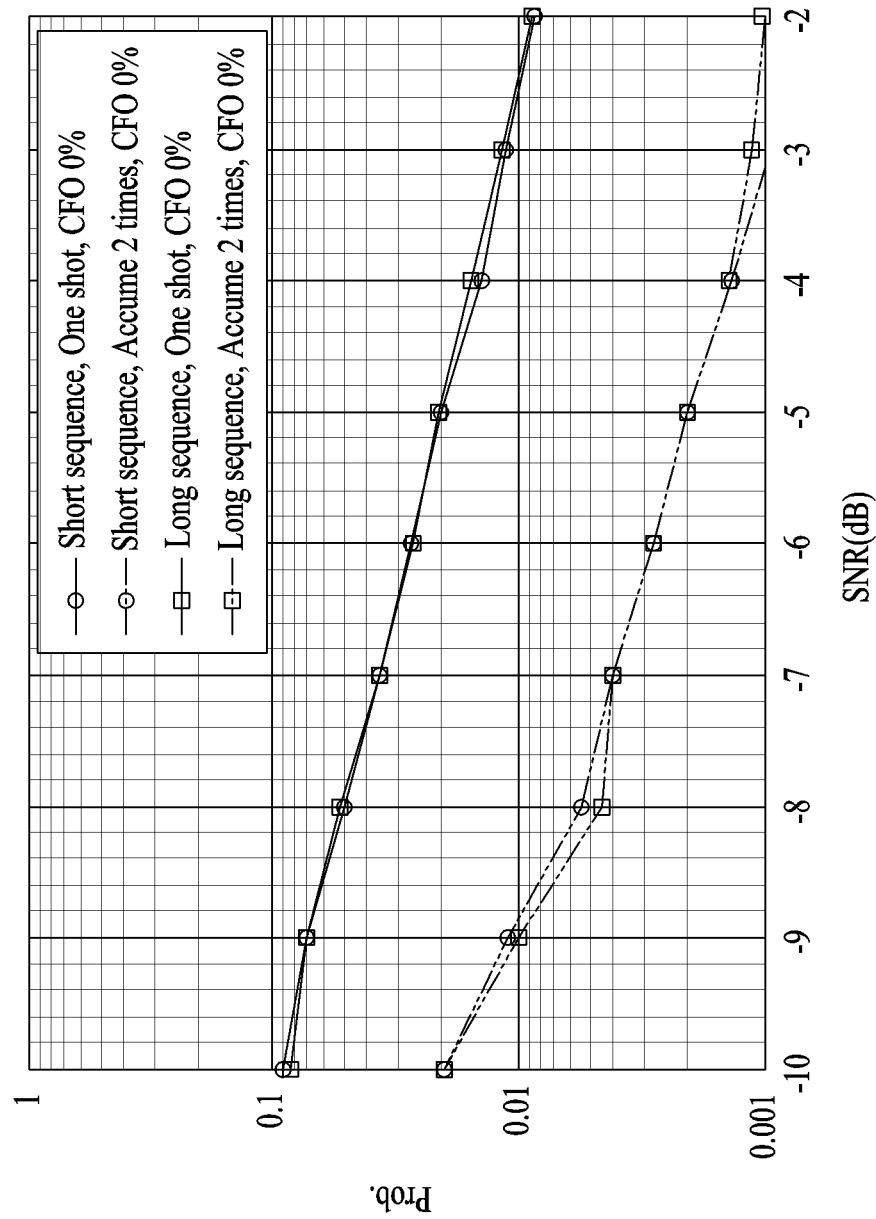

FIGS. 24 and 25 illustrate measurement results according to DMRS sequence generation. A DMRS sequence may be generated based on a long sequence having a polynomial degree of 30 or more and a short sequence having a polynomial degree of 8 or less. The number of hypotheses for the DMRS sequence is 3 bits and a power level of an interference TRP is the same as that of a serving TRP.

Referring to FIGS. 24 and 25, it can be appreciated that short-sequence based detection performance is similar to long-sequence based detection performance.

Specifically, although it is desired to raise correlation performance of a sequence by introducing a length-7 polynomial to a first m-sequence, this scheme has little difference with a scheme using a length-31 polynomial which is a legacy first m-sequence. In addition, although a sequence has been generated using SSBID as an initial value of the first m-sequence, this scheme has little difference with a scheme of fixing an initial value of the legacy first m-sequence and using SSBID-CellID for a second m-sequence.

Therefore, a length-31 Gold sequence is used as in LTE, an initial value of the first m-sequence is fixed for initialization as in a legacy scheme, and SSBID-CellID is applied to the second m-sequence.

(4) DMRS RE Mapping

Figure 26:
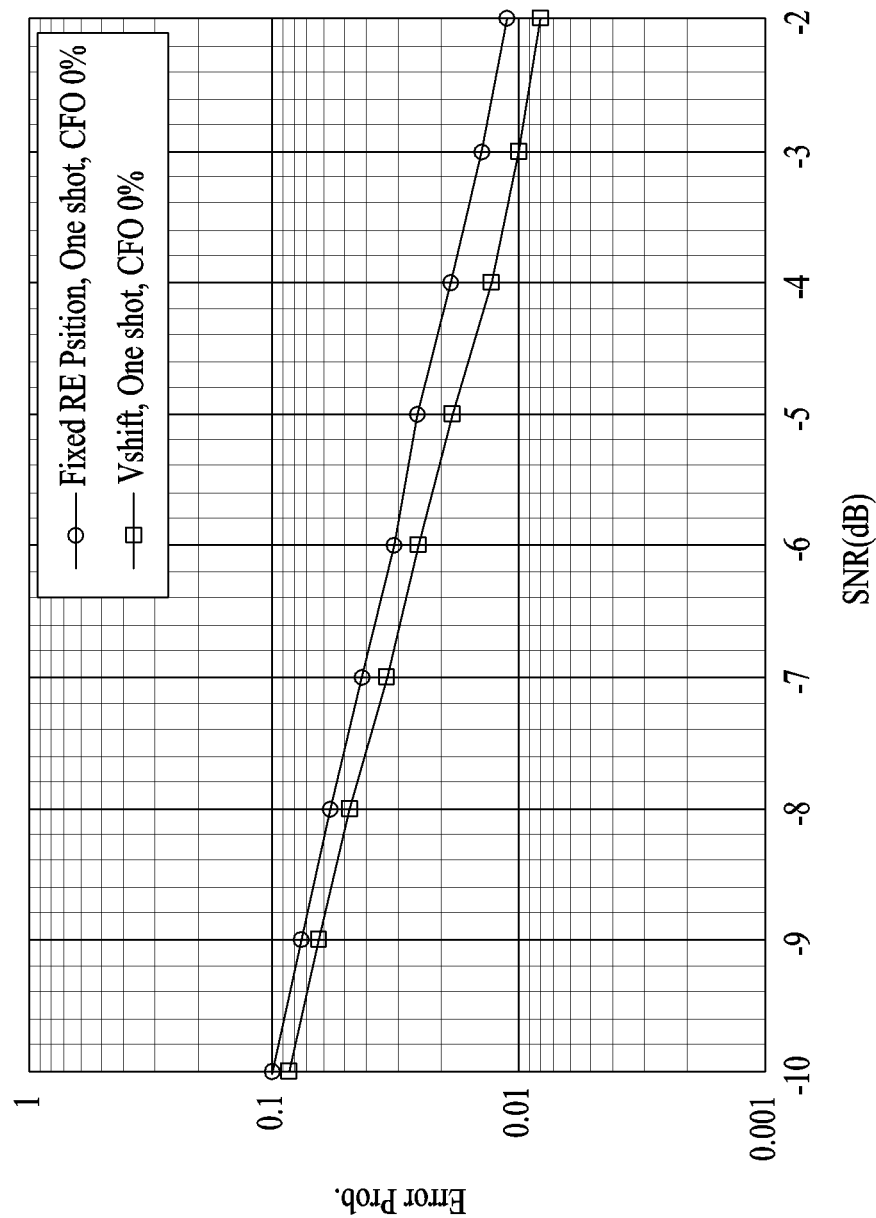

FIG. 26 illustrates a performance measurement result according to an equal interval RE mapping method and an unequal interval RE mapping method. It is assumed that the number of hypotheses for a DMRS sequence is 3 bits, the DMRS sequence is based on a long sequence, a power level of an interference TRP is identical to that of a serving TRP, and only one interference source is present.

As can be seen from FIG. 26, use of variable RE mapping may cause an effect of randomly distributing interference. Therefore, detection performance of variable RE mapping is better than detection performance of fixed RE mapping.

Figure 27:
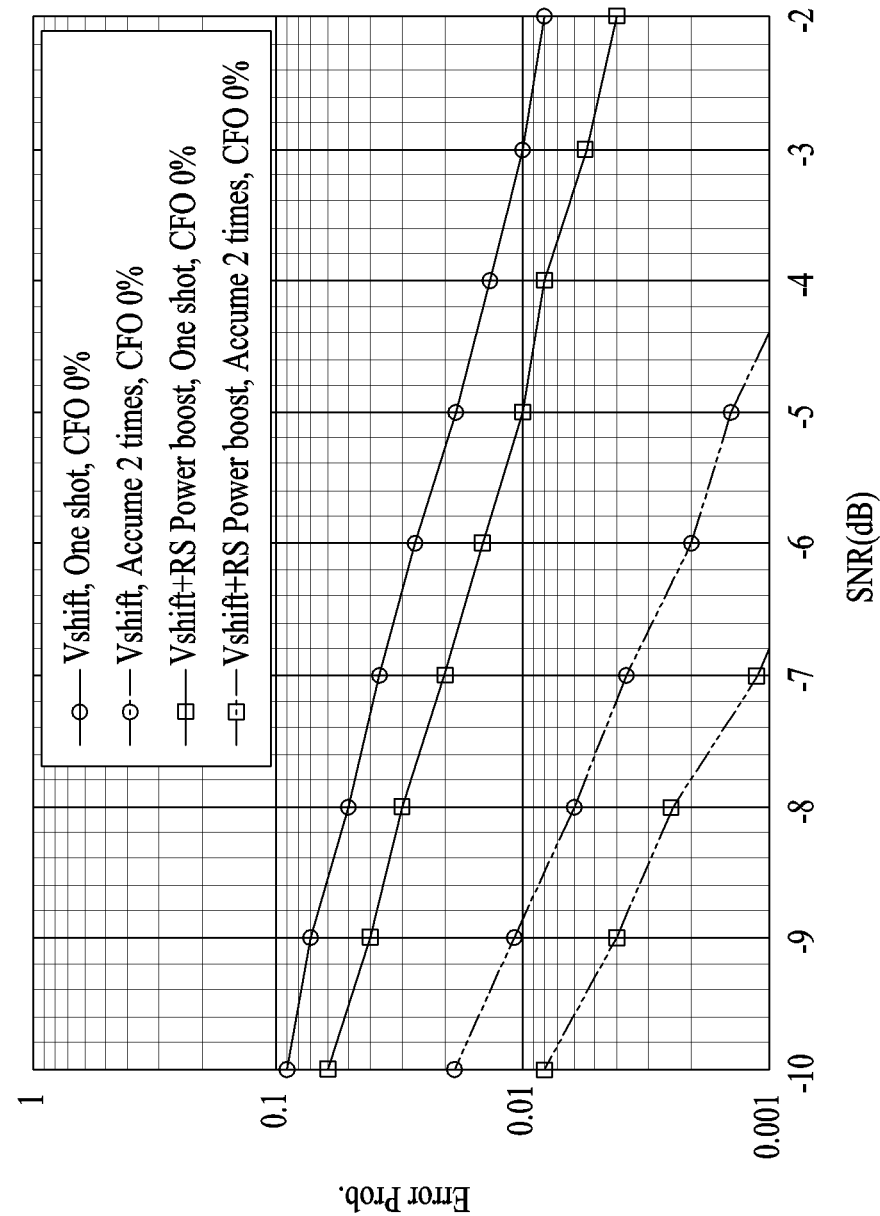

FIG. 27 illustrates a measurement result when RS power boosting is used. Herein, it is assumed that RE transmission power for a DMRS is higher than RE transmission power for PBCH data by about 1.76 dB (=10*log(1.334/0.889)). If both variable RE mapping and DMRS power boosting are used, interference of other cells is reduced. As can be appreciated from FIG. 27, performance when RS power boosting is applied has gain of 2 or 3 dB as compared with the case in which RS power boosting is not present.

Figure 28:
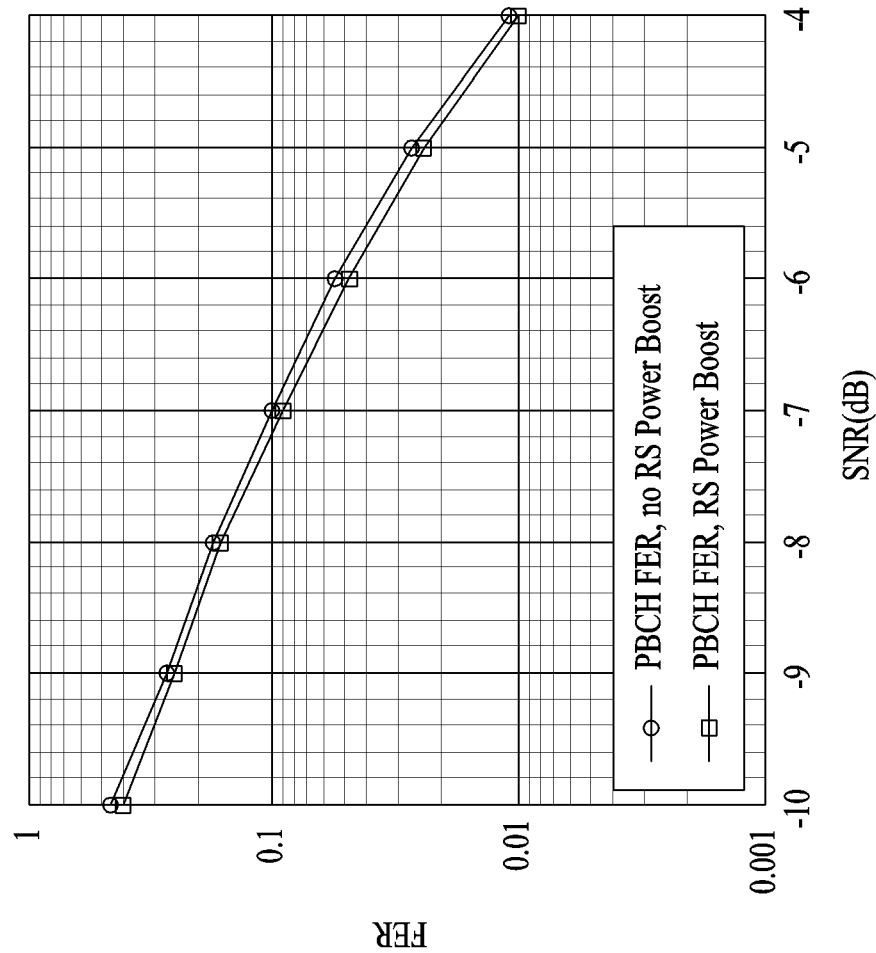
Figure 29:
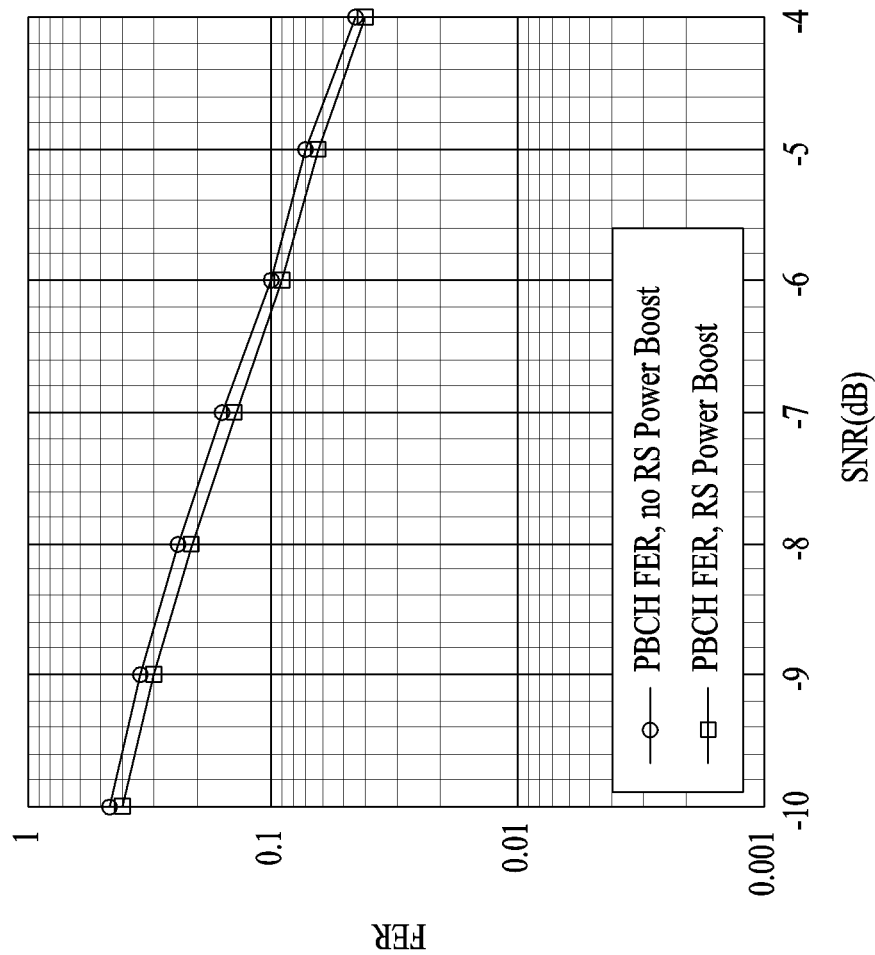

On the other hand, RS power boosting reduces RE transmission power for the PBCH data. Therefore, RS power boosting may affect PBCH performance. FIGS. 28 and 29 illustrate results of measuring PBCH performance when RS power boosting is present and when RS power boosting is not present. It is assumed that a periodicity of an SS burst set is 40 ms and an encoded bit is transmitted within 80 ms.

If RE transmission power for the PBCH data is reduced, performance loss may occur. However, since channel estimation performance is improved due to increase in RS power, demodulation performance can be improved. Accordingly, as can be shown in FIGS. 28 and 29, the two cases exhibit nearly equal performance. Therefore, an effect of transmission power loss of REs for the PBCH data may be complemented by gain of channel estimation performance.

Figure 30:
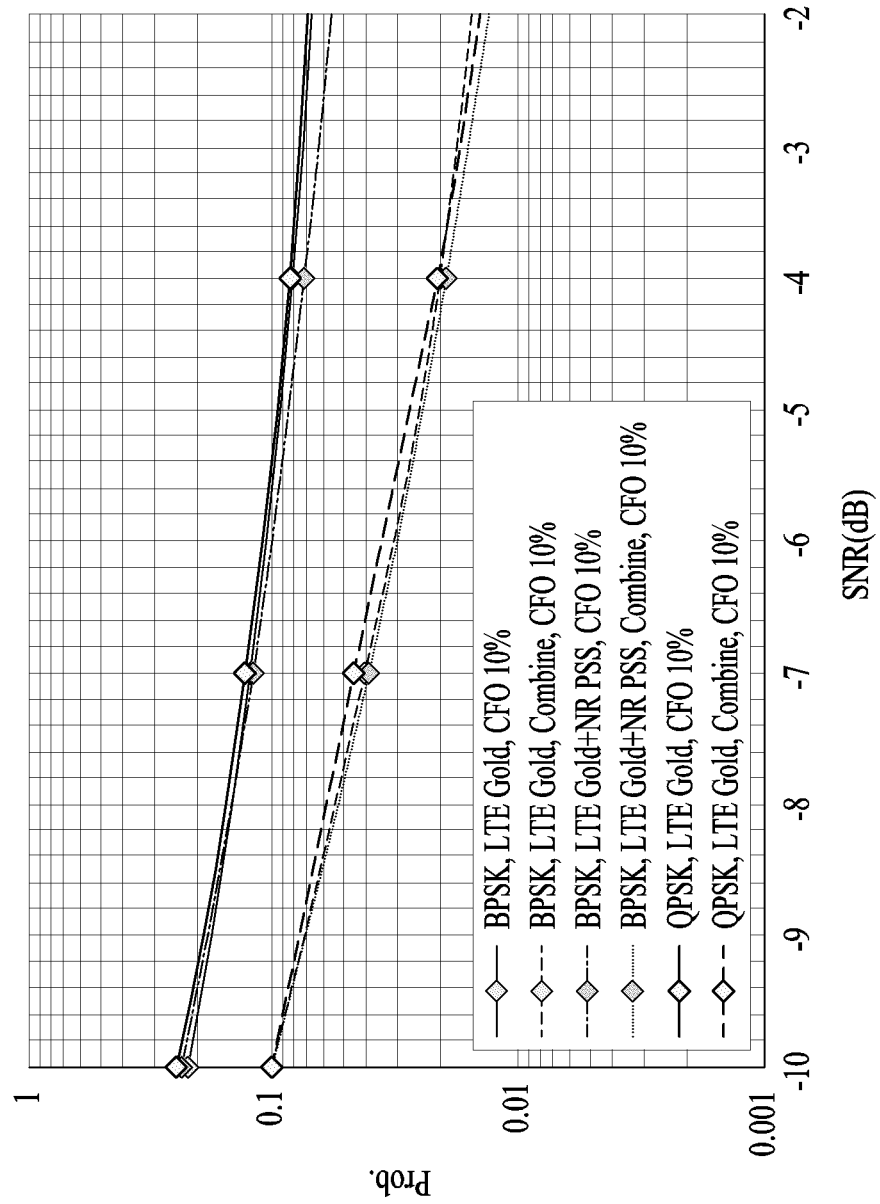
Figure 31:
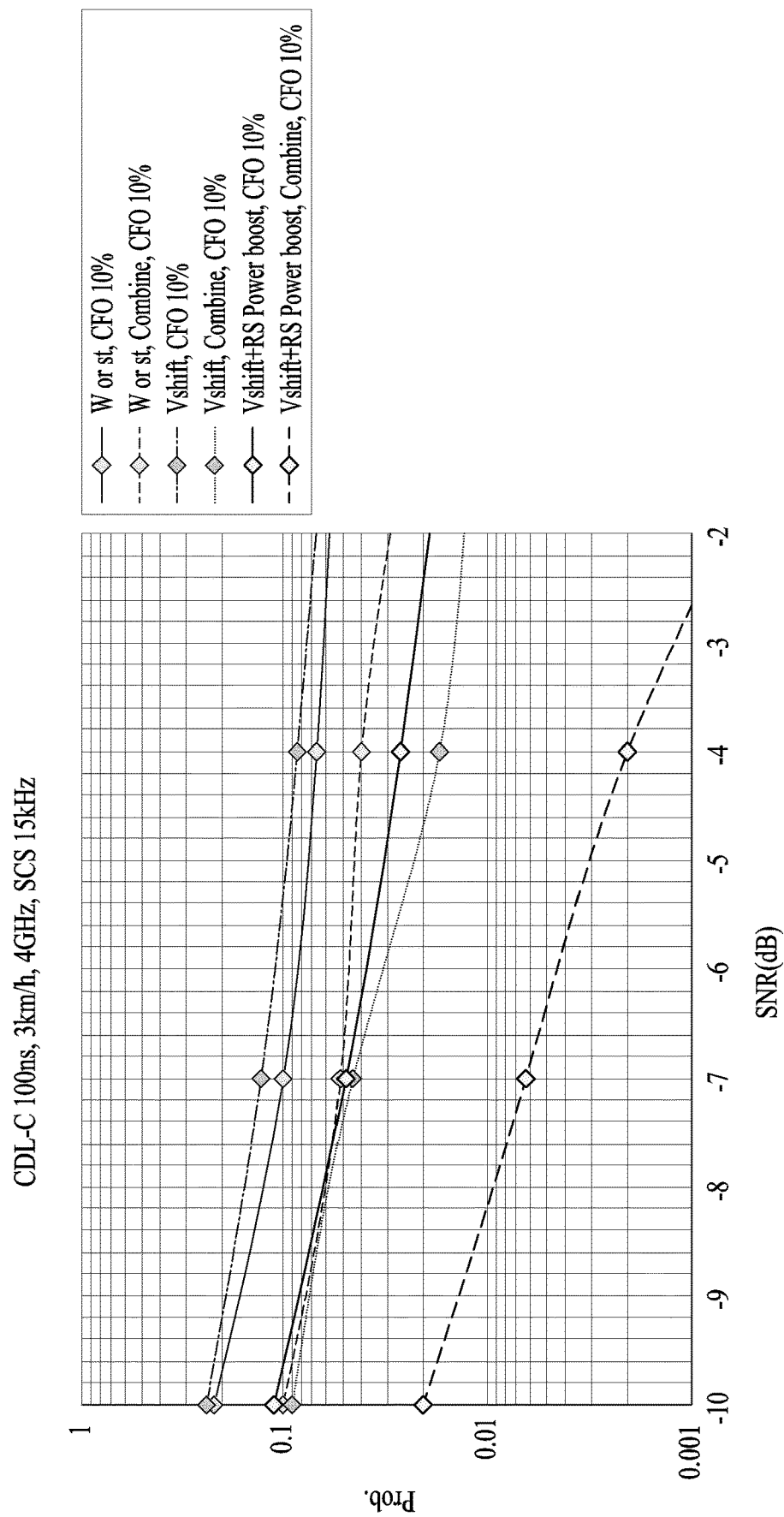

An experimental observation result of applying Vshift to RS power boosting will now be described with reference to FIGS. 30 and 31. When Vshift of changing the position of a DMRS RE on the frequency axis according to a cell ID is introduced, if a PBCH DMRS transmitted in a multi-cell environment is received during two periodicities and two PBCHs are combined, detection performance is improved due to ICI randomization and, if Vshift is applied, detection performance is remarkably improved.

[Table 3] below shows assumption values of parameters used for the above-described performance measurement.

TABLE 3

| Parameter | Value |
|---|---|
| Carrier Frequency | 4 GHz |
| Channel Model | CDL_C (delay scaling values: 100 ns) |
| Subcarrier Spacing | 15 kHz |
| Antenna Configuration | TRP: (1, 1, 2) with Omni-directional antenna element |
| | UE: (1, 1, 2) with Omni-directional antenna element |
| Frequency Offset | 0% and 10% of subcarrier spacing |
| Default period | 20 ms |
| Subframe duration | 1 ms |
| OFDM symbols in SF | 14 |
| Number of interfering TRPs | 1 |
| Operating SNR | −6 dB |

13. Half-Frame Index Indication and Signal Design

In addition to the above-described time index indication methods, other time index indication methods may be considered. Particularly, various embodiments for effectively indicating a half-frame index will now be described.

SSBs included in a duration of 5 ms may be transmitted at a periodicity of 5 ms, 10 ms, 20 ms, 40 ms, 80 ms, or 160 ms. The UE performs signal detection in an initial access procedure under the assumption that the SSBs are transmitted at a longer periodicity (e.g., 10 ms or 20 ms) than 5 ms. Particularly, in an NR system, the UE of the initial access procedure performs signal detection under the assumption that SSBs are transmitted at a periodicity of 20 ms.

However, if the gNB transmits an SSB at a periodicity of 5 ms and the UE detects the SSB at a periodicity of 20 ms, the UE should consider that the SSB is transmitted in a first radio half-frame and that the SSB is transmitted in a second radio half-frame. That is, the UE cannot accurately assume that the SSB is received in the first half frame or in the second half frame. Accordingly, the gNB may consider methods of accurately indicating whether the SSB is transmitted in the first half frame or the second half frame to the UE as follows.

(1) Explicit Indication:
PBCH content is changed at a periodicity of 5 ms. In this case, the UE may acquire half-frame time information by decoding a received SSB.

(2) Implicit Indication:
A sequence of a PBCH DMRS is changed at a periodicity of 5 ms.
A sequence mapping method of the PBCH DMRS is changed at a periodicity of 5 ms.
Phases of OFDM symbols in which a PBCH is transmitted are shifted at a periodicity of 5 ms.
Different scrambling sequences are applied to encoded bits of PBCH content at a periodicity of 5 ms.

The above methods may be used by a combination thereof and various other modifications may be made in addition to the above-described methods. Various methods for transmitting half-frame time information may be considered according to a situation in which the UE should currently receive time information including a UE state in which the UE is in an initial access state or an idle mode and a UE situation in which the UE should perform handover to a neighbor cell (inter-cell)/another RAT (inter-RAT).

Methods of reducing complexity during acquisition of the half-frame time information will now be described.

Embodiment 8-1

The UE of an initial access procedure attempts to detect a signal of an SSB under the assumption that the SSB is transmitted at one fixed position of either a first half-frame and a second half-frame in a time range of 10 ms. That is, the UE acquires time information such as an SFN or an SSB index by detecting a sequence included in a signal or a channel included in the SSB or by performing data decoding and acquires half-frame information through a slot defined to transmit the SSB in a radio frame or a position of an OFDM symbol.

As a detailed example of the above-described method of acquiring the time information, a method of allowing the UE performing initial access to detect only an SSB transmitted in a specific half-frame and not detect an SSB transmitted in the other half-frame, when SSBs are transmitted at a periodicity of 5 ms, and an operation of the UE will be described.

For this purpose, two types of SSBs are configured. In the present disclosure, for convenience of description, the two types of SSBs are referred to as a first type of SSB and a second type of SSB. A network configures the first type of SSB and configures the second type of SSB which is obtained by shifting a phase of a PSS/SSS/PBCH constituting the first type of SSB, a symbol position, a sequence type, a symbol mapping rule, or transmission power.

Next, the gNB transmits the first type of SSB in the first half-frame and transmits the second type of SSB in the second half-frame.

The UE performing initial access attempts to perform SS detection and PBCH decoding under the assumption that the first type of SSB has been transmitted from the gNB. Upon succeeding in SS detection and PBCH decoding, the UE assumes that a corresponding point is a slot and OFDM symbol belonging to the first half-frame.

Embodiment 8-2

As a detailed method of Embodiment 8-1, a method of acquiring half-frame boundary information by shifting phases of some of symbols to which PSS/SSS/PBCH constituting an SSB are mapped will now be described.

That is, the UE may transmit time information such as an SFN, a half-frame, and an SSB index by shifting phases of the PSS/SSS/PBCH constituting the SSB and particularly transmit the time information of the half-frame.

It is assumed that the PSS/SSS/PBCH included in the SSB use the same antenna port.

Specifically, phases of OFDM symbols including the PSS/SSS and phases of OFDM symbols including the PBCH may be shifted according to transmission periodicity. In this case, the transmission periodicity at which the phases are shifted may be 5 ms.

Referring to FIG. 32, phases of (+1, +1, +1, +1) or (+1, −1, +1, −1) may be respectively applied to OFDM symbols including PSS-PBCH-SSS-PBCH at a periodicity of 5 ms. As another method, polarities of the OFDM symbols including the PSS/SSS are inverted. That is, if the polarities of the OFDM symbols including PSS-PBCH-SSS-PBCH are (a, b, c, d), the polarities of the PBCHs may be inverted to (+1, +1, +1, +1) and (−1, +1, −1, +1). In addition, polarities of some OFDM symbols among the OFDM symbols including the PSS and the SSS may be inverted to (+1, +1, +1, +1) and (+1, +1, −1, +1) or to (+1, +1, +1, +1) and (−1, +1, +1, +1).

As a specific example of the above method, a method of shifting a phase at a periodicity of a 20-ms interval may be considered. That is, referring to FIG. 32, phases of a first 5-ms periodicity may be transmitted as (+1, +1, +1, +1), phases of a second 5-ms periodicity may be transmitted as (+1, −1, +1, −1), phases of a third 5-ms periodicity may be transmitted as (+1, −1, −1, −1), and phases of a fourth 5-ms periodicity may be transmitted as (−1, −1, −1, −1). Using the above-described method, boundary information of a 5-ms periodicity, i.e., boundary information of a half-frame, may be acquired. Since phases are shifted at a periodicity of a 20-ms interval, SFN information may also be acquired. However, in order to acquire the SFN information, phases of (+1, +1, +1, +1) may be transmitted in a first 10-ms duration and phases of (+1, −1, +1, −1) may be transmitted in a second 10-ms duration, at a periodicity of a 20-ms interval.

Meanwhile, in order to distinguish between periodicities of a 20-ms interval, only phases of the PSS and the SSS included in the SSB may be shifted. For example, phases of the first 5-ms periodicity may be transmitted as (+1, +1, +1, +1) and phases of the second 5-ms periodicity to the fourth 5-ms periodicity may be transmitted as (−1, +1, −1, +1). That is, periodicities of a 20-ms interval may be distinguished by changing phases of the PSS/SSS of the first 5-ms periodicity and phases of the PSS/SSS of the other 5-ms periodicity.

In this case, SSBs transmitted from the second 5-ms periodicity to the fourth 5-ms periodicity may not be detected by the UE because phases of the PSS/SSS are shifted.

Meanwhile, phase change may also be considered together with polarity inversion of a transmitted phase. For example, phases and polarities may be divided into (+1, +1, +1, +1) and (+1, +j, +1, +j) to transmit the SSB at a periodicity of 5 ms and divided into (+1, +1, +1, +1) and (+1, −j, +1, −j) to transmit the SSB at a periodicity of 5 ms.

The time information of the half-frame may be acquired by shifting a phase of a PBCH symbol and may be used to determine a PBCH scrambling sequence. That is, the gNB configures and transmits the SSB by shifting phases of an SSS symbol and a PBCH symbol at a periodicity of 5 ms. In other words, the gNB may shift phases of symbols in which the PBCH and the SSS of the SSB are transmitted according to a position at which the SSB is transmitted within a specific periodicity. In this case, phases of symbols of SSSs and PBCHs corresponding to SSBs which are actually transmitted by the gNB, rather than phases of symbols of SSSs and PBCHs corresponding to all candidate SSBs in which SSBs can be transmitted, may be shifted.

In other words, phases of symbols corresponding to an SSS and a PBCH of a candidate SSB which is not actually transmitted may not be shifted although the symbols corresponds to a candidate SSB included in a 5-ms half-frame.

Detailed methods for the above cases will now be described.

(Method 1) One bit in a PBCH DMRS may be used as an indication for indicating the half-frame. A PBCH scrambling sequence may be initialized by the indication for the half-frame timing. 7 to 10 MSBs of an SFN may be explicitly indicated through PBCH content and 3 LSBs of the SFN may be used for the PBCH scrambling sequence.

(Method 2) One bit for the half-frame timing may be indicated by the PBCH. The PBCH scrambling sequence may be initialized by the indication for the half-frame timing. In this case, a difference in phase between a PBCH symbol and an SSS symbol may occur. 7 to 10 MSBs of the SFN may be explicitly indicated through the PBCH content and 3 LSBs of the SFN may be used for the PBCH scrambling sequence.

(Method 3) One bit for the half-frame timing may be indicated by the PBCH. In this case, a difference in phase between the PBCH symbol and the SSS symbol may occur. 7 to 10 MSBs of the SFN may be explicitly indicated through the PBCH content and 3 LSBs of the SFN may be used for the PBCH scrambling sequence.

Embodiment 8-3

The gNB indicates a transmission periodicity of an actually transmitted SSB to the UE performing measurement and handover. The transmission periodicity may be additionally transmitted together with measurement periodicity information included in measurement related time information. The UE may regard the measurement periodicity information as transmission periodicity information of the SSB and perform measurement and handover based on the transmission periodicity information. A handover command may include system information related to a target cell, such as cell information, SIBs 0, 1, and 2, etc. Meanwhile, for convenience of discussion during design in an NR system, new system information including information of SIBs 0, 1, and 2 defined in LTE is referred to as remaining minimum system information (RMSI).

The above-described RMSI may include information about the position and transmission periodicity of an actually transmitted SSB in the target cell. Further, it may be necessary to additionally transmit information about SSB transmission periodicities of handover candidate cells as well as information about an SSB transmission periodicity of the target cell, for the purpose of handover. Therefore, information about SSB transmission periodicities of candidate cells may be defined as system information different from the handover command and may be transmitted to the UE.

In this case, the operation of the UE will now be described. If an SSB transmission periodicity longer than 5 ms is indicated, the UE detects SSs of neighbor cells and acquires time information, i.e., an SSB index, using a first type of SSB. If an SSB transmission periodicity of 5 ms is indicated, the UE detects SSs of neighbor cells and acquires time information, using a first type of SSB and a second type of SSB.

Meanwhile, as a method of reducing reception complexity of the UE, the UE may detect an SSB of a periodicity of 10 ms using the first type of SSB and attempt to detect an SS and acquire time information using second type of SSB at a time position having an offset of about 5 ms based on the first type of SSB detected in the range of 10 ms after detecting the first type of SSB. The UE performing handover using the above-described method may acquire time information used in a target cell/candidate cells/target RAT.

Embodiment 8-2 is summarized as follows. If a periodicity for performing measurement is transmitted to the UE, a periodicity of an actually transmitted SSB is also indicated to the UE. In this case, a configuration for measurement may be a periodicity given to perform measurement in terms of the UE and this periodicity may be configured to be longer than a transmission periodicity of an SSB actually transmitted by the gNB. This may cause the UE to perform decoding at a periodicity of an actually transmitted SSB upon decoding a PBCH of neighbor cells before handover and reduce UE battery consumption by reducing the number of times of decoding.

Embodiment 8-4

A channel/signal configuration, a resource configuration scheme, and a sequence mapping scheme may be changed according to time information assumed by the gNB or the state of the UE.

The time information includes an SFN, a slot, an OFDM symbol number, and the like. A subframe number, a slot number, etc. may be indexed in a time range of M and the subframe number, the slot number, etc. may be indexed in a time range of N less than M. Herein, M=10 ms and N=5 ms. Time indexes defined in different time ranges may be applied according to conditions such as time information assumed by the gNB and an access state of the UE.

A detailed embodiment of the above example will now be described.

(Method 1) The time information, the channel/signal configuration, or the resource configuration scheme may be changed according to a synchronization indication indicating a synchronous network or an asynchronous network or an access state of the UE indicating whether the state of the UE is initial access, handover, or idle/connected mode. In this case, the synchronization indication may be transmitted to the UE from the gNB.

(Method 2) A sequence mapped to an RS such as a DMRS, a CSI-RS, or an SRS or a scrambling sequence of a data bit such as a PDSCH/PUSCH may be changed according to the time information such as a slot number or an OFDM symbol number in the range of 10 ms or may be changed at a periodicity of 5 ms. That is, a CSI-RS resource and a PRACH resource may be configured based on a radio frame range, a first half-frame range, or a second half-frame range in a range of 10 ms and may be configured based on a half-frame at a periodicity of 5 ms.

(Method 3) The channel/signal configuration, the resource configuration scheme, and a sequence mapping scheme may be changed according to a bandwidth part. Within a bandwidth part used for initial access, a data channel such as a PDSCH/PUSCH for carrying broadcasting system information (SI), RACH Msg 2/3/4, and paging, a control channel such as a PDCCH/PUSCH, and an RS such as a DMRS/CRS-RS/SRS/PTRS may be configured within an N-time range and may be repeatedly transmitted in an N-time unit. On the other hand, within a bandwidth part configured in an RRC connected state, the data channel, the control channel, and the RS are configured within an M-time range and may be repeatedly transmitted in an M-time unit.

(Method 4) A PRACH preamble and Msg 2, which are resources used for handover, may be configured in an M-time range and an N-time range. For convenience of description, it is assumed that M=10 ms and N=5 ms.

If the indication indicating the synchronous network is indicated to the UE, the UE assumes that signals transmitted by cells in the same frequency band have been received within a preset range (e.g., 1 ms) and assumes that 5-ms time information obtained from a serving cell can be equally applied to a neighbor cell as well as the serving cell.

Under this assumption, the UE may use resources configured in the M-time range. That is, even though there is no transmission of a specific indication by the gNB, the UE may use resources configured in the M-time range in a circumstance assumed to be the synchronous network. Meanwhile, if the indication indicating the asynchronous network is indicated to the UE or in a circumstance assumed to be the asynchronous network, the UE may use resources configured in the N-time range.

(Method 5) If the indication indicating the synchronous network is indicated to the UE, the UE assumes that signals transmitted by cells in the same frequency band have been received within a preset range (e.g., 1 ms) and assumes that 5-ms time information obtained from the serving cell can be equally applied to the neighbor cell as well as the serving cell.

14. Bandwidth Part (BWP) for DL Common Channel Transmission

An initial access procedure of LTE is performed within a system bandwidth configured by a master information block (MIB). A PSS/SSS/PBCH is arranged based on the center of the system bandwidth. A common search space is defined within the system bandwidth and system information is transmitted by a PDSCH of the common search space allocated within the system bandwidth and an RACH procedure for Msg 1/2/3/4 is performed.

An NR system supports an operation within a broadband component carrier (CC), whereas it is very difficult for the UE to be implemented to have capabilities of performing a necessary operation within all broadband CCs in terms of cost. Therefore, it may be difficult to smoothly implement an initial access procedure within the system bandwidth.

Figure 33:
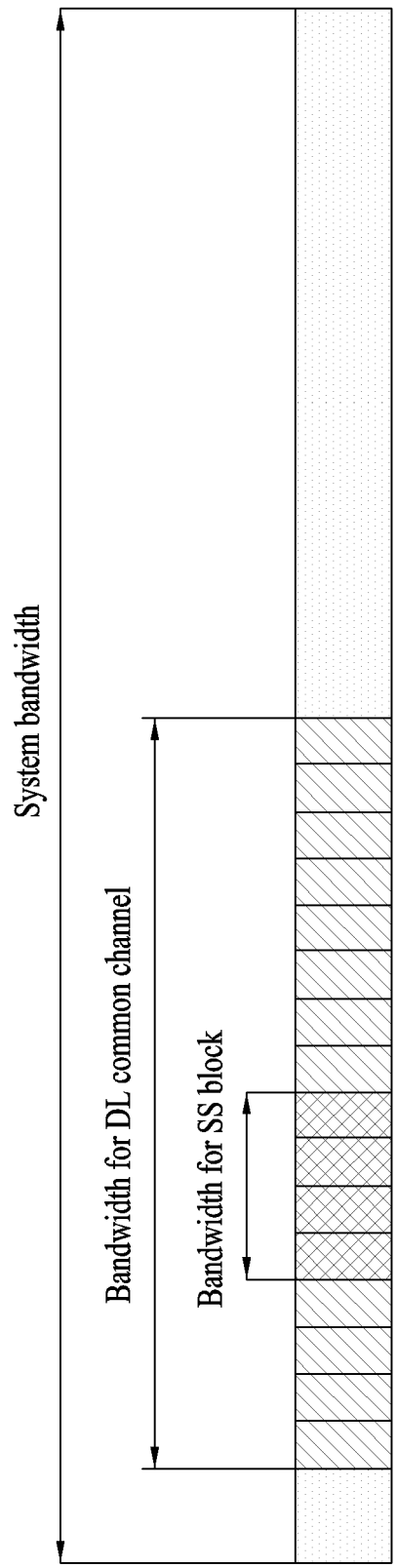
FIGS. 33 and 34 are views for explaining embodiments for configuring bandwidths for a synchronization signal and a DL common channel.

To solve this problem, NR may define a BWP for the initial access procedure as illustrated in FIG. 33. In the NR system, the UE may perform the initial access procedure for SSB transmission, system information transmission, and an RACH procedure within the BWP corresponding to each UE. At least one DL BWP may include one CORESET having the common search space in at least one primary CC.

Accordingly, at least RMSI, OSI, paging, and RACH message 2/4 related DL control information may be transmitted in a CORESET having the common search space and a DL data channel associated with the DL control information may be allocated within a DL BWP. The UE may expect that an SSB will be transmitted within a BWP corresponding thereto.

That is, in NR, at least one DL BWP may be used for DL common channel transmission. Herein, signals which can be included in the DL common channel may include an SSB, a CORSET and RMSI having the common search space, OSI, paging, and a PDSCH for RACH messages 2/4. The RMSI may be interpreted as system information block 1 (SIB1) and is system information that the UE should acquire after receiving an MIB through a PBCH.

(1) Numerology

In NR, subcarrier spacings of 15, 30, 60, and 120 kHz are used for data transmission. Therefore, numerologies for a PDCCH and a PDSCH within a BWP for the DL common channel may be selected from among numerologies defined for data transmission. For example, for the frequency range below 6 GHz, one or more of subcarrier spacings of 15 kHz, 30 kHz, and 60 kHz may be selected and, for the frequency range of 6 GHz to 52.6 GHz, one or more of subcarrier spacings of 60 kHz and 120 kHz may be selected.

However, since a subcarrier spacing of 60 kHz has already been defined for a URLLC service in the frequency range below 6 GHz, the subcarrier spacing of 60 kHz is not suitable for PBCH transmission in the frequency range below 6 GHz. Accordingly, subcarrier spacings of 15 kHz and 30 kHz may be used to transmit the DL common channel in the frequency range below 6 GHz, and subcarrier spacings of 60 kHz and 120 kHz may be used in the frequency range above 6 GHz.

Meanwhile, in NR, subcarrier spacings of 15, 30, 120, and 240 kHz are supported for SSB transmission. It may be assumed that the same subcarrier spacing is applied to the CORESET and RMSI having the SSB and the common search space, paging, and a DL channel such as a PDSCH for an RAR. Hence, when such an assumption is applied, it is not necessary to define numerology information for PBCH content.

Conversely, the case in which a subcarrier spacing for a DL control channel needs to be changed may occur. For example, if a subcarrier spacing of 240 kHz is applied for SSB transmission in the frequency band above 6 GHz, since the subcarrier spacing of 240 kHz is not used for data transmission including DL control channel transmission, it is necessary to change the subcarrier spacing for data transmission including DL control channel transmission. Therefore, when the subcarrier spacing can be changed for data transmission including DL data channel transmission, this may be indicated through a 1-bit indication included in PBCH content. For example, according to a carrier frequency range, the 1-bit indication may be interpreted as {15 kHz, 30 kHz} or {60 kHz, 120 kHz}. The indicated subcarrier spacing may be regarded as a reference numerology of an RB grid. Herein, the PBCH content may imply an MIB transmitted in a PBCH.

That is, in the frequency range below 6 GHz, the 1-bit indication may indicate that a subcarrier spacing for RMSI for initial access, OSI, paging, or Msg 2/4 is 15 kHz or 30 kHz. In the frequency range above 6 GHz, the 1-bit indication may indicate that a subcarrier spacing for RMSI for initial access, OSI, paging, or Msg 2/4 is 60 kHz or 120 kHz.

(2) Bandwidth of BWP for DL Common Channel Transmission

In the NR system, a bandwidth of a BWP for a DL common channel need not to be equal to a system bandwidth in which the network operates. That is, the bandwidth of the BWP may be narrower than the system bandwidth. That is, the bandwidth should be wider than a minimum carrier bandwidth but should not be wider than a minimum bandwidth of the UE.

Accordingly, the BWP for DL common channel transmission may be defined such that the bandwidth of the BWP is wider than the bandwidth of the SSB and equal to or narrower than a specific DL bandwidth of all UEs capable of operating in each frequency range. For example, in the frequency range below 6 GHz, the minimum carrier bandwidth may be defined as 5 MHz and the UE minimum bandwidth may be assumed to be 20 MHz. In this case, the bandwidth of a DL common channel may be defined in the range of 5 MHz to 20 MHz. That is, the SSB may be positioned at a part of the DL common channel bandwidth.

(3) Bandwidth Configuration

Figure 34:
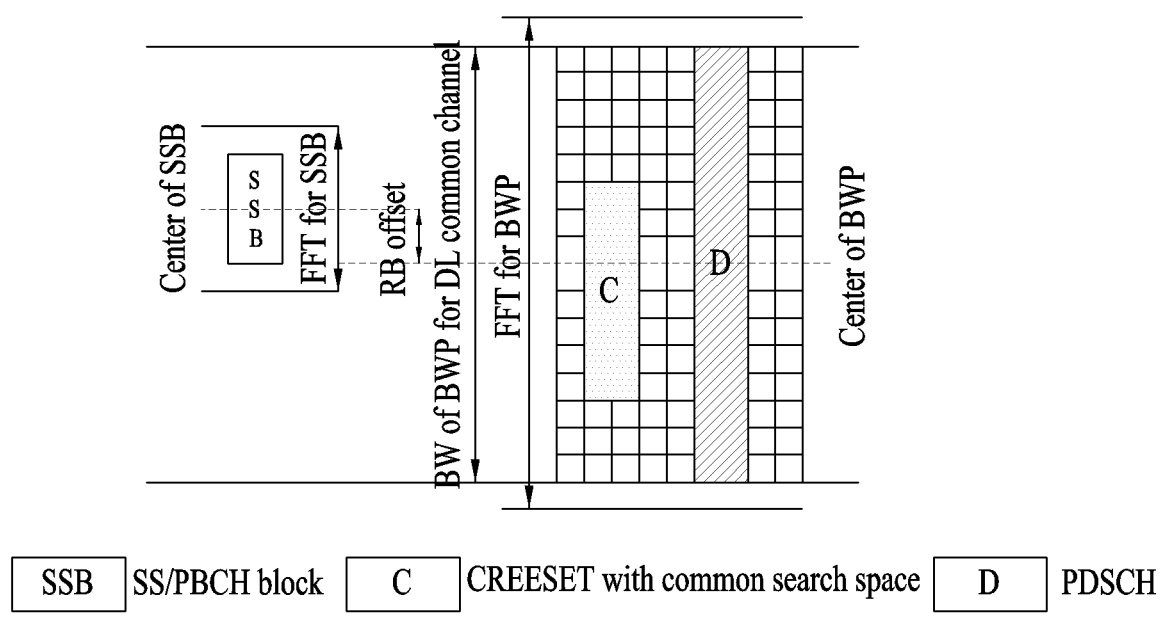

FIG. 34 illustrates exemplary bandwidth configuration.

The UE attempts to detect a signal within a bandwidth of an SSB during an initial synchronization procedure including cell ID detection and PBCH decoding. Next, the UE may continue to perform the next initial access procedure within a bandwidth for a DL common channel indicated by the network through PBCH content. That is, the UE may acquire system information within a bandwidth of the DL common channel and perform an RACH procedure.

Meanwhile, an indication for a relative frequency position between bandwidth of the SSB and bandwidth of the DL common channel may be defined in the PBCH content. Meanwhile, as described above, the PBCH content may indicate an MIB transmitted in a PBCH.

For example, as illustrated in FIG. 34, a relative frequency position between bandwidth of an SSB and bandwidth of a DL common channel may be defined as offset information about an interval between bandwidth of the SSB and bandwidth of the DL common channel.

Particularly, referring to FIG. 34, the offset value may be indicated in units of RBs and the UE may determine that a bandwidth of the DL common channel is positioned at an offset position corresponding to the number of indicated RBs. Meanwhile, in the NR system, numerologies for the bandwidth for the SSB and the bandwidth for the DL common channel, i.e., subcarrier spacings, may be differently configured. In this case, an absolute frequency interval of an offset indicated in units of RBs may be calculated based on any one of a subcarrier spacing of the bandwidth for the SSB and a subcarrier spacing of the bandwidth for the DL common channel.

To simplify an indication of the relative frequency position, a bandwidth for a plurality of SSBs may be any one of candidate positions at which the SSBs are positioned within the bandwidth for the DL common channel.

In the NR system, the bandwidth of the DL common channel need not to be equal to a system bandwidth in which the network operates. The bandwidth may be narrower than the system bandwidth. That is, the bandwidth of the DL common channel should be wider than the minimum carrier bandwidth but should not be wider than the minimum bandwidth of the UE. For example, the minimum carrier bandwidth in the frequency range below 6 GHz is defined as 5 MHz. If the minimum bandwidth of the UE is assumed to be 20 MHz, the bandwidth of the DL common channel may be defined in the range of 5 MHz to 20 MHz.

For example, if the bandwidth of the SSB is 5 MHz and the bandwidth of the DL common channel is 20 MHz, 4 candidate positions for detecting the SSBs within the bandwidth for the DL common channel may be defined.

15. CORESET Configuration (1) CORESET Information and RMSI Scheduling Information It may be more efficient for a network to transmit CORESET information including RMSI scheduling information to the UE than to directly indicate the RMSI scheduling information. That is, frequency resource related information, such as CORESET and bandwidth of a frequency position, may be indicated through PBCH content. In addition, time resource related information, such as a start OFDM symbol, a duration time, and the number of OFDM symbols, may be additionally configured to flexibly use a network resource.

Additionally, the network may also transmit information about a common search space monitoring periodicity, a duration time, and an offset to the UE in order to reduce detection complexity.

Meanwhile, a transmission type and an REG bundling size may be fixed according to CORESET of a common search space. Herein, transmission types may be distinguished according to whether a signal is interleaved.

(2) Number of OFDM Symbols Included in Slot

In association with the number of OFDM symbols in a slot or a carrier frequency range below 6 GHz, two candidates such as a 7-OFDM symbol slot and a 14-OFDM symbol slot are considered. If the NR system determines to support two types of slots for the carrier frequency range below 6 GHz, an indication method for a slot types should be defined to indicate a time resource of the CORESET having the common search space.

(3) Bit Size of PBCH Content

To indicate numerology, bandwidth, and CORESET information in PBCH content, about 14 bits may be designated as shown in [Table 4].

TABLE 4

| Details | Bit size | |
|---|---|---|
| | 6 GHz | For a6 GHz |
| Reference numerology | [1] | [1] |
| Bandwidth for DL common channel, and SS block position | [3] | [2] |
| # of OFDM symbols in a Slot | [1] | 0 |
| CORESET (Frequency resource-bandwidth, location) (Time resource-starting OFDM symbol, Duration) (UE Monitoring Periodicity, offset, duration) | About [10] | About [10] |
| Total | About [14] | |

Figure 35:
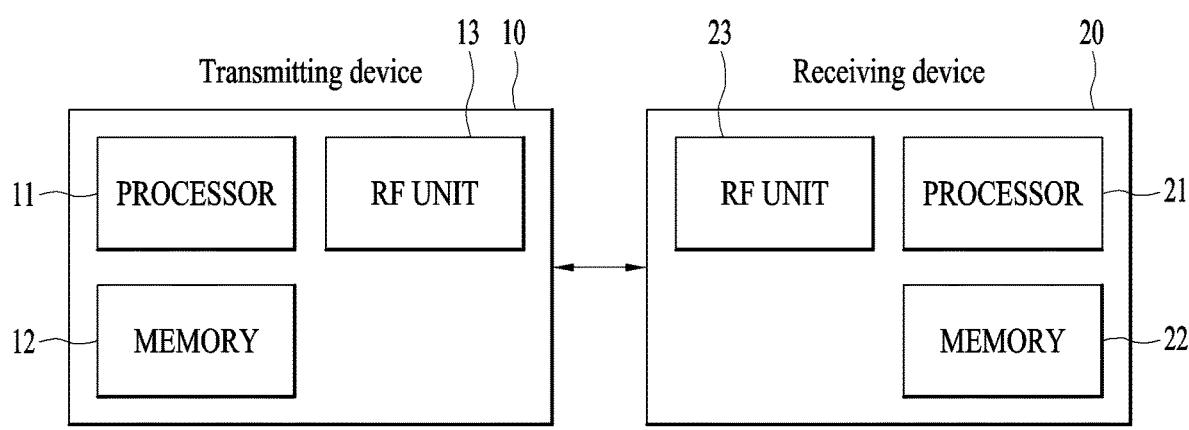
FIG. 35 is a block diagram of communication devices according to an embodiment of the present disclosure.

FIG. 35 is a block diagram illustrating components of a transmitting device 10 and a receiving device 20 which implement the present disclosure.

The transmitting device 10 and the receiving device 20, respectively include radio frequency (RF) units 13 and 23 which transmit or receive radio signals carrying information/ and or data, signals, and messages, memories 12 and 22 which store various types of information related to communication in a wireless communication system, and processors 11 and 21 which are operatively coupled with components such as the RF units 13 and 23 and the memories 12 and 22, and control the memories 12 and 22 and/or the RF units 13 and 23 to perform at least one of the foregoing embodiments of the present disclosure.

The memories 12 and 22 may store programs for processing and control of the processors 11 and 21, and temporarily store input/output information. The memories 12 and 22 may be used as buffers.

The processors 11 and 21 generally provide overall control to the operations of various modules in the transmitting device or the receiving device. Particularly, the processors 11 and 21 may execute various control functions to implement the present disclosure. The processors 11 and 21 may be called controllers, microcontrollers, microprocessors, microcomputers, and so on. The processors 11 and 21 may be achieved by various means, for example, hardware, firmware, software, or a combination thereof. In a hardware configuration, the processors 11 and 21 may be provided with application specific integrated circuits (ASICs), digital signal processors (DSPs), digital signal processing devices (DSPDs), programmable logic devices (PLDs), field programmable gate arrays (FPGAs), etc. In a firmware or software configuration, firmware or software may be configured to include a module, a procedure, a function, or the like. The firmware or software configured to implement the present disclosure may be provided in the processors 11 and 21, or may be stored in the memories 12 and 22 and executed by the processors 11 and 21.

The processor 11 of the transmitting device 10 performs a predetermined coding and modulation on a signal and/or data which is scheduled by the processor 11 or a scheduler connected to the processor 11 and will be transmitted to the outside, and then transmits the encoded and modulated signal and/or data to the RF unit 13. For example, the processor 11 converts a transmission data stream to K layers after demultiplexing, channel encoding, scrambling, modulation, and so on. The encoded data stream is referred to as a codeword, equivalent to a data block provided by the MAC layer, that is, a transport block (TB). One TB is encoded to one codeword, and each codeword is transmitted in the form of one or more layers to the receiving device. For frequency upconversion, the RF unit 13 may include an oscillator. The RF unit 13 may include Nt transmission antennas (Nt is a positive integer equal to or greater than 1).

The signal process of the receiving device 20 is configured to be reverse to the signal process of the transmitting device 10. The RF unit 23 of the receiving device 20 receives a radio signal from the transmitting device 10 under the control of the processor 21. The RF unit 23 may include Nr reception antennas, and recovers a signal received through each of the reception antennas to a baseband signal by frequency downconversion. For the frequency downconversion, the RF unit 23 may include an oscillator. The processor 21 may recover the original data that the transmitting device 10 intends to transmit by decoding and demodulating radio signals received through the reception antennas.

Each of the RF units 13 and 23 may include one or more antennas. The antennas transmit signals processed by the RF units 13 and 23 to the outside, or receive radio signals from the outside and provide the received radio signals to the RF units 13 and 23 under the control of the processors 11 and 21 according to an embodiment of the present disclosure. An antenna may also be called an antenna port. Each antenna may correspond to one physical antenna or may be configured to be a combination of two or more physical antenna elements. A signal transmitted from each antenna may not be further decomposed by the receiving device 20. An RS transmitted in correspondence with a corresponding antenna defines an antenna viewed from the side of the receiving device 20, and enables the receiving device 20 to perform channel estimation for the antenna, irrespective of whether a channel is a single radio channel from one physical antenna or a composite channel from a plurality of physical antenna elements including the antenna. That is, the antenna is defined such that a channel carrying a symbol on the antenna may be derived from the channel carrying another symbol on the same antenna. In the case of an RF unit supporting MIMO in which data is transmitted and received through a plurality of antennas, the RF unit may be connected to two or more antennas.

In the present disclosure, the RF units 13 and 23 may support reception BF and transmission BF. For example, the RF units 13 and 23 may be configured to perform the exemplary functions described before with reference to FIGS. 5 to 8 in the present disclosure. In addition, the RF units 13 and 23 may be referred to as transceivers.

In embodiments of the disclosure, a UE operates as the transmitting device 10 on UL, and as the receiving device 20 on DL. In the embodiments of the disclosure, the gNB operates as the receiving device 20 on UL, and as the transmitting device 10 on DL. Hereinafter, a processor, an RF unit, and a memory in a UE are referred to as a UE processor, a UE RF unit, and a UE memory, respectively, and a processor, an RF unit, and a memory in a gNB are referred to as a gNB processor, a gNB RF unit, and a gNB memory, respectively.

The gNB processor of the present disclosure may perform control to map an SSB including a PSS/SSS/PBCH to a plurality of symbols and transmit the SSS to the UE. In this case, depending on whether the SSB is transmitted in a first half-frame or in a second half-frame, a phase of at least one symbol among the symbols to which the PSS/SSS/PBCH are mapped may be differently mapped. Specifically, the gNB processor may map and transmit the SSB such that phases of a symbol to which the PBCH is mapped when the SSB is transmitted in a first half-frame and a symbol to which the PBCH is mapped when the SSB is transmitted in a second half-frame may have a difference of 180 degrees, i.e., may be inverted in polarity.

In addition, an indicator for identifying a half-frame in which the SSB is transmitted may be included in the PBCH and a scrambling sequence of the PBCH may be generated based on the indicator. A sequence of a PBCH DMRS may be generated based on multiplication of the number of SSB indexes obtainable through the PBCH DMRS and a value (e.g., 0 or 1) indicated by the indicator.

The gNB processor may differently generate the sequence of the PBCH DMRS or may differently map a frequency position to which the PBCH DMRS is mapped, according to a half-frame in which the SSB is transmitted.

Additionally, when the UE performs initial access and when the UE is in an RRC connected state, the gNB processor may transmit the SSB based on a different periodicity, In this case, an SSB transmission periodicity when the UE performs initial access may be set to be shorter than an SSB transmission periodicity when the UE is in the RRC connected state.

The UE processor of the present disclosure may perform control to receive the SSB including the PSS/SSS/PBCH from the gNB. In this case, the UE processor may identify whether the SSB is received in the first half-frame or in the second half-frame, based on a phase of at least one symbol among symbols to which the PSS/SSS/PBCH are mapped.

Upon receiving the SSB in the first half-frame, the UE processor may attempt to detect the SSB transmitted in the second half-frame in a specific time duration after a predetermined time from a timing at which the SSB is received. When synchronization between a serving cell and a neighbor cell is assumed, the UE processor may equally apply time information of the SSB received from the serving cell to the neighbor cell.

The gNB processor or the UE processor of the present disclosure may be configured to apply the present disclosure in a cell operating in a high frequency band of 6 GHz or more at which analog or hybrid beamforming is used.

As described before, a detailed description has been given of exemplary embodiments of the present disclosure so that those skilled in the art may implement and perform the present disclosure. While reference has been made above to the exemplary embodiments of the present disclosure, those skilled in the art will understand that various modifications and alterations may be made to the present disclosure within the scope of the present disclosure. Accordingly, the disclosure should not be limited to the specific examples described herein, but should be accorded the broadest scope consistent with the principles and novel features disclosed herein.

INDUSTRIAL APPLICABILITY

While the above-described method of transmitting the synchronization signal block and the apparatus therefor have been described focusing on an example applied to a 5G new RAT system, the method and apparatus may be applied to various wireless communication system in addition to the 5G new RAT system.

The invention claimed is:

1. A method of receiving a synchronization signal block (SSB) by a user equipment (UE) in a wireless communication system, the method comprising:
   receiving at least one SSB in a first half-frame or a second half-frame,
   wherein the first half-frame and the second half-frame are included in a radio frame, wherein the at least one SSB is one of a first SSB including a first Physical Broadcast Channel (PBCH) received in the first half-frame or a second SSB including a second PBCH received in the second half-frame, wherein the first PBCH is mapped to a first symbol included in first symbols to which the first SSB is mapped and a second symbol included in second symbols to which the second SSB is mapped, wherein phases of the first symbol and the second symbol are different, wherein a first demodulation reference signal (DMRS) is mapped to the first symbol and a second DMRS is mapped to the second symbol, wherein, based on the UE receiving the at least one SSB in a first frequency band equal to or lower than 6 GHz, a first transmission power of the first DMRS and the second DMRS is higher than a second transmission power of the first PBCH and the second PBCH, and wherein, based on the UE receiving the at least one SSB in a second frequency band higher than 6 Ghz, the first transmission power and the second transmission power are identical.

2. The method of claim 1, wherein the phases of the first symbol and the second symbol have a difference of 180 degrees.

3. The method of claim 1, wherein the first PBCH and the second PBCH include an indicator for distinguishing between the first half-frame and the second half-frame, and the indicator is used for generating a scrambling sequence of the PBCH.

4. The method of claim 3, wherein sequences of the first DMRS and the second DMRS are generated based on (i) a number of SSB indexes obtainable through the first DMRS and the second DMRS and (ii) the indicator.

5. The method of claim 4, wherein the sequences are generated based on multiplication of the number of the SSB indexes and a value indicated by the indicator.

6. The method of claim 1, wherein, based on detection of the first SSB, the UE performs detection of the second SSB in a specific time duration after a predetermined time from a timing at which the first SSB is detected.

7. The method of claim 1, wherein a first sequence of the first DMRS is different from a second sequence of the second DMRS.

8. The method of claim 1, wherein a first frequency position to which the first DMRS is different from a second frequency position to which the second DMRS.

9. The method of claim 1, wherein, based on initial access performed by the UE, the at least one SSB is repeatedly transmitted at a first time periodicity, and based on radio resource control (RRC) connection state of the UE, the at least one SSB is repeatedly transmitted at a second time periodicity longer than the first time periodicity.

10. The method of claim 1, wherein, based on assumption that signals transmitted from a serving cell and a neighbor cell of the UE are received within a predetermined error range, time information obtained through an SSB received from the serving cell is equally applied to an SSB received from the neighbor cell.

11. A user equipment (UE) for receiving a synchronization signal block (SSB) in a wireless communication system, the UE comprising:
a transceiver configured to transmit and receive a signal to and from a base station (BS); and
a processor connected to the transceiver and configured to control the transceiver to receive at least one SSB in a first half-frame or a second half-frame,
wherein the first half-frame and the second half-frame are included in a radio frame,
wherein the at least one SSB is one of a first SSB including a first Physical Broadcast Channel (PBCH) received in the first half-frame or a second SSB including a second PBCH received in the second half-frame,
wherein the first PBCH is mapped to a first symbol included in first symbols to which the first SSB is mapped and a second symbol included in second symbols to which the second SSB is mapped,
wherein phases of the first symbol and the second symbol are different,
wherein a first demodulation reference signal (DMRS) is mapped to the first symbol and a second DMRS is mapped to the second symbol,
wherein, based on the UE receiving the at least one SSB in a first frequency band equal to or lower than 6 GHz, a first transmission power of the first DMRS and the second DMRS is higher than a second transmission power of the first PBCH and the second PBCH, and
wherein, based on the UE receiving the at least one SSB in a second frequency band higher than 6 Ghz, the first transmission power and the second transmission power are identical.

12. A method of transmitting a synchronization signal block (SSB) by a base station (BS) in a wireless communication system, the method comprising:
transmitting at least one SSB in a first half-frame or a second half-frame,
wherein the first half-frame and the second half-frame are included in a radio frame,
wherein the at least one SSB is one of a first SSB including a first Physical Broadcast Channel (PBCH) transmitted in the first half-frame or a second SSB including a second PBCH transmitted in the second half-frame,
wherein the first PBCH is mapped to a first symbol included in first symbols to which the first SSB is mapped and a second symbol included in second symbols to which the second SSB is mapped,
wherein phases of the first symbol and the second symbol are differently mapped,
wherein a first demodulation reference signal (DMRS) is mapped to the first symbol and a second DMRS is mapped to the second symbol,
wherein, based on the UE receiving the at least one SSB in a first frequency band equal to or lower than 6 GHz, a first transmission power of the first DMRS and the second DMRS is higher than a second transmission power of the first PBCH and the second PBCH, and
wherein, based on the UE receiving the at least one SSB in a second frequency band higher than 6 Ghz, the first transmission power and the second transmission power are identical.

13. A base station (BS) for transmitting a synchronization signal block (SSB) in a wireless communication system, the BS comprising:
a transceiver configured to transmit and receive a radio signal to and from a user equipment (UE); and a processor connected to the transceiver and configured to transmit the at least one SSB in a first half-frame or a second half-frame, wherein the first half-frame and the second half-frame are included in a radio frame, wherein the at least one SSB is one of a first SSB including a first Physical Broadcast Channel (PBCH) transmitted in the first half-frame or a second SSB including a second PBCH transmitted in the second half-frame, wherein the first PBCH is mapped to a first symbol included in first symbols to which the first SSB is mapped and a second symbol included in second symbols to which the second SSB is mapped, wherein phases of the first symbol and the second symbol are differently mapped, wherein a first demodulation reference signal (DMRS) is mapped to the first symbol and a second DMRS is mapped to the second symbol, wherein, based on the UE receiving the at least one SSB in a first frequency band equal to or lower than 6 GHz, a first transmission power of the first DMRS and the second DMRS is higher than a second transmission power of the first PBCH and the second PBCH, and wherein, based on the UE receiving the at least one SSB in a second frequency band higher than 6 Ghz, the first transmission power and the second transmission power are identical.

\* \* \* \* \*